(12) United States Patent
Zhang et al.

(10) Patent No.: US 11,470,309 B2
(45) Date of Patent: Oct. 11, 2022

(54) ADAPTIVE MOTION VECTOR DIFFERENCE RESOLUTION FOR AFFINE MODE

(71) Applicants: Beijing Bytedance Network Technology Co., Ltd., Beijing (CN); Bytedance Inc., Los Angeles, CA (US)

(72) Inventors: Kai Zhang, San Diego, CA (US); Li Zhang, San Diego, CA (US); Hongbin Liu, Beijing (CN); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/521,043

(22) Filed: Nov. 8, 2021

(65) Prior Publication Data

US 2022/0060696 A1    Feb. 24, 2022

Related U.S. Application Data

(63) Continuation of application No. PCT/CN2020/091537, filed on May 21, 2020.

(30) Foreign Application Priority Data

May 21, 2019    (WO) ................ PCT/CN2019/087805

(51) Int. Cl.
*H04N 19/109*    (2014.01)
*H04N 19/139*    (2014.01)
(Continued)

(52) U.S. Cl.
CPC ......... *H04N 19/109* (2014.11); *H04N 19/105* (2014.11); *H04N 19/139* (2014.11);
(Continued)

(58) Field of Classification Search
CPC .... H04N 19/109; H04N 19/139; H04N 19/46; H04N 19/52
See application file for complete search history.

(56) References Cited

U.S. PATENT DOCUMENTS 10,455,231 B2    10/2019    Xu et al.
10,757,417 B2    8/2020    Zhang et al.
(Continued)

FOREIGN PATENT DOCUMENTS

CN    104885464 A    9/2015
CN    107211156 A    9/2017
(Continued)

OTHER PUBLICATIONS

Non Final Office Action from U.S. Appl. No. 17/520,975 dated Mar. 3, 2022.
(Continued)

*Primary Examiner* — Francis Geroleo
(74) *Attorney, Agent, or Firm* — Perkins Coie LLP

(57) ABSTRACT

A method of visual media processing includes determining whether to use an affine adaptive motion vector resolution (AMVR) technique on visual media data relying on a control information related to the affine AMVR technique in a bitstream representation of the visual media data, wherein the control information is included or excluded from the bitstream representation based on a rule; and performing a conversion between the visual media data and the bitstream representation of the visual media data.

20 Claims, 37 Drawing Sheets

(51) Int. Cl.
  *H04N 19/46* (2014.01)
  *H04N 19/52* (2014.01)
  *H04N 19/105* (2014.01)
  *H04N 19/157* (2014.01)
  *H04N 19/176* (2014.01)
  *H04N 19/513* (2014.01)

(52) U.S. Cl.
  CPC ......... *H04N 19/157* (2014.11); *H04N 19/176* (2014.11); *H04N 19/46* (2014.11); *H04N 19/513* (2014.11); *H04N 19/52* (2014.11)

(56) References Cited

U.S. PATENT DOCUMENTS

| | | | |
|---|---|---|---|
| 10,841,609 | B1 | 11/2020 | Liu et al. |
| 10,880,547 | B2 | 12/2020 | Xu et al. |
| 11,095,917 | B2 | 8/2021 | Zhang et al. |
| 2016/0100189 | A1 | 4/2016 | Pang et al. |
| 2017/0006302 | A1 | 1/2017 | Lee et al. |
| 2018/0310017 | A1 | 10/2018 | Chen et al. |
| 2019/0082191 | A1* | 3/2019 | Chuang ............... H04N 19/119 |
| 2019/0104319 | A1 | 4/2019 | Zhang et al. |
| 2019/0116376 | A1 | 4/2019 | Chen et al. |
| 2019/0138889 | A1 | 5/2019 | Jiang et al. |
| 2019/0273937 | A1 | 9/2019 | Yu et al. |
| 2020/0221117 | A1 | 7/2020 | Liu et al. |
| 2020/0228827 | A1 | 7/2020 | Hannuksela |
| 2020/0296405 | A1 | 9/2020 | Huang et al. |
| 2020/0329246 | A1 | 10/2020 | Yu et al. |
| 2021/0076050 | A1 | 3/2021 | Zhang et al. |
| 2021/0136363 | A1 | 5/2021 | Jang |
| 2021/0195177 | A1 | 6/2021 | Zhang et al. |
| 2021/0211707 | A1 | 7/2021 | Liu et al. |
| 2021/0211713 | A1 | 7/2021 | Zhang et al. |
| 2021/0211714 | A1 | 7/2021 | Zhang et al. |
| 2021/0219001 | A1 | 7/2021 | Jang |
| 2021/0243467 | A1 | 8/2021 | Zhang et al. |
| 2021/0243468 | A1 | 8/2021 | Zhang et al. |
| 2021/0266560 | A1 | 8/2021 | Jang |
| 2021/0266577 | A1 | 8/2021 | Zhang et al. |
| 2021/0266584 | A1 | 8/2021 | Zhang et al. |
| 2021/0266591 | A1 | 8/2021 | Zhang et al. |
| 2021/0274208 | A1 | 9/2021 | Zhang et al. |
| 2021/0274209 | A1 | 9/2021 | He et al. |
| 2021/0289209 | A1 | 9/2021 | Lee et al. |
| 2021/0352302 | A1 | 11/2021 | Zhang et al. |
| 2021/0352315 | A1 | 11/2021 | Zhang et al. |
| 2021/0368199 | A1 | 11/2021 | Zhang et al. |
| 2022/0053207 | A1 | 2/2022 | Deshpande |
| 2022/0060695 | A1 | 2/2022 | Zhang et al. |
| 2022/0060718 | A1 | 2/2022 | Zhang et al. |

FOREIGN PATENT DOCUMENTS

| | | | |
|---|---|---|---|
| CN | 108028929 | A | 5/2018 |
| CN | 108781284 | A | 11/2018 |
| CN | 108781294 | A | 11/2018 |
| CN | 109076214 | A | 12/2018 |
| CN | 110140355 | A | 8/2019 |
| KR | 20200126813 | A * | 11/2020 |
| WO | 2018099269 | A1 | 6/2018 |
| WO | 2019010156 | A1 | 1/2019 |
| WO | 2019194507 | A1 | 10/2019 |
| WO | 2019194568 | A1 | 10/2019 |
| WO | 2019222060 | A1 | 11/2019 |
| WO | WO-2020222588 | A1 * | 11/2020 ............. H04N 19/11 |

OTHER PUBLICATIONS

Bross et al. "Versatile Video Coding (Draft 3)," oint Video Experts Team (JVET) of ITU-T SG 16 WP 3 and ISO/IEC JTC 1/SC 29/WG 11 12th Meeting: Macao, CN, Oct. 3-12, 2018, document JVET-L1001, 2018.

Bross et al. "Versatile Video Coding (Draft 4)," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M1001, 2019.

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

Chen et al. "Crosscheck of JVET-L0142 (CE4: Simplification of the Common Base for Affine Merge (Test 4.2.6))." Joint Video Experts Team (JVET) of ITU-T SG 16 WP 3 and ISO/IEC JTC 1/SC 29/WG 11 12th Meeting: Macao, CN, Oct. 3-12, 2018, document JVET-L0632, 2018.

Han et al. "CE4.1 3: Affine Motion Compensation Prediction," Joint Video Exploration Team (JVET) of ITU-T SG 16 WP 3 and ISO/IEC JTC 1/SC 29/WG 11 11th Meeting: Ljubljana, SI, Jul. 10-18, 2018, document JVET-K0337, 2018.

Huang et al. "CE4.2.5: Simplification of Affine Merge List Construction and Move ATMVP to Affine Merge List," Joint Video Experts Team (JVET) of ITU-T SG 16 WP 3 and ISO/IEC JTC 1/SC 29/WG 11 12th Meeting: Macao, CN, Oct. 3-12, 2018, document JVET-L0278, 2018.

"High Efficiency Video Coding," Series H: Audiovisual and Multimedia Systems: Infrastructure of Audiovisual Services—Coding of Moving Video, ITU-T Telecommunication Standardization Sector of ITU, H.265, Feb. 2018.

Lai et al. "CE4.3.4: Removal of AMVR Flag Constraint," Joint Video Experts Team (JVET) of ITU-T SG 16 WP 3 and ISO/IEC JTC 1/SC 29/WG 11 11th Meeting: Ljubljana, SI, Jul. 10-18, 2018, document JVET-K0247, 2018.

Laroche et al. "CE2: On Subblock Merge Index Coding (Test CE2.2.2)," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0381, 2019.

Lee et al. "CE4: Simplification of the Common Base for Affine Merge (Test 4.2.6)," Joint Video Experts Team (JVET) of ITU-T SG 16 WP 3 and ISO/IEC JTC 1/SC 29/WG 11 12th Meeting: Macau, CN, Oct. 8-12, 2018, document JVET-L0142, 2018.

Lee et al. "Cross-check of JCTVC-L0279 on Motion Data Compression," Joint Collaborative Team on Video Coding (JCT-VC) of ITU-T SG 16 WP 3 and ISO/IEC JTC 1/SC 29/WG 11 12th Meeting: Geneva, CH, Jan. 14-23, 2013, document JCTVC-L0368, 2013.

Lee et al. "CE2-related: Simplification of Subblock-Based Temporal Merging Candidates," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0240, 2019.

Li, Guichun. "Crosscheck of JVET-N0236 (CE2-Related: Prediction Refinement with Optical Flow for Affine Mode)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-M0651, 2019.

Liao et al. "CE10.3.1 b: Triangular Prediction Unit Mode," Joint Video Exploration Team (JVET) of ITU-T SG 16 WP 3 and ISO/IEC JTC 1/SC 29/WG 11 12th Meeting: Macao, CN, Oct. 3-12, 2018, document JVET-L0124, 2018.

Liu et al. "CE4-related: Adaptive Motion Vector Resolution for Affine Inter Mode," Joint Video Experts Team (JVET) of ITU-T SG 16 WP 3 and ISO/IEC JTC 1/SC 29/WG 11 12th Meeting: Macao, CN, Oct. 3-12, 2018, document JVET-L0332, 2018.

Luo et al. "CE2-Related: Prediction Refinement with Optical Flow for Affine Mode," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0236, 2019.

(56) References Cited

OTHER PUBLICATIONS

Rosewarne et al. "High Efficiency Video Coding (HEVC) Test Model 16 (HM 16) Improved Encoder Description Update 7," Joint Collaborative Team on Video Coding (JCT-VC) of ITU-T SG16 WP3 and ISO/IEC JTC1/SC29/WG11 25th Meeting: Chengdu, CN, Oct. 14-21, 2016, document JCTVC-Y1002, 2016.

Zhang et al. "CE2-Related: Early Awareness of Accessing Temporal Blocks in Sub-Block Merge List Construction," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0273, 2019.

JEM-7.0: https://jvet.hhi.fraunhofer.de/svn/svn_HMJEMSoftware/tags/ HM-16.6-JEM-7.0.

vcgit.hhi.fraunhofer.de/jvet/VVCSoftware_VTM/tags/VTM-5.0.

International Search Report and Written Opinion from International Patent Application No. PCT/CN2020/091537 dated Jul. 29, 2020 (8 pages).

International Search Report and Written Opinion from International Patent Application No. PCT/CN2020/091538 dated Aug. 19, 2020 (10 pages).

International Search Report and Written Opinion from International Patent Application No. PCT/CN2020/091539 dated Aug. 21, 2020 (9 pages).

International Search Report and Written Opinion from International Patent Application No. PCT/CN2020/091540 dated Jul. 30, 2020 (10 pages).

International Search Report and Written Opinion from International Patent Application No. PCT/CN2020/133271 dated Mar. 8, 2021 (10 pages).

Non Final Office Action from U.S. Appl. No. 17/521,012 dated Jan. 24, 2022.

Final Office Action from U.S. Appl. No. 17/521,012 dated May 6, 2022.

Bross et al. "Versatile Video Coding (Draft 5)," Joint Video Experts Team (JVET)of ITU-T SG 16 WP 3 and ISO/IEC JTC 1/SC 29/WG 1114th Meeting: Geneva, CH, Mar. 19-27, 2019, document JVET-N1001,2019.

Extended European Search Report from European Patent Application No. 20810559.3 dated May 19, 2022 (7 pages).

Extended European Search Report from European Patent Application No. 20809576.0 dated May 19, 2022 (7 pages).

\* cited by examiner

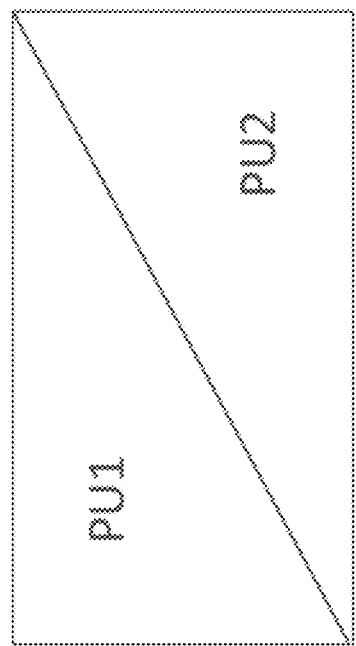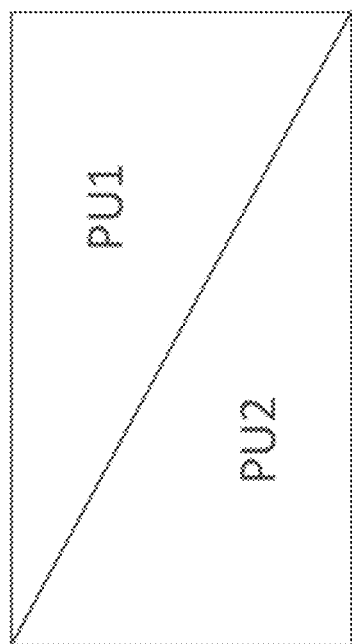
FIG. 13

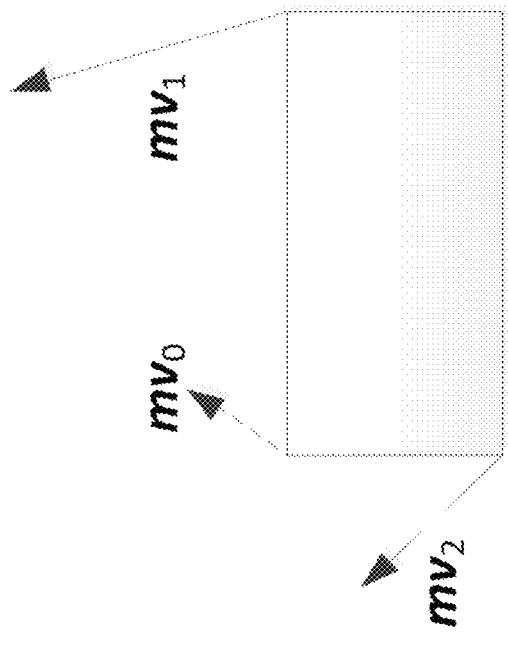
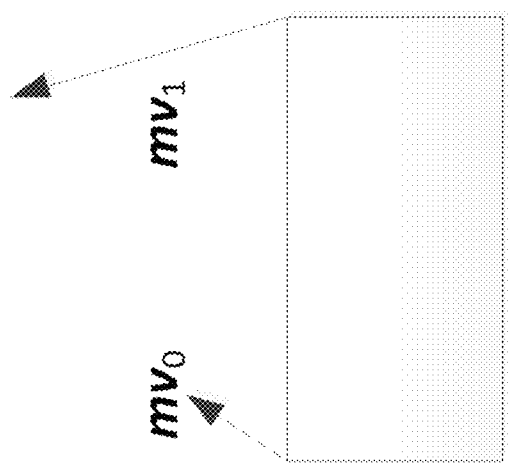
FIG. 18

ADAPTIVE MOTION VECTOR DIFFERENCE RESOLUTION FOR AFFINE MODE

CROSS REFERENCE TO RELATED APPLICATIONS

This application is a continuation of International Application No. PCT/CN2020/091537, filed on May 21, 2020, which claims the priority to and benefit of International Patent Application No. PCT/CN2019/087805, filed on May 21, 2019. All the aforementioned patent applications are hereby incorporated by reference in their entireties.

TECHNICAL FIELD

This patent document relates to video coding/decoding techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

The present document describes various embodiments and techniques in which video coding or decoding is performed using sub-block based motion vector refinement. In one example aspect, a method of visual media processing is disclosed. The method includes determining whether to use an affine adaptive motion vector resolution (AMVR) technique on visual media data relying on a control information related to the affine AMVR technique in a bitstream representation of the visual media data, wherein the control information is included or excluded from the bitstream representation based on a rule; and performing a conversion between the visual media data and the bitstream representation of the visual media data.

In another example aspect, another method of visual media processing is disclosed. The method includes making a determination of whether or not subblock-based temporal motion vector prediction (sbTMVP) technique is applied to visual media data; in response to the determination, generating a sub-block merge candidate list for a current video block included in the visual media data; and performing a conversion between the current video block and a bitstream representation of the current video block, using the sub-block merge candidate list.

In yet another example aspect, another method of visual media processing is disclosed. The method includes appending, during a conversion between a current video block and a bitstream representation, one or more default merge candidates to a sub-block merge candidate list for the conversion; and performing the conversion using the sub-block merge candidate list with appended one or more default merge candidates.

In yet another example aspect, another method of visual media processing is disclosed. The method includes determining, during a conversion between a current video block of a video and a bitstream representation, applicability of subblock-based temporal motion vector prediction (sbTMVP) to the conversion wherein one or more bits in the bitstream representation correspond to the determining; and performing the conversion based on the determining.

In yet another example aspect, another method of visual media processing is disclosed. The method includes building a sub-block merge candidate list selectively based on a condition associated with a temporal motion vector prediction (TMVP) step or a subblock-based temporal motion vector prediction (sbTMVP) step; and performing a conversion between a current video block and a bitstream representation of the current video block based on the sub-block merge candidate list.

In yet another example aspect, another method of visual media processing is disclosed. The method includes during a conversion between a visual media data and a bitstream representation of the visual media data, determining an information related to a collocated reference picture associated with the visual media data, wherein the information is included or excluded in the bitstream representation based on whether a coding mode accessing temporal motion information is enabled; determining the collocated reference picture according to the indication; and performing, based on the collocated reference picture, the conversion between the visual media data and the bitstream representation of the visual media data.

In yet another example aspect, another method of visual media processing is disclosed. The method includes performing a conversion between a video block of a visual media data and a bitstream representation of the visual media data; and during the conversion, determining whether to apply a predictive refinement using optical flow (PROF) relying on a control information, which is included or excluded in the bitstream representation based on a rule.

In yet another example aspect, a video encoding and/or decoding apparatus comprising a processor configured to implement an above described method is disclosed.

In yet another example aspect, a computer readable medium is disclosed. The computer readable medium stores processor executable code embodying one of the above described method.

These, and other, aspect are further described in the present document.

BRIEF DESCRIPTION OF DRAWINGS

FIG. 13 shows: (a) 135 degree partition type (splitting from top-left corner to bottom-right corner) (b) 45 degree splitting patterns.

FIG. 18 shows: (a) 4-parameter affine model (b) and 6-parameter affine model.

DETAILED DESCRIPTION

Figure 1:
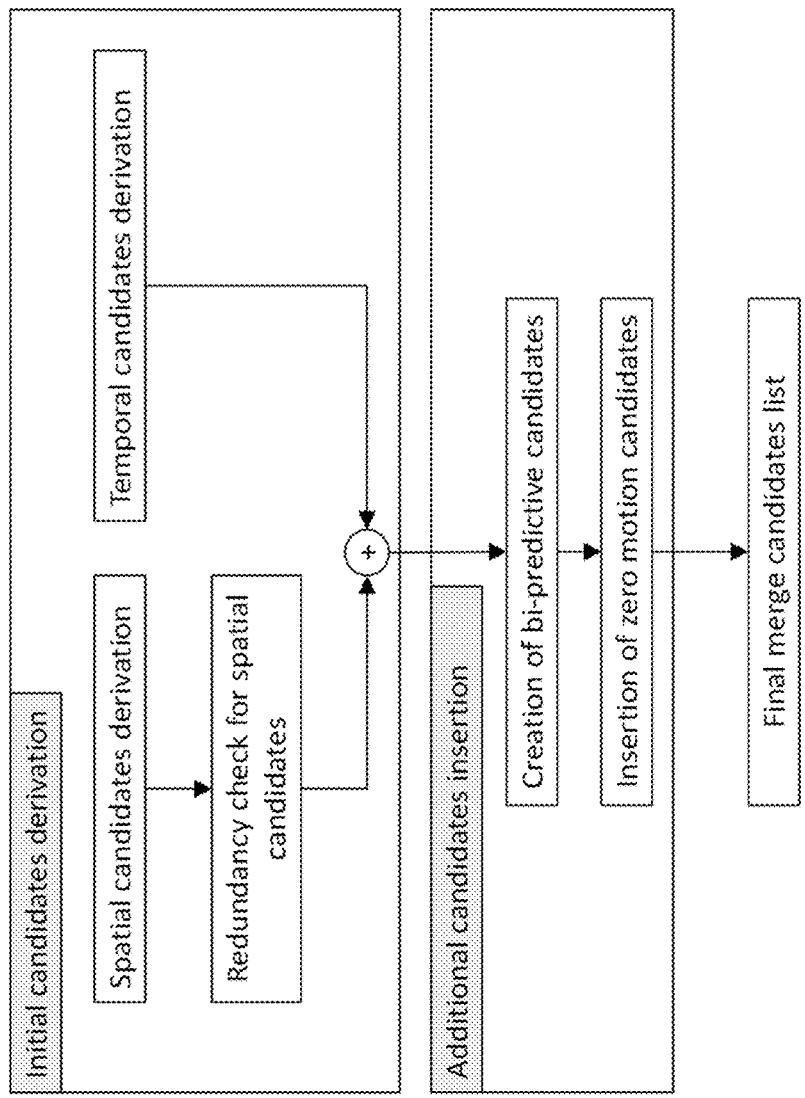
FIG. 1 depicts an example derivation process for merge candidates list construction.

Section headings are used in the present document to facilitate ease of understanding and do not limit the embodiments disclosed in a section to only that section. Furthermore, while certain embodiments are described with reference to Versatile Video Coding or other specific video codecs, the disclosed techniques are applicable to other video coding technologies also. Furthermore, while some embodiments describe video coding steps in detail, it will be understood that corresponding steps decoding that undo the coding will be implemented by a decoder. Furthermore, the term video processing encompasses video coding or compression, video decoding or decompression and video transcoding in which video pixels are represented from one compressed format into another compressed format or at a different compressed bitrate.

1. BRIEF INTRODUCTION

This document is related to video coding technologies. Specifically, it is related to motion vector coding in video coding. It may be applied to the existing video coding standard like HEVC, or the standard (Versatile Video Coding) to be finalized. It may be also applicable to future video coding standards or video codec.

2. INITIAL DISCUSSION

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM) [3,4]. In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

The latest version of VVC draft, i.e., Versatile Video Coding (Draft 5) could be found at: phenix.it-sudparis.eu/jvet/doc_end_user/documents/14_Geneva/wg11/JVET-N1001-v5.zip The latest reference software of VVC, named VTM, could be found at: vcgit.hhi.fraunhofer.de/jvetNVCSoftware_VTM/tags/VTM-5.0

2.1. Inter Prediction in HEVC/H.265

Each inter-predicted PU has motion parameters for one or two reference picture lists. Motion parameters include a motion vector and a reference picture index. Usage of one of the two reference picture lists may also be signalled using inter_pred_idc. Motion vectors may be explicitly coded as deltas relative to predictors.

When a CU is coded with skip mode, one PU is associated with the CU, and there are no significant residual coefficients, no coded motion vector delta or reference picture index. A merge mode is specified whereby the motion parameters for the current PU are obtained from neighbouring PUs, including spatial and temporal candidates. The merge mode can be applied to any inter-predicted PU, not only for skip mode. The alternative to merge mode is the explicit transmission of motion parameters, where motion vector (to be more precise, motion vector differences (MVD) compared to a motion vector predictor), corresponding reference picture index for each reference picture list and reference picture list usage are signalled explicitly per each PU. Such a mode is named Advanced motion vector prediction (AMVP) in this disclosure.

When signalling indicates that one of the two reference picture lists is to be used, the PU is produced from one block of samples. This is referred to as 'uni-prediction'. Uni-prediction is available both for P-slices and B-slices.

When signalling indicates that both of the reference picture lists are to be used, the PU is produced from two blocks of samples. This is referred to as 'bi-prediction'. Bi-prediction is available for B-slices only.

The following text provides the details on the inter prediction modes specified in HEVC. The description will start with the merge mode.

2.1.1. Reference Picture List

In HEVC, the term inter prediction is used to denote prediction derived from data elements (e.g., sample values or motion vectors) of reference pictures other than the current decoded picture. Like in H.264/AVC, a picture can be predicted from multiple reference pictures. The reference pictures that are used for inter prediction are organized in one or more reference picture lists. The reference index identifies which of the reference pictures in the list should be used for creating the prediction signal.

A single reference picture list, List 0, is used for a P slice and two reference picture lists, List 0 and List 1 are used for B slices. It should be noted reference pictures included in List 0/1 could be from past and future pictures in terms of capturing/display order.

2.1.2. Merge Mode 2.1.2.1. Derivation of Candidates for Merge Mode

When a PU is predicted using merge mode, an index pointing to an entry in the merge candidates list is parsed from the bitstream and used to retrieve the motion information. The construction of this list is specified in the HEVC standard and can be summarized according to the following sequence of steps:

Step 1: Initial candidates derivation
   Step 1.1: Spatial candidates derivation
   Step 1.2: Redundancy check for spatial candidates
   Step 1.3: Temporal candidates derivation
Step 2: Additional candidates insertion
   Step 2.1: Creation of bi-predictive candidates
   Step 2.2: Insertion of zero motion candidates These steps are also schematically depicted in FIG. 1. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates obtained from step 1 does not reach the maximum number of merge candidate (MaxNumMergeCand) which is signalled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

In the following, the operations associated with the aforementioned steps are detailed.

FIG. 1 shows an example derivation process for merge candidates list construction.

2.1.2.2. Spatial Candidates Derivation

Figure 2:
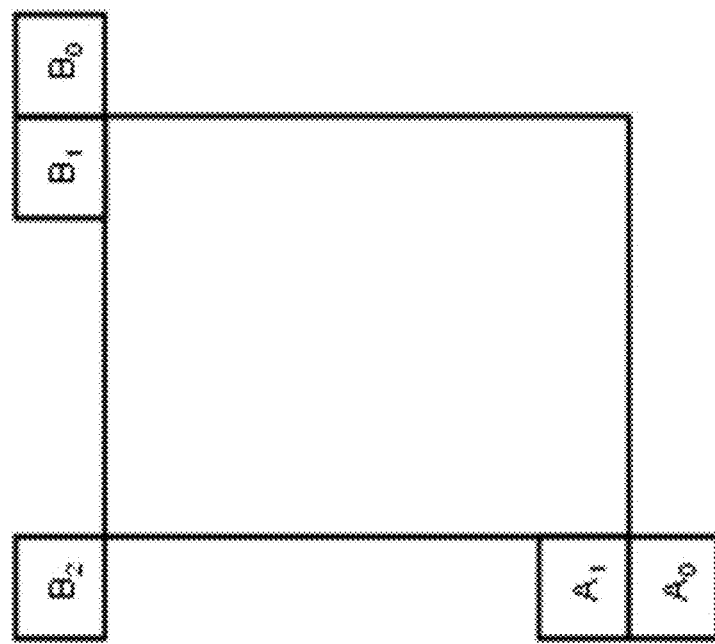
FIG. 2 shows examples of positions of spatial merge candidates.
Figure 3:
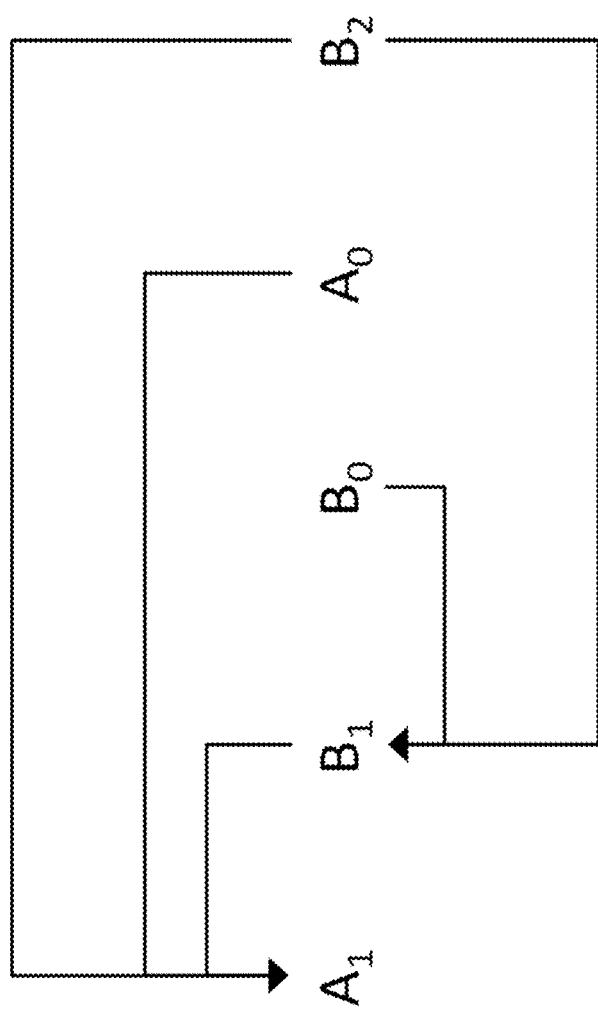
FIG. 3 shows examples of candidate pairs considered for redundancy check of spatial merge candidates.
Figure 4:
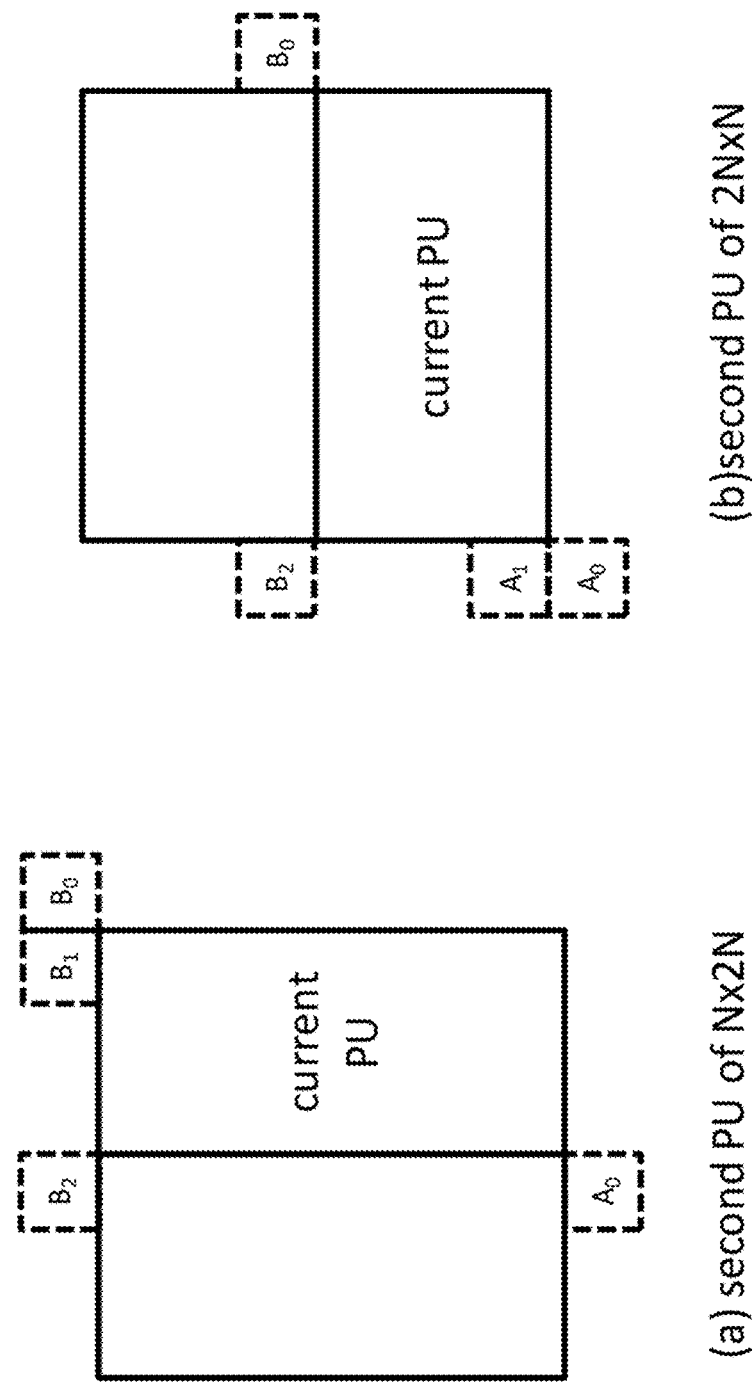
FIG. 4A-4B show example positions for the second PU of N×2N and 2N×N partitions.

In the derivation of spatial merge candidates, a maximum of four merge candidates are selected among candidates located in the positions depicted in FIG. 2. The order of derivation is $A_1$, $B_1$, $B_0$, $A_0$ and $B_2$. Position $B_2$ is considered only when any PU of position $A_1$, $B_1$, $B_0$, $A_0$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 3 are considered and a candidate is only added to the list if the corresponding candidate used for redundancy check has not the same motion information. Another source of duplicate motion information is the "second PU" associated with partitions different from 2N×2N. As an example, FIG. 4 depicts the second PU for the case of N×2N and 2N×N, respectively. When the current PU is partitioned as N×2N, candidate at position $A_1$ is not considered for list construction. In fact, by adding this candidate will lead to two prediction units having the same motion information, which is redundant to just have one PU in a coding unit. Similarly, position $B_1$ is not considered when the current PU is partitioned as 2N×N.

2.1.2.3. Temporal Candidates Derivation

In this step, only one candidate is added to the list. Particularly, in the derivation of this temporal merge candidate, a scaled motion vector is derived based on co-located PU belonging to the picture which has the smallest POC difference with current picture within the given reference picture list. The reference picture list to be used for derivation of the co-located PU is explicitly signalled in the slice header. The scaled motion vector for temporal merge candidate is obtained as illustrated by the dotted line in FIG. 5, which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. A practical realization of the scaling process is described in the HEVC specification. For a B-slice, two motion vectors, one is for reference picture list 0 and the other is for reference picture list 1, are obtained and combined to make the bi-predictive merge candidate.

Figure 5:
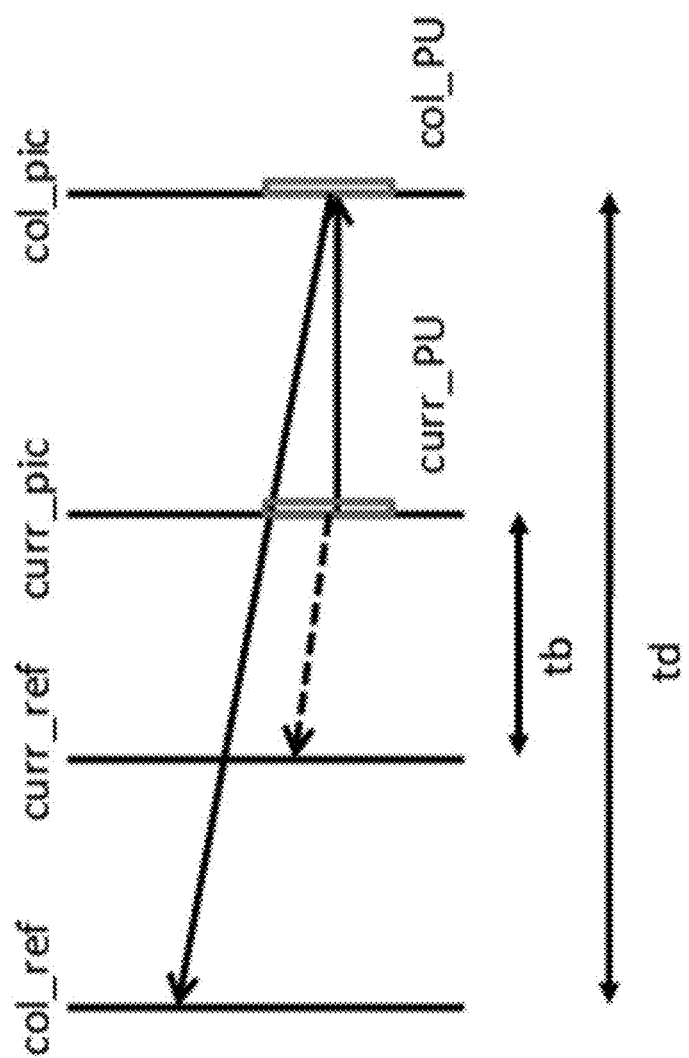
FIG. 5 is an illustration of motion vector scaling for temporal merge candidate.

FIG. 5 is an illustration of motion vector scaling for temporal merge candidate.

Figure 6:
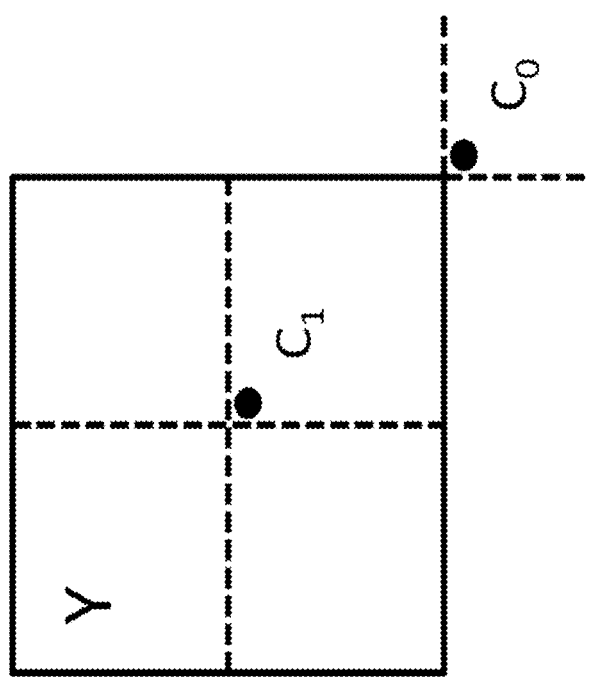
FIG. 6 shows examples of candidate positions for temporal merge candidate, C0 and C1.

In the co-located PU (Y) belonging to the reference frame, the position for the temporal candidate is selected between candidates $C_0$ and $C_1$, as depicted in FIG. 6. If PU at position $C_0$ is not available, is intra coded, or is outside of the current coding tree unit (CTU aka. LCU, largest coding unit) row, position C1 is used. Otherwise, position C0 is used in the derivation of the temporal merge candidate.

FIG. 6 shows examples of candidate positions for temporal merge candidate, C0 and C1.

2.1.2.4. Additional Candidates Insertion

Figure 7:
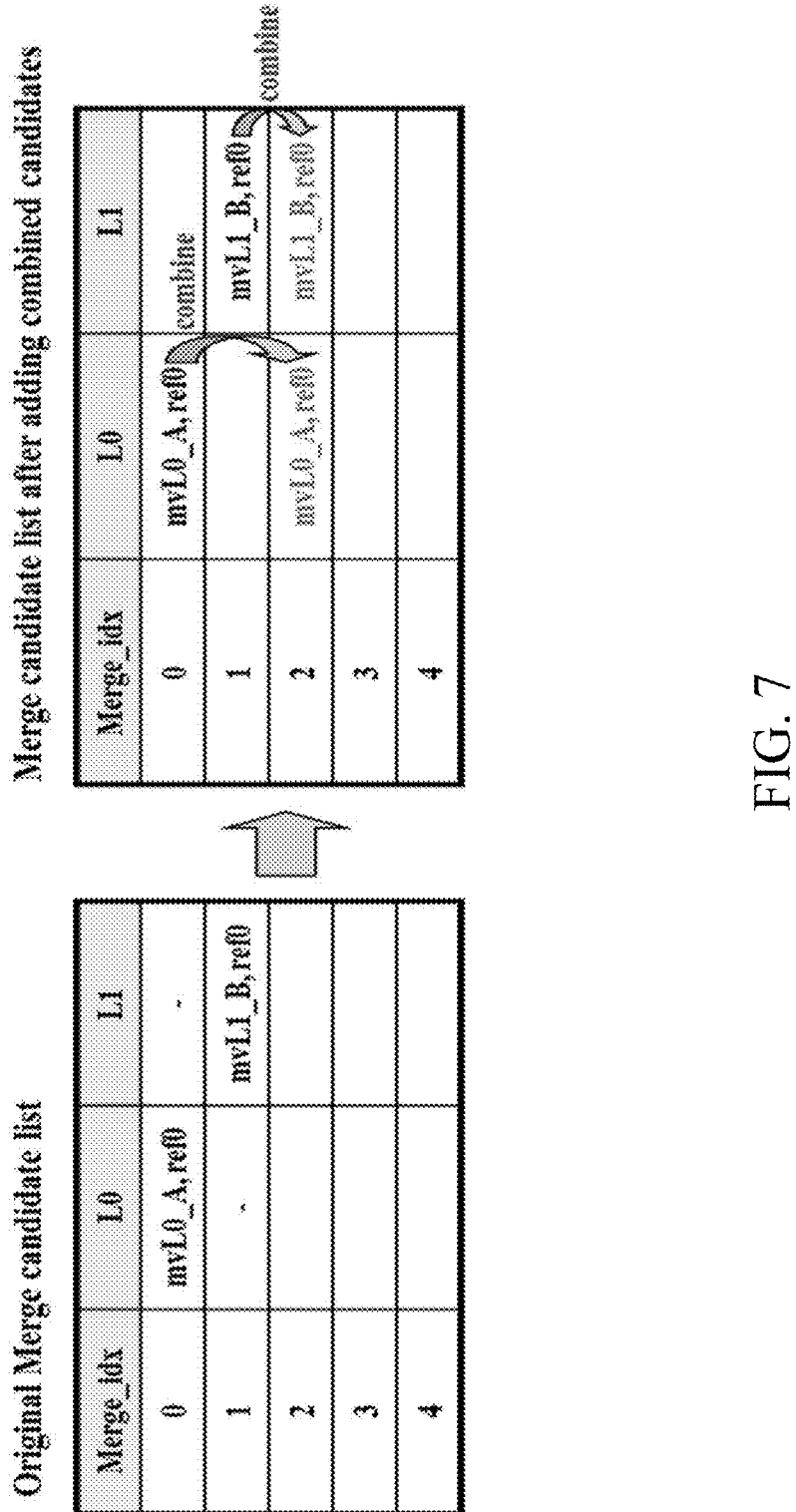
FIG. 7 shows an example of combined bi-predictive merge candidate.

Besides spatial and temporal merge candidates, there are two additional types of merge candidates: combined bi-predictive merge candidate and zero merge candidate. Combined bi-predictive merge candidates are generated by utilizing spatial and temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate. As an example, FIG. 7 depicts the case when two candidates in the original list (on the left), which have mvL0 and refIdxL0 or mal and refIdxL1, are used to create a combined bi-predictive merge candidate added to the final list (on the right). There are numerous rules regarding the combinations which are considered to generate these additional merge candidates.

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list.

More specifically, the following steps are performed in order till the merge list is full:
1. Set variable numRef to either number of reference picture associated with list 0 for P slice, or the minimum number of reference pictures in two lists for B slice;
2. Add non-repeated zero motion candidates:
   For variable i being 0 . . . numRef−1, add a default motion candidate with MV set to (0, 0) and reference picture index set to i for list 0 (if P slice), or for both lists (if B slice).
3. Add repeated zero motion candidates with MV set to (0, 0), reference picture index of list 0 set to 0 (if P slice) and reference picture indices of both lists set to 0 (if B slice).

Finally, no redundancy check is performed on these candidates.

2.1.3. AMVP

AMVP exploits spatio-temporal correlation of motion vector with neighbouring PUs, which is used for explicit transmission of motion parameters. For each reference picture list, a motion vector candidate list is constructed by firstly checking availability of left, above temporally neighbouring PU positions, removing redundant candidates and adding zero vector to make the candidate list to be constant length. Then, the encoder can select the best predictor from the candidate list and transmit the corresponding index indicating the chosen candidate. Similarly with merge index signalling, the index of the best motion vector candidate is encoded using truncated unary. The maximum value to be encoded in this case is 2 (see FIG. 8). In the following sections, details about derivation process of motion vector prediction candidate are provided.

2.1.3.1. Derivation of AMVP Candidates

Figure 8:
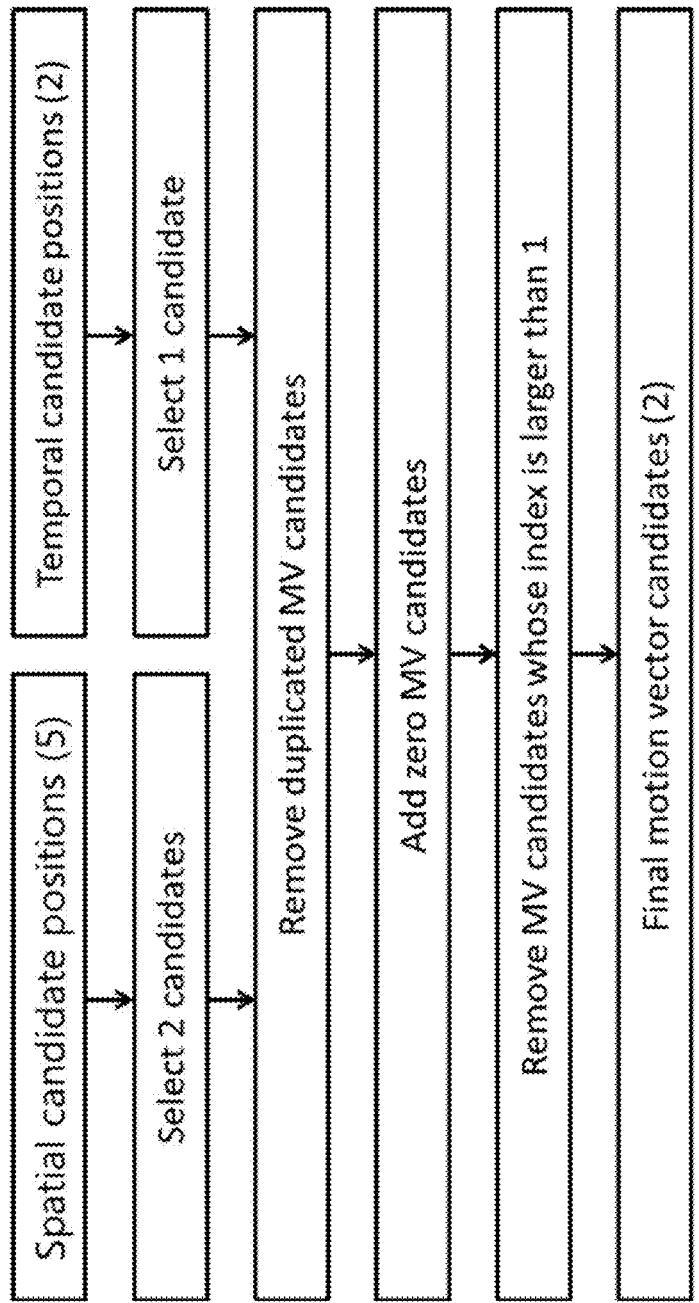
FIG. 8 summarizes derivation process for motion vector prediction candidate.

FIG. 8 summarizes derivation process for motion vector prediction candidate.

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as depicted in FIG. 2.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

2.1.3.2. Spatial Motion Vector Candidates

In the derivation of spatial motion vector candidates, a maximum of two candidates are considered among five potential candidates, which are derived from PUs located in positions as depicted in FIG. 2 those positions being the same as those of motion merge. The order of derivation for the left side of the current PU is defined as $A_0$, $A_1$, and scaled $A_0$, scaled $A_1$. The order of derivation for the above side of the current PU is defined as $B_0$, $B_1$, $B_2$, scaled $B_0$, scaled $B_1$, scaled $B_2$. For each side there are therefore four cases that can be used as motion vector candidate, with two cases not required to use spatial scaling, and two cases where spatial scaling is used. The four different cases are summarized as follows.

No spatial scaling
  (1) Same reference picture list, and same reference picture index (same POC)
  (2) Different reference picture list, but same reference picture (same POC)
Spatial scaling
  (3) Same reference picture list, but different reference picture (different POC)
  (4) Different reference picture list, and different reference picture (different POC)

The no-spatial-scaling cases are checked first followed by the spatial scaling. Spatial scaling is considered when the POC is different between the reference picture of the neighbouring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 9:
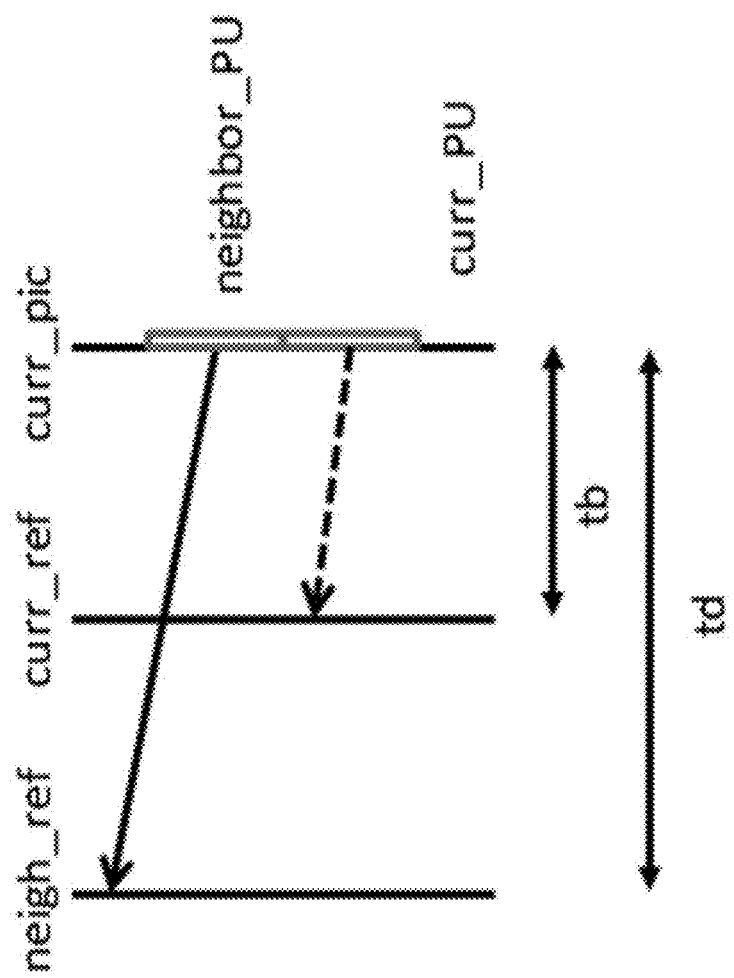
FIG. 9 shows an illustration of motion vector scaling for spatial motion vector candidate.

FIG. 9 is an illustration of motion vector scaling for spatial motion vector candidate.

In a spatial scaling process, the motion vector of the neighbouring PU is scaled in a similar manner as for temporal scaling, as depicted as FIG. 9. The main difference is that the reference picture list and index of current PU is given as input; the actual scaling process is the same as that of temporal scaling.

2.1.3.3. Temporal Motion Vector Candidates

Apart for the reference picture index derivation, all processes for the derivation of temporal merge candidates are the same as for the derivation of spatial motion vector candidates (see FIG. 6). The reference picture index is signalled to the decoder.

2.2. Sub-CU Based Motion Vector Prediction Methods in JEM

In the JEM with QTBT, each CU can have at most one set of motion parameters for each prediction direction. Two sub-CU level motion vector prediction methods are considered in the encoder by splitting a large CU into sub-CUs and deriving motion information for all the sub-CUs of the large CU. Alternative temporal motion vector prediction (ATMVP) method allows each CU to fetch multiple sets of motion information from multiple blocks smaller than the current CU in the collocated reference picture. In spatial-temporal motion vector prediction (STMVP) method motion vectors of the sub-CUs are derived recursively by using the temporal motion vector predictor and spatial neighbouring motion vector.

To preserve more accurate motion field for sub-CU motion prediction, the motion compression for the reference frames is currently disabled.

Figure 10:
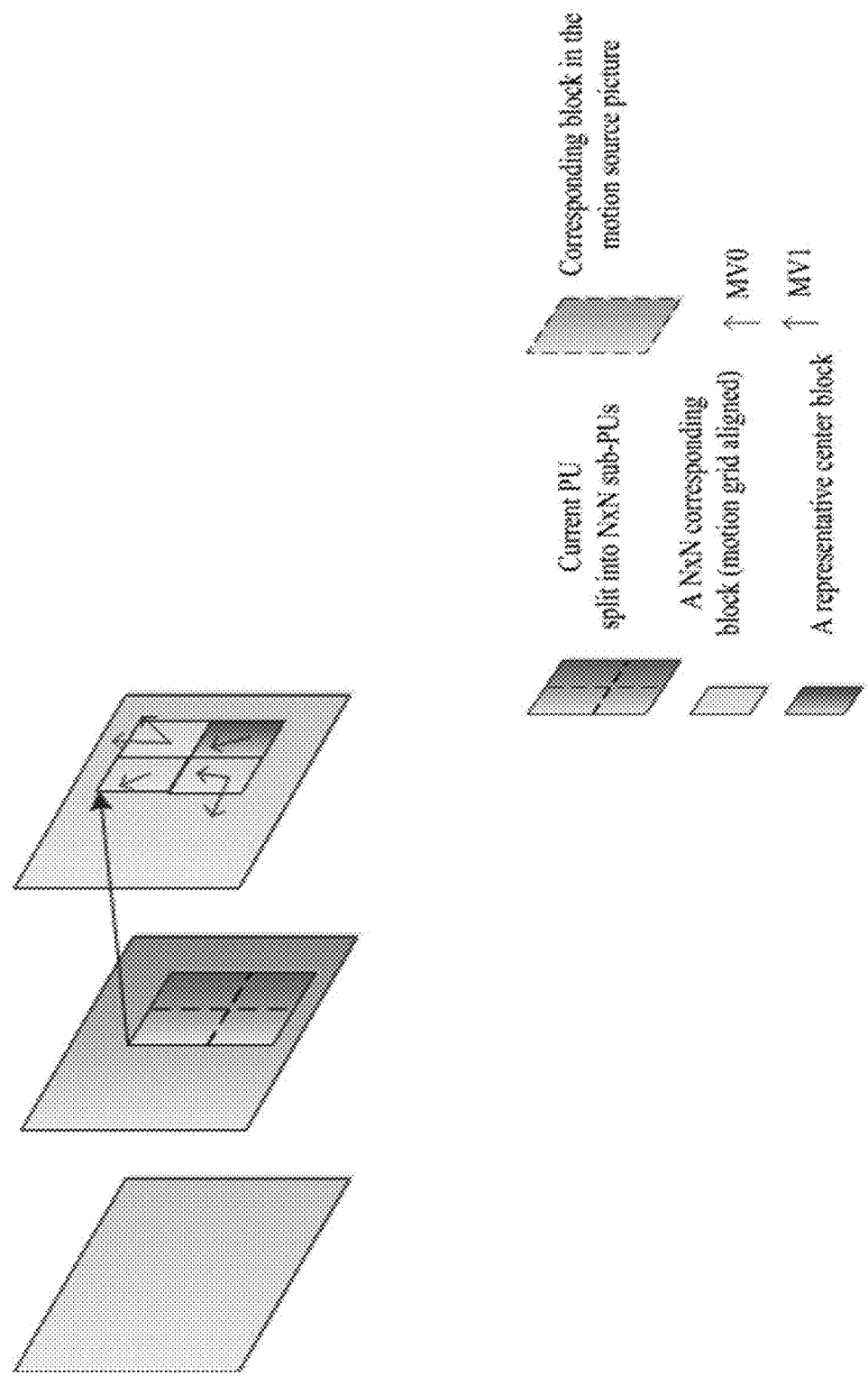
FIG. 10 shows an example of ATMVP motion prediction for a CU.

FIG. 10 shows an example of ATMVP motion prediction for a CU.

2.2.1. Alternative Temporal Motion Vector Prediction

In the alternative temporal motion vector prediction (ATMVP) method, the motion vectors temporal motion vector prediction (TMVP) is modified by fetching multiple sets of motion information (including motion vectors and reference indices) from blocks smaller than the current CU. The sub-CUs are square N×N blocks (N is set to 4 by default).

ATMVP predicts the motion vectors of the sub-CUs within a CU in two steps. The first step is to identify the corresponding block in a reference picture with a so-called temporal vector. The reference picture is called the motion source picture. The second step is to split the current CU into sub-CUs and obtain the motion vectors as well as the reference indices of each sub-CU from the block corresponding to each sub-CU.

In the first step, a reference picture and the corresponding block is determined by the motion information of the spatial neighbouring blocks of the current CU. To avoid the repetitive scanning process of neighbouring blocks, the first merge candidate in the merge candidate list of the current CU is used. The first available motion vector as well as its associated reference index are set to be the temporal vector and the index to the motion source picture. This way, in ATMVP, the corresponding block may be more accurately identified, compared with TMVP, wherein the corresponding block (sometimes called collocated block) is always in a bottom-right or center position relative to the current CU.

In the second step, a corresponding block of the sub-CU is identified by the temporal vector in the motion source picture, by adding to the coordinate of the current CU the temporal vector. For each sub-CU, the motion information of its corresponding block (the smallest motion grid that covers the center sample) is used to derive the motion information for the sub-CU. After the motion information of a corresponding N×N block is identified, it is converted to the motion vectors and reference indices of the current sub-CU, in the same way as TMVP of HEVC, wherein motion scaling and other procedures apply. For example, the decoder checks whether the low-delay condition (i.e. the POCs of all reference pictures of the current picture are smaller than the POC of the current picture) is fulfilled and possibly uses motion vector $MV_x$ (the motion vector corresponding to reference picture list X) to predict motion vector $MV_y$ (with X being equal to 0 or 1 and Y being equal to 1−X) for each sub-CU.

2.2.2. Spatial-Temporal Motion Vector Prediction (STMVP)

Figure 11:
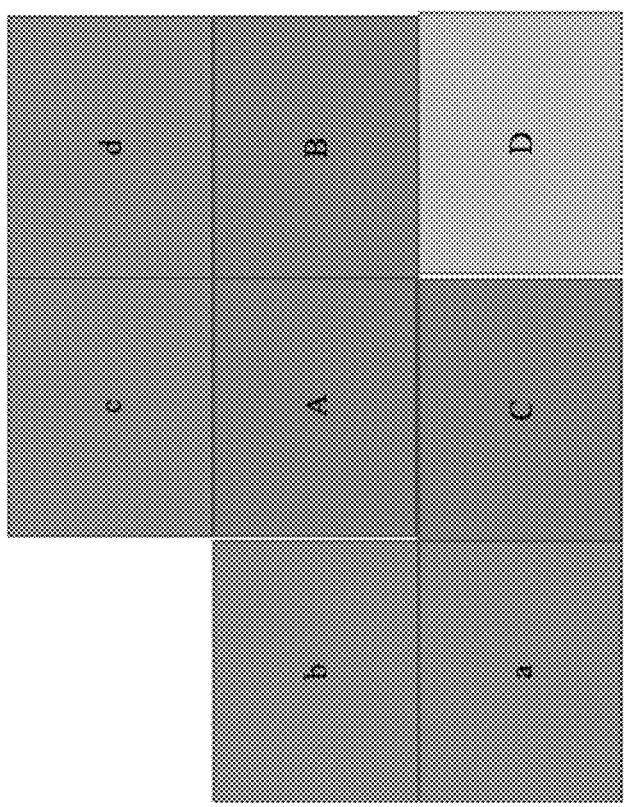
FIG. 11 shows an example of one CU with four sub-blocks (A-D) and its neighbouring blocks (a-d).

In this method, the motion vectors of the sub-CUs are derived recursively, following raster scan order. FIG. 11 illustrates this concept. Let us consider an 8×8 CU which contains four 4×4 sub-CUs A, B, C, and D. The neighbouring 4×4 blocks in the current frame are labelled as a, b, c, and d.

The motion derivation for sub-CU A starts by identifying its two spatial neighbours. The first neighbour is the N×N block above sub-CU A (block c). If this block c is not available or is intra coded the other N×N blocks above sub-CU A are checked (from left to right, starting at block c). The second neighbour is a block to the left of the sub-CU A (block b). If block b is not available or is intra coded other blocks to the left of sub-CU A are checked (from top to bottom, staring at block b). The motion information obtained from the neighbouring blocks for each list is scaled to the first reference frame for a given list. Next, temporal motion vector predictor (TMVP) of sub-block A is derived by following the same procedure of TMVP derivation as specified in HEVC. The motion information of the collocated block at location D is fetched and scaled accordingly. Finally, after retrieving and scaling the motion information, all available motion vectors (up to 3) are averaged separately for each reference list. The averaged motion vector is assigned as the motion vector of the current sub-CU.

2.2.3. Sub-CU Motion Prediction Mode Signalling

The sub-CU modes are enabled as additional merge candidates and there is no additional syntax element required to signal the modes. Two additional merge candidates are added to merge candidates list of each CU to represent the ATMVP mode and STMVP mode. Up to seven merge candidates are used, if the sequence parameter set indicates that ATMVP and STMVP are enabled. The encoding logic of the additional merge candidates is the same as for the merge candidates in the HM, which means, for each CU in P or B slice, two more RD checks is needed for the two additional merge candidates.

In the JEM, all bins of merge index is context coded by CABAC. While in HEVC, only the first bin is context coded and the remaining bins are context by-pass coded.

2.3. Inter Prediction Methods in VVC

There are several new coding tools for inter prediction improvement, such as Adaptive motion vector difference resolution (AMVR) for signaling MVD, affine prediction mode, Triangular prediction mode (TPM), ATMVP, Generalized Bi-Prediction (GBI), Bi-directional Optical flow (BIO).

2.3.1. Adaptive Motion Vector Difference Resolution

In HEVC, motion vector differences (MVDs) (between the motion vector and predicted motion vector of a PU) are signalled in units of quarter luma samples when use_integer_mv_flag is equal to 0 in the slice header. In the VVC, a locally adaptive motion vector resolution (LAMVR or AMVR shortly) is introduced. In the VVC, MVD can be coded in units of quarter luma samples, integer luma samples or four luma samples (i.e., ¼-pel, 1-pel, 4-pel). The MVD resolution is controlled at the coding unit (CU) level, and MVD resolution flags are conditionally signalled for each CU that has at least one non-zero MVD components.

For a CU that has at least one non-zero MVD components, a first flag is signalled to indicate whether quarter luma sample MV precision is used in the CU. When the first flag (equal to 1) indicates that quarter luma sample MV precision is not used, another flag is signalled to indicate whether integer luma sample MV precision or four luma sample MV precision is used.

When the first MVD resolution flag of a CU is zero, or not coded for a CU (meaning all MVDs in the CU are zero), the quarter luma sample MV resolution is used for the CU. When a CU uses integer-luma sample MV precision or four-luma-sample MV precision, the MVPs in the AMVP candidate list for the CU are rounded to the corresponding precision.

In the encoder, CU-level RD checks are used to determine which MVD resolution is to be used for a CU. That is, the CU-level RD check is performed three times for each MVD resolution. To accelerate encoder speed, the following encoding schemes are applied in the JEM.

During RD check of a CU with normal quarter luma sample MVD resolution, the motion information of the current CU (integer luma sample accuracy) is stored. The stored motion information (after rounding) is used as the starting point for further small range motion vector refinement during the RD check for the same CU with integer luma sample and 4 luma sample MVD resolution so that the time-consuming motion estimation process is not duplicated three times.

RD check of a CU with 4 luma sample MVD resolution is conditionally invoked. For a CU, when RD cost integer luma sample MVD resolution is much larger than that of quarter luma sample MVD resolution, the RD check of 4 luma sample MVD resolution for the CU is skipped.

Figure 12:
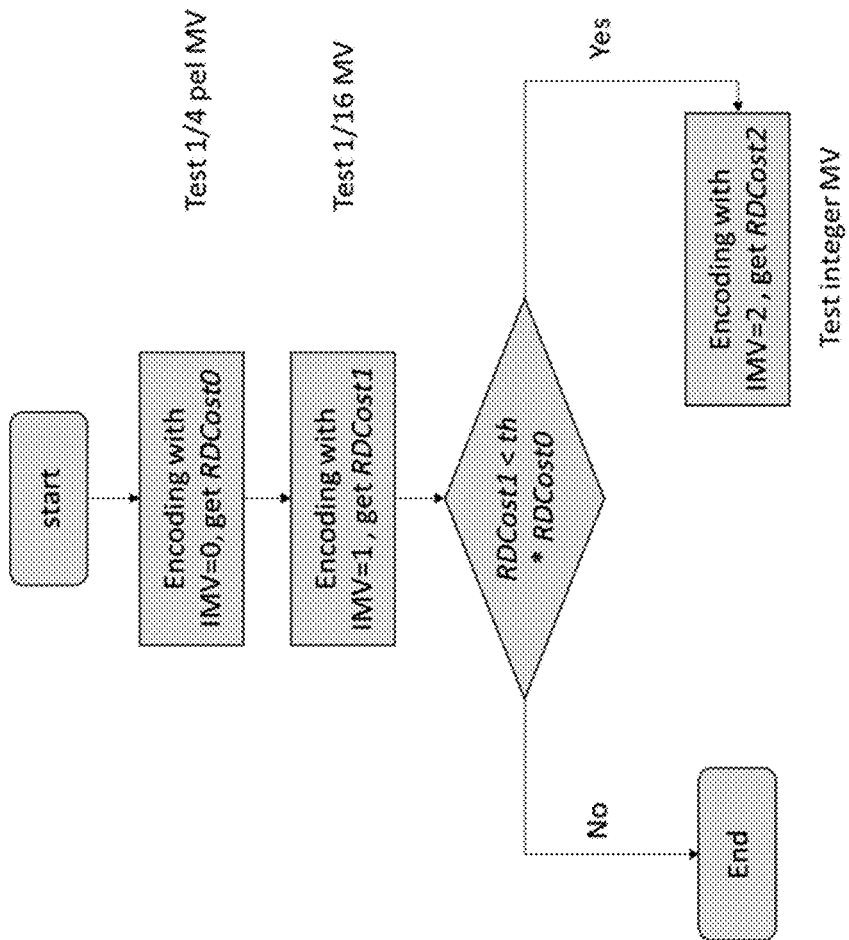
FIG. 12 is an example flowchart of encoding with different MV precision.

The encoding process is shown in FIG. 12. First, ¼ pel MV is tested and the RD cost is calculated and denoted as RDCost0, then integer MV is tested and the RD cost is denoted as RDCost1. If RDCost1<th*RDCost0 (wherein th is a positive value), then 4-pel MV is tested; otherwise, 4-pel MV is skipped. Basically, motion information and RD cost etc. are already known for ¼ pel MV when checking integer or 4-pel MV, which can be reused to speed up the encoding process of integer or 4-pel MV.

In VVC, AMVR can also be applied to affine prediction mode, where the resolutions can be chosen from 1/16-pel, ¼-pel and 1-pel.

FIG. 12 is a flowchart of encoding with different MV precision.

2.3.2. Triangular Prediction Mode

The concept of the triangular prediction mode (TPM) is to introduce a new triangular partition for motion compensated prediction. As shown in FIG. 13, it splits a CU into two triangular prediction units, in either diagonal or inverse diagonal direction. Each triangular prediction unit in the CU is inter-predicted using its own uni-prediction motion vector and reference frame index which are derived from a single uni-prediction candidate list. An adaptive weighting process is performed to the diagonal edge after predicting the triangular prediction units. Then, the transform and quantization process are applied to the whole CU. It is noted that this mode is only applied to merge mode (note: skip mode is treated as a special merge mode).

2.3.2.1. Uni-Prediction Candidate List for TPM

Figure 14:
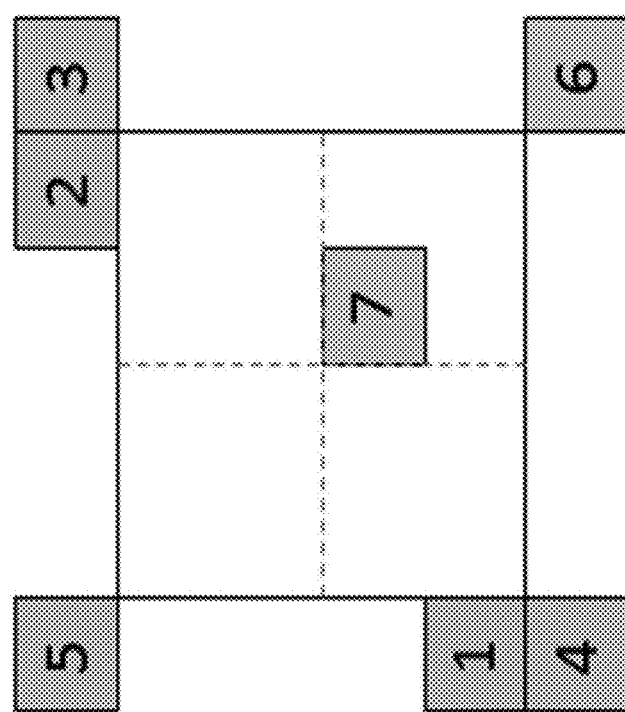
FIG. 14 shows example position of the neighboring blocks.

The uni-prediction candidate list, named TPM motion candidate list, consists of five uni-prediction motion vector candidates. It is derived from seven neighboring blocks including five spatial neighboring blocks (1 to 5) and two temporal co-located blocks (6 to 7), as shown in FIG. 14. The motion vectors of the seven neighboring blocks are collected and put into the uni-prediction candidate list according in the order of uni-prediction motion vectors, L0 motion vector of bi-prediction motion vectors, L1 motion vector of bi-prediction motion vectors, and averaged motion vector of the L0 and L1 motion vectors of bi-prediction motion vectors. If the number of candidates is less than five, zero motion vector is added to the list. Motion candidates added in this list for TPM are called TPM candidates, motion information derived from spatial/temporal blocks are called regular motion candidates.

More specifically, the following steps are involved:
1) Obtain regular motion candidates from $A_1$, $B_1$, $B_0$, $A_0$, $B_2$, Col and Col2 (corresponding to block 1-7 in FIG. 14) with full pruning operations when adding a regular motion candidate from spatial neighboring blocks.
2) Set variable numCurrMergeCand=0
3) For each regular motion candidates derived from $A_1$, $B_1$, $B_0$, $A_0$, $B_2$, Col and Col2, if not pruned and numCurrMergeCand is less than 5, if the regular motion candidate is uni-prediction (either from List 0 or List 1), it is directly added to the merge list as an TPM candidate with numCurrMergeCand increased by 1. Such a TPM candidate is named 'originally uni-predicted candidate'.

Full pruning is applied.
4) For each motion candidates derived from $A_1$, $B_1$, $B_0$, $A_0$, $B_2$, Col and Col2, if not pruned, and num-CurrMergeCand is less than 5, if the regular motion candidate is bi-prediction, the motion information from List 0 is added to the TPM merge list (that is, modified to be uni-prediction from List 0) as a new TPM candidate and numCurrMergeCand increased by 1. Such a TPM candidate is named 'Truncated List0-predicted candidate'.

Full pruning is applied.
5) For each motion candidates derived from $A_1$, $B_1$, $B_0$, $A_0$, $B_2$, Col and Col2, if not pruned, and num-CurrMergeCand is less than 5, if the regular motion candidate is bi-prediction, the motion information from List 1 is added to the TPM merge list (that is, modified to be uni-prediction from List 1) and numCurrMergeCand increased by 1. Such a TPM candidate is named 'Truncated List1-predicted candidate'.

Full pruning is applied.
6) For each motion candidates derived from $A_1$, $B_1$, $B_0$, $A_0$, $B_2$, Col and Col2, if not pruned, and num-CurrMergeCand is less than 5, if the regular motion candidate is bi-prediction, If List 0 reference picture's slice QP is smaller than List 1 reference picture's slice QP, the motion information of List 1 is firstly scaled to List 0 reference picture, and the average of the two MVs (one is from original List 0, and the other is the scaled MV from List 1) is added to the TPM merge list, such a candidate is called averaged uni-prediction from List 0 motion candidate and numCurrMergeCand increased by 1.

Otherwise, the motion information of List 0 is firstly scaled to List 1 reference picture, and the average of the two MVs (one is from original List 1, and the other is the scaled MV from List 0) is added to the TPM merge list, such a TPM candidate is called averaged uni-prediction from List 1 motion candidate and numCurrMergeCand increased by 1.

Full pruning is applied.
7) If numCurrMergeCand is less than 5, zero motion vector candidates are added.

FIG. 14 shows example position of the neighboring blocks.

When inserting a candidate to the list, if it has to be compared to all previously added candidates to see whether it is identical to one of them, such a process is called full pruning.

2.3.2.2. Adaptive Weighting Process

After predicting each triangular prediction unit, an adaptive weighting process is applied to the diagonal edge between the two triangular prediction units to derive the final prediction for the whole CU. Two weighting factor groups are defined as follows:

$1^{st}$ weighting factor group: {7/8, 6/8, 4/8, 2/8, 1/8} and {7/8, 4/8, 1/8} are used for the luminance and the chrominance samples, respectively;

$2^{nd}$ weighting factor group: {7/8, 6/8, 5/8, 4/8, 3/8, 2/8, 1/8} and {6/8, 4/8, 2/8} are used for the luminance and the chrominance samples, respectively.

Figure 15:
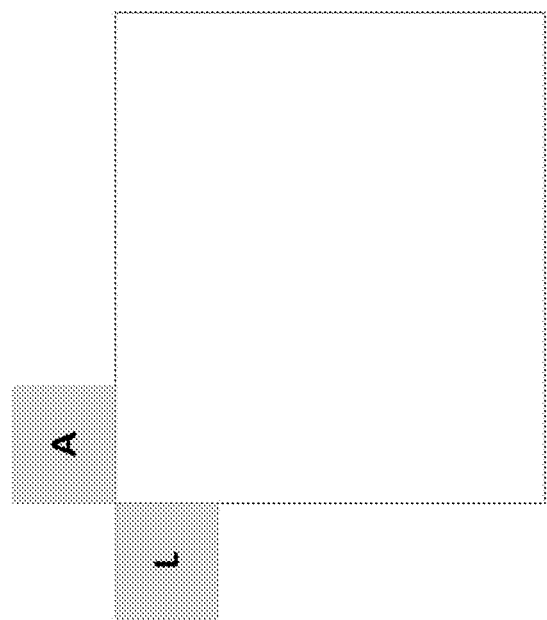
FIG. 15 shows neighboring blocks (A and L) used for context selection in TPM flag coding.

Weighting factor group is selected based on the comparison of the motion vectors of two triangular prediction units. The $2^{nd}$ weighting factor group is used when the reference pictures of the two triangular prediction units are different from each other or their motion vector difference is larger than 16 pixels. Otherwise, the $1^{st}$ weighting factor group is used. An example is shown in FIG. 15.

2.3.2.3. Signaling of Triangular Prediction Mode (TPM)

One bit flag to indicate whether TPM is used may be firstly signaled. Afterwards, the indications of two splitting patterns (as depicted in FIG. 13), and selected merge indices for each of the two partitions are further signaled.

2.3.2.3.1. Signaling of TPM Flag

Let's denote one luma block's width and height by W and H, respectively. If W*H<64, triangular prediction mode is disabled.

When one block is coded with affine mode, triangular prediction mode is also disabled.

When one block is coded with merge mode, one bit flag may be signaled to indicate whether the triangular prediction mode is enabled or disabled for the block.

The flag is coded with 3 contexts, based on the following equation:

Ctx index=((left block $L$ available && $L$ is coded with TPM?)1:0)+((Above block $A$ available && $A$ is coded with TPM?)1:0);

FIG. 15 shows neighboring blocks (A and L) used for context selection in TPM flag coding.

2.3.2.3.2. Signaling of an Indication of Two Splitting Patterns (as Depicted FIG. 13), and Selected Merge Indices for Each of the Two Partitions It is noted that splitting patterns, merge indices of two partitions are jointly coded. In some implementations, it is restricted that the two partitions couldn't use the same reference index. Therefore, there are 2 (splitting patterns)*N (maximum number of merge candidates)*(N−1) possibilities wherein N is set to 5. One indication is coded and the mapping between the splitting patterns, two merge indices and coded indication are derived from the array defined below:

```
const uint8_t g_TriangleCombina-
  tion[TRIANGLE_MAX_NUM_CANDS][3] = {
{ 0, 1, 0 }, { 1, 0, 1 }, { 1, 0, 2 }, { 0, 0, 1 }, { 0, 2, 0 },
{ 1, 0, 3 }, { 1, 0, 4 }, { 1, 1, 0 }, { 0, 3, 0 }, { 0, 4, 0 },
{ 0, 0, 2 }, { 0, 1, 2 }, { 1, 1, 2 }, { 0, 0, 4 }, { 0, 0, 3 },
{ 0, 1, 3 }, { 0, 1, 4 }, { 1, 1, 4 }, { 1, 1, 3 }, { 1, 2, 1 },
{ 1, 2, 0 }, { 0, 2, 1 }, { 0, 4, 3 }, { 1, 3, 0 }, { 1, 3, 2 },
{ 1, 3, 4 }, { 1, 4, 0 }, { 1, 3, 1 }, { 1, 2, 3 }, { 1, 4, 1 },
{ 0, 4, 1 }, { 0, 2, 3 }, { 1, 4, 2 }, { 0, 3, 2 }, { 1, 4, 3 },
{ 0, 3, 1 }, { 0, 2, 4 }, { 1, 2, 4 }, { 0, 4, 2 }, { 0, 3, 4 }};
``` splitting patterns (45 degree or 135 degree)=g_TriangleCombination[signaled indication][0];

Merge index of candidate $A$=g_TriangleCombination [signaled indication][1];

Merge index of candidate $B$=g_TriangleCombination [signaled indication][2];

Once the two motion candidates A and B are derived, the two partitions' (PU1 and PU2) motion information could be set either from A or B. Whether PU1 uses the motion information of merge candidate A or B is dependent on the prediction directions of the two motion candidates. Table 1 shows the relationship between two derived motion candidates A and B, with the two partitions.

TABLE 1

Derivation of partitions' motion information from derived two merge candidates (A, B)

| Prediction direction of A | Prediction direction of B | PU1's motion information | PU2's motion information |
| --- | --- | --- | --- |
| L0 | L0 | A (L1) | B (L0) |
| L1 | L1 | B (L1) | A (L1) |

TABLE 1-continued

Derivation of partitions' motion information from derived two merge candidates (A, B)

| Prediction direction of A | Prediction direction of B | PU1's motion information | PU2's motion information |
| --- | --- | --- | --- |
| L0 | L1 | A (L0) | B (L1) |
| L1 | L0 | B (L0) | A (L1) |

2.3.2.3.3. Entropy Coding of the Indication (Denoted by merge_triangle_idx)

merge_triangle_idx is within the range [0, 39], inclusively. K-th order Exponential Golomb (EG) code is used for binarization of merge_triangle_idx wherein K is set to 1.

K-th Order EG

To encode larger numbers in fewer bits (at the expense of using more bits to encode smaller numbers), this can be generalized using a nonnegative integer parameter k. To encode a nonnegative integer x in an order-k exp-Golomb code:

1. Encode $[x/2^k]$ using order-0 exp-Golomb code described above, then
2. Encode x mod $2^k$ in binary

TABLE 2

Exp-Golomb-k coding examples

| x | k = 0 | k = 1 | k = 2 |
| --- | --- | --- | --- |
| 0 | 1 | 10 | 100 |
| 1 | 010 | 11 | 101 |
| 2 | 011 | 0100 | 110 |
| 3 | 00100 | 0101 | 111 |
| 4 | 00101 | 0110 | 01000 |
| 5 | 00110 | 0111 | 01001 |
| 6 | 00111 | 001000 | 01010 |
| 7 | 0001000 | 001001 | 01011 |
| 8 | 0001001 | 001010 | 01100 |
| 9 | 0001010 | 001011 | 01101 |
| 10 | 0001011 | 001100 | 01110 |
| 11 | 0001100 | 001101 | 01111 |
| 12 | 0001101 | 001110 | 0010000 |
| 13 | 0001110 | 001111 | 0010001 |
| 14 | 0001111 | 00010000 | 0010010 |
| 15 | 000010000 | 00010001 | 0010011 |
| 16 | 000010001 | 00010010 | 0010100 |
| 17 | 000010010 | 00010011 | 0010101 |
| 18 | 000010011 | 00010100 | 0010110 |
| 19 | 000010100 | 00010101 | 0010111 |

2.3.3. Affine Motion Compensation Prediction

In HEVC, only translation motion model is applied for motion compensation prediction (MCP). While in the real world, there are many kinds of motion, e.g. zoom in/out, rotation, perspective motions and the other irregular motions. In VVC, a simplified affine transform motion compensation prediction is applied with 4-parameter affine model and 6-parameter affine model. As shown FIG. 16, the affine motion field of the block is described by two control point motion vectors (CPMVs) for the 4-parameter affine model and 3 CPMVs for the 6-parameter affine model.

Figure 16:
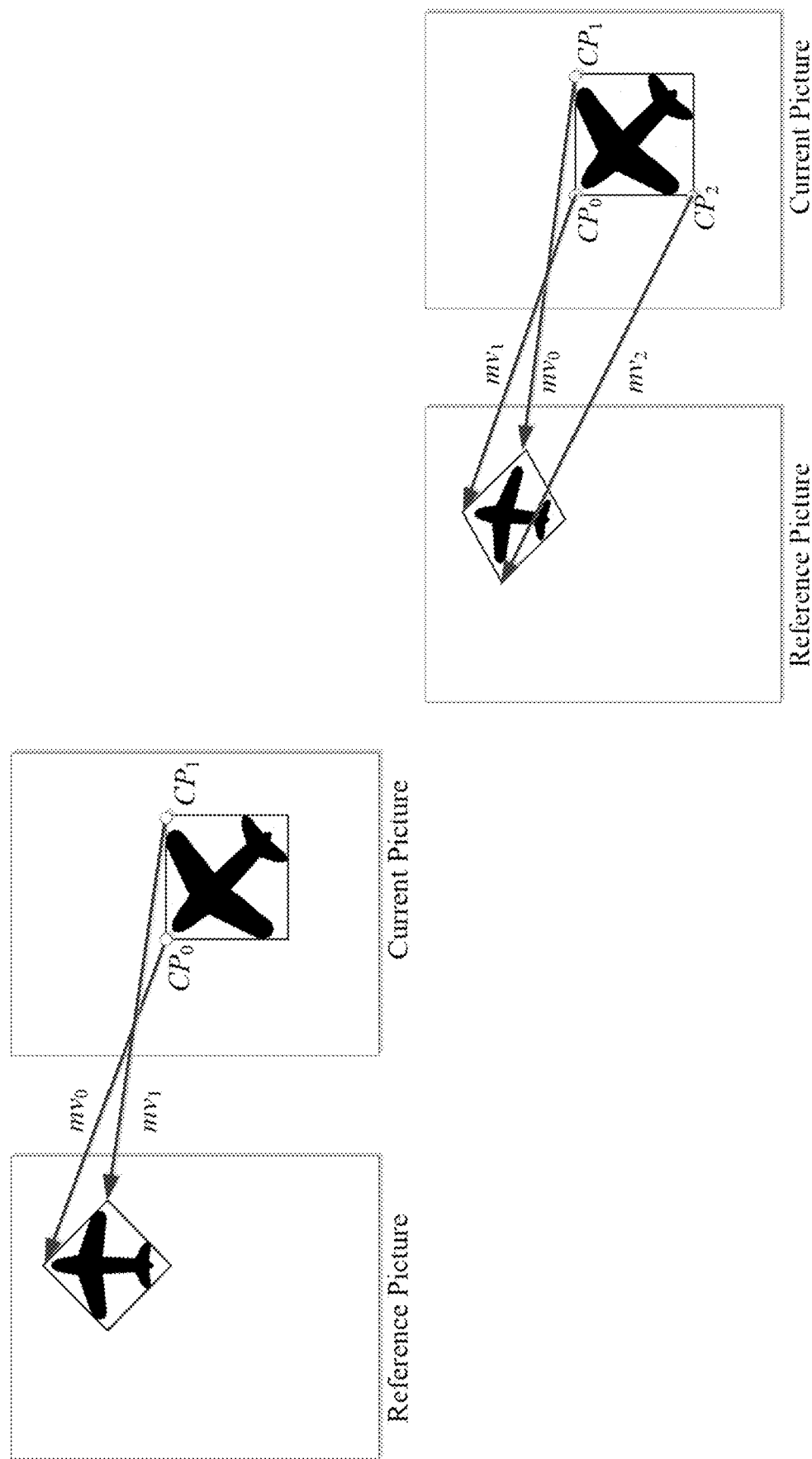
FIG. 16 shows (a) 4-parameter affine and (b) 6-parameter affine models.

FIG. 16 shows examples of Simplified affine motion models.

The motion vector field (MVF) of a block is described by the following equations with the 4-parameter affine model (wherein the 4-parameter are defined as the variables a, b, e and f) in equation (1) and 6-parameter affine model (wherein the 4-parameter are defined as the variables a, b, c, d, e and f) in equation (2) respectively:

$$\begin{cases} mv^h(x,y) = ax - by + e = \dfrac{(mv_1^h - mv_0^h)}{v}x - \dfrac{(mv_1^v - mv_0^v)}{w}y + mv_0^h \\ mv^v(x,y) = bx + ay + f = \dfrac{(mv_1^v - mv_0^v)}{w}x + \dfrac{(mv_1^h - mv_0^h)}{w}y + mv_0^v \end{cases} \quad (1)$$

$$\begin{cases} mv^h(x,y) = ax + cy + e = \dfrac{(mv_1^h - mv_0^h)}{w}x + \dfrac{(mv_2^h - mv_0^h)}{h}y + mv_0^h \\ mv^v(x,y) = bx + dy + f = \dfrac{(mv_1^v - mv_0^v)}{w}x + \dfrac{(mv_2^v - mv_0^v)}{h}y + mv_0^v \end{cases} \quad (2)$$

where ($mv^h_0$, $mv^v_0$) is motion vector of the top-left corner control point, and ($mv^h_1$, $mv^v_1$) is motion vector of the top-right corner control point and ($mv^h_2$, $mv^v_2$) is motion vector of the bottom-left corner control point, all of the three motion vectors are called control point motion vectors (CPMV), (x,y) represents the coordinate of a representative point relative to the top-left sample within current block and ($mv^h(x,y)$, $mv^v(x,y)$) is the motion vector derived for a sample located at (x,y). The CP motion vectors may be signaled (like in the affine AMVP mode) or derived on-the-fly (like in the affine merge mode). w and h are the width and height of the current block. In practice, the division is implemented by right-shift with a rounding operation. In VTM, the representative point is defined to be the center position of a sub-block, e.g., when the coordinate of the left-top corner of a sub-block relative to the top-left sample within current block is (xs, ys), the coordinate of the representative point is defined to be (xs+2, ys+2). For each sub-block (i.e., 4×4 in VTM), the representative point is utilized to derive the motion vector for the whole sub-block.

Figure 17:
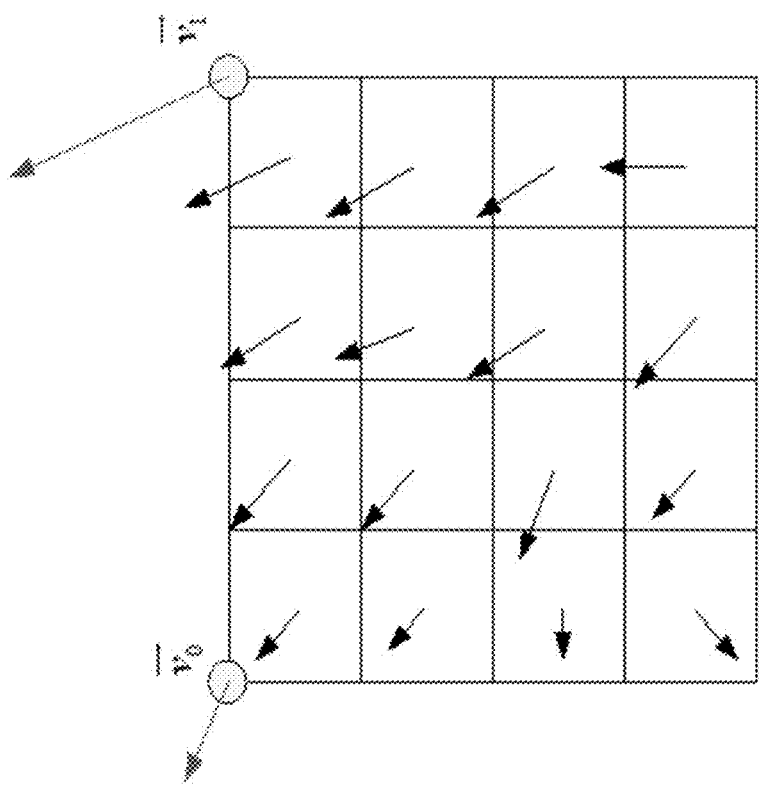
FIG. 17 shows an example of Affine MVF per sub-block.

In order to further simplify the motion compensation prediction, sub-block based affine transform prediction is applied. To derive motion vector of each M×N (both M and N are set to 4 in current VVC) sub-block, the motion vector of the center sample of each sub-block, as shown in FIG. 17, is calculated according to Equation (1) and (2), and rounded to 1/16 fraction accuracy. Then the motion compensation interpolation filters for 1/16-pel are applied to generate the prediction of each sub-block with derived motion vector. The interpolation filters for 1/16-pel are introduced by the affine mode.

After MCP, the high accuracy motion vector of each sub-block is rounded and saved as the same accuracy as the normal motion vector.

2.3.3.1. Signaling of Affine Prediction

Similar to the translational motion model, there are also two modes for signaling the side information due affine prediction. They are AFFINE_INTER and AFFINE_MERGE modes.

2.3.3.2. AF_INTER Mode

For CUs with both width and height larger than 8, AF_INTER mode can be applied. An affine flag in CU level is signalled in the bitstream to indicate whether AF_INTER mode is used.

In this mode, for each reference picture list (List 0 or List 1), an affine AMVP candidate list is constructed with three types of affine motion predictors in the following order, wherein each candidate includes the estimated CPMVs of the current block. The differences of the best CPMVs found at the encoder side (such as $mv_0$ $mv_1$ $mv_2$ in FIG. 20) and the estimated CPMVs are signalled. In addition, the index of affine AMVP candidate from which the estimated CPMVs are derived is further signalled.

1) Inherited Affine Motion Predictors

Figure 19:
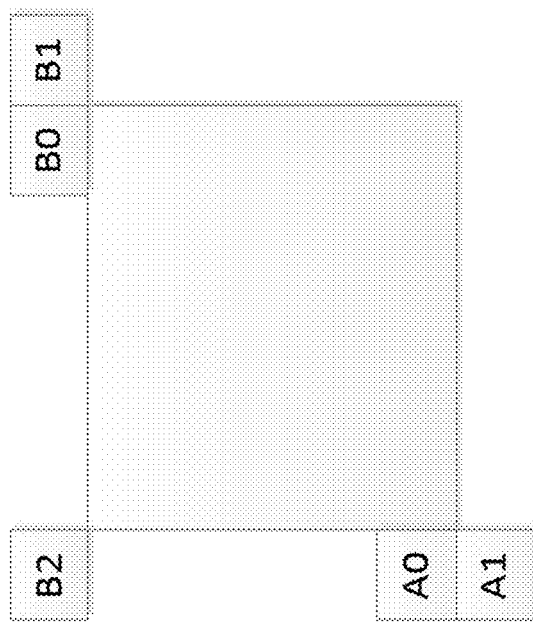
FIG. 19 shows MVP for AF_INTER for inherited affine candidates.

The checking order is similar to that of spatial MVPs in HEVC AMVP list construction. First, a left inherited affine motion predictor is derived from the first block in {A1, A0} that is affine coded and has the same reference picture as in current block. Second, an above inherited affine motion predictor is derived from the first block in {B1, B0, B2} that is affine coded and has the same reference picture as in current block. The five blocks A1, A0, B1, B0, B2 are depicted in FIG. 19.

Figure 21:
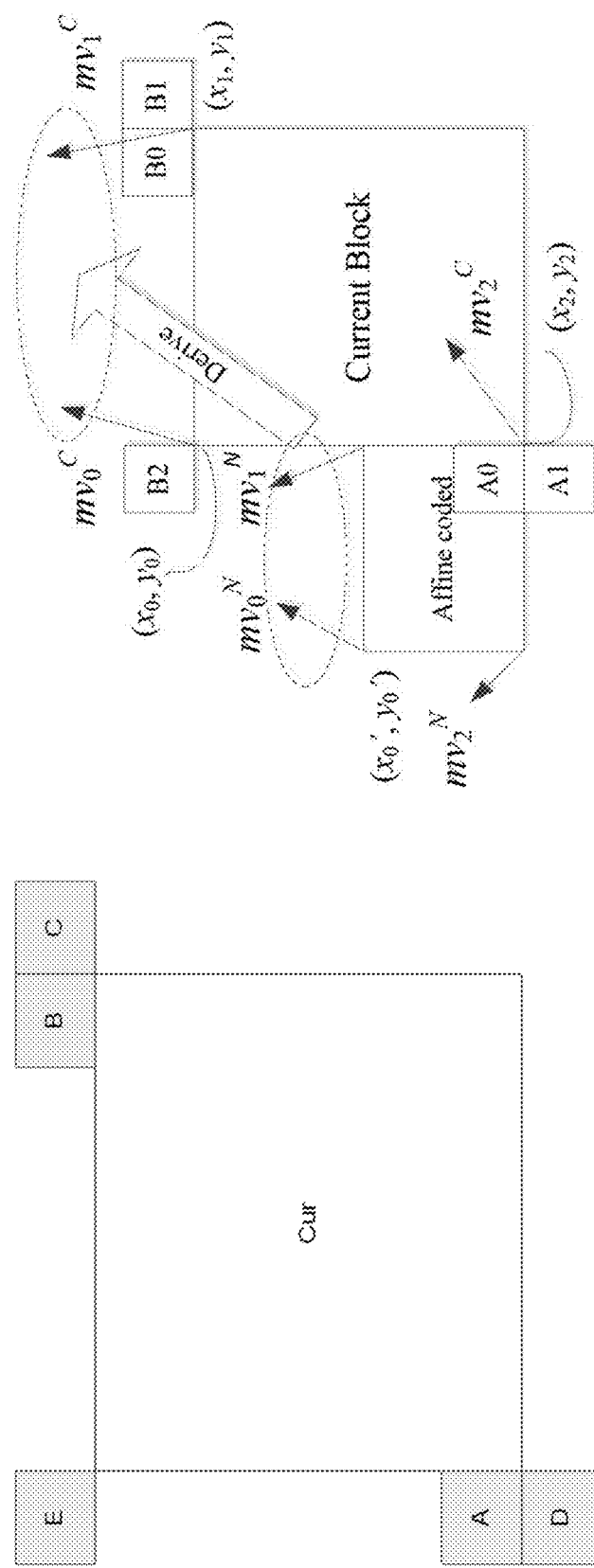
FIG. 21 shows examples of: (a) Five neighboring blocks, (b) CPMV predictor derivation.

Once a neighboring block is found to be coded with affine mode, the CPMVs of the coding unit covering the neighboring block are used to derive predictors of CPMVs of current block. For example, if A1 is coded with non-affine mode and A0 is coded with 4-parameter affine mode, the left inherited affine MV predictor will be derived from A0. In this case, the CPMVs of a CU covering A0, as denoted by $MV_0^N$ for the top-left CPMV and $MV_1^N$ for the top-right CPMV in FIG. 21B are utilized to derive the estimated CPMVs of current block, denoted by $MV_0^C$, $MV_1^C$, $MV_2^C$ for the top-left (with coordinate (x0, y0)), top-right (with coordinate (x1, y1)) and bottom-right positions (with coordinate (x2, y2)) of current block.

2) Constructed Affine Motion Predictors

Figure 20:
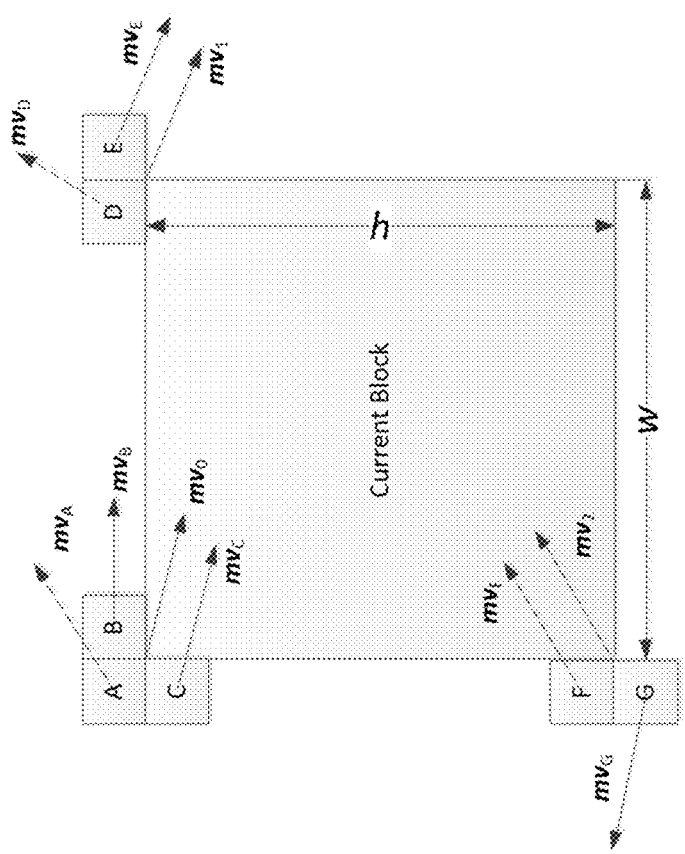
FIG. 20 shows MVP for AF_INTER for constructed affine candidates.

A constructed affine motion predictor consists of control-point motion vectors (CPMVs) that are derived from neighboring inter coded blocks, as shown in FIG. 20, that have the same reference picture. If the current affine motion model is 4-parameter affine, the number of CPMVs is 2, otherwise if the current affine motion model is 6-parameter affine, the number of CPMVs is 3. The top-left CPMV $\overline{mv}_0$ is derived by the MV at the first block in the group {A, B, C} that is inter coded and has the same reference picture as in current block. The top-right CPMV $\overline{mv}_1$ is derived by the MV at the first block in the group {D, E} that is inter coded and has the same reference picture as in current block. The bottom-left CPMV $\overline{mv}_2$ is derived by the MV at the first block in the group {F, G} that is inter coded and has the same reference picture as in current block.

- If the current affine motion model is 4-parameter affine, then a constructed affine motion predictor is inserted into the candidate list only if both $\overline{mv}_0$ and $\overline{mv}_1$ are founded, that is, $\overline{mv}_0$ and $\overline{mv}_1$ are used as the estimated CPMVs for top-left (with coordinate (x0, y0)), top-right (with coordinate (x1, y1)) positions of current block.
- If the current affine motion model is 6-parameter affine, then a constructed affine motion predictor is inserted into the candidate list only if $\overline{mv}_0$, $\overline{mv}_1$ and $\overline{mv}_2$ are all founded, that is, $\overline{mv}_0$, $\overline{mv}_1$ and $\overline{mv}_2$ are used as the estimated CPMVs for top-left (with coordinate (x0, y0)), top-right (with coordinate (x1, y1)) and bottom-right (with coordinate (x2, y2)) positions of current block.

No pruning process is applied when inserting a constructed affine motion predictor into the candidate list.

3) Normal AMVP Motion Predictors

The following applies until the number of affine motion predictors reaches the maximum.

1) Derive an affine motion predictor by setting all CPMVs equal to $\overline{mv}_2$ if available.
2) Derive an affine motion predictor by setting all CPMVs equal to $\overline{mv}_1$ if available.
3) Derive an affine motion predictor by setting all CPMVs equal to $\overline{mv}_0$ if available.
4) Derive an affine motion predictor by setting all CPMVs equal to HEVC TMVP if available.
5) Derive an affine motion predictor by setting all CPMVs to zero MV.

Note that $\overline{mv}_i$ is already derived in constructed affine motion predictor.

In AF_INTER mode, when 4/6-parameter affine mode is used, 2/3 control points are required, and therefore 2/3 MVD needs to be coded for these control points, as shown in FIG. 18. In NET-K0337, it is proposed to derive the MV as follows, i.e., mvd$_1$ and mvd$_2$ are predicted from mvd$_0$.

$$mv_0 = \overline{mv}_0 + mvd_0$$

$$mv_1 = \overline{mv}_1 + mvd_1 + mvd_0$$

$$mv_2 = \overline{mv}_2 + mvd_2 + mvd_0$$

Wherein $\overline{mv}_i$, mvd$_i$ and mvd$_i$ are the predicted motion vector, motion vector difference and motion vector of the top-left pixel (i=0), top-right pixel (i=1) or left-bottom pixel (i=2) respectively, as shown in FIG. 18(b). Please note that the addition of two motion vectors (e.g., mvA(xA, yA) and mvB(xB, yB)) is equal to summation of two components separately, that is, newMV=mvA+mvB and the two components of newMV is set to (xA+xB) and (yA+yB), respectively.

2.3.3.3. AF_MERGE Mode

When a CU is applied in AF_MERGE mode, it gets the first block coded with affine mode from the valid neighbour reconstructed blocks. And the selection order for the candidate block is from left, above, above right, left bottom to above left as shown in FIG. 21(a) (denoted by A, B, C, D, E in order). For example, if the neighbour left bottom block is coded in affine mode as denoted by A0 in FIG. 21(b), the Control Point (CP) motion vectors mv$_0^N$, mv$_1^N$ and mv$_2^N$ of the top left corner, above right corner and left bottom corner of the neighbouring CU/PU which contains the block A are fetched. And the motion vector mv$_0^C$, mv$_1^C$ and mv$_2^C$ (which is only used for the 6-parameter affine model) of the top left corner/top right/bottom left on the current CU/PU is calculated based on mv$_0^N$, mv$_1^N$ and mv$_2^N$. It should be noted that in VTM-2.0, sub-block (e.g. 4×4 block in VTM) located at the top-left corner stores mv0, the sub-block located at the top-right corner stores mv1 if the current block is affine coded. If the current block is coded with the 6-parameter affine model, the sub-block located at the bottom-left corner stores mv2; otherwise (with the 4-parameter affine model), LB stores mv2'. Other sub-blocks stores the MVs used for MC.

After the CPMV of the current CU mv$_0^C$, mv$_1^C$ and mv$_2^C$ are derived, according to the simplified affine motion model Equation (1) and (2), the MVF of the current CU is generated. In order to identify whether the current CU is coded with AF_MERGE mode, an affine flag is signalled in the bitstream when there is at least one neighbour block is coded in affine mode.

In JVET-L0142 and JVET-L0632, an affine merge candidate list is constructed with following steps:

1) Insert inherited affine candidates

Inherited affine candidate means that the candidate is derived from the affine motion model of its valid neighbor affine coded block. The maximum two inherited affine candidates are derived from affine motion model of the neighboring blocks and inserted into the candidate list. For the left predictor, the scan order is {A0, A1}; for the above predictor, the scan order is {B0, B1, B2}.

2) Insert constructed affine candidates

Figure 22:
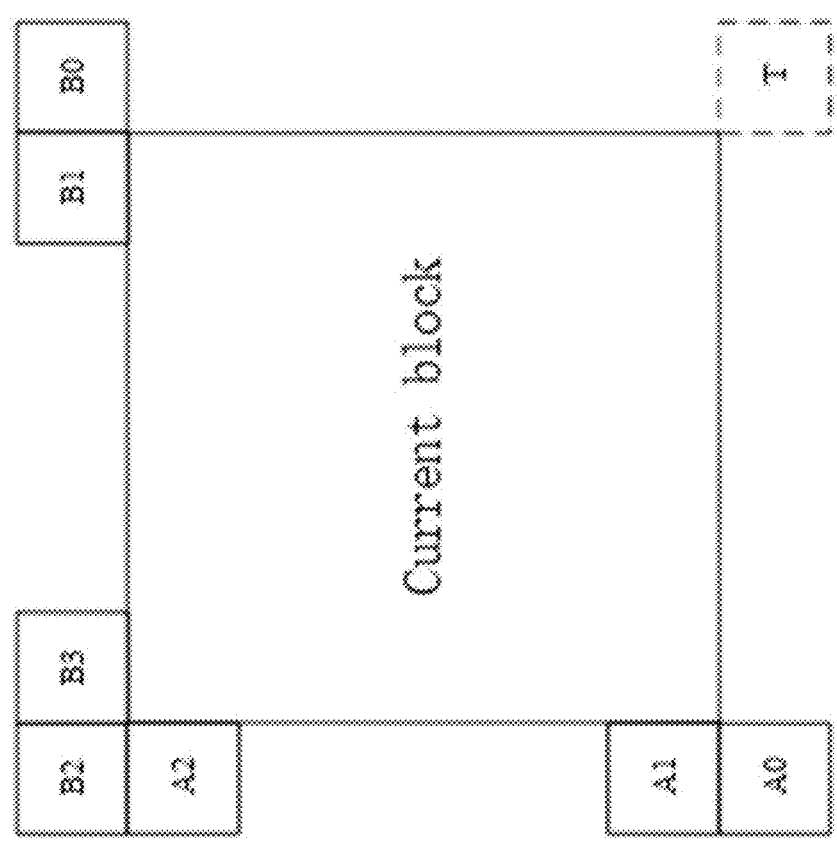
FIG. 22 shows example candidates position for affine merge mode

If the number of candidates in affine merge candidate list is less than MaxNumAffineCand (e.g., 5), constructed affine candidates are inserted into the candidate list. Constructed affine candidate means the candidate is constructed by combining the neighbor motion information of each control point.

a) The motion information for the control points is derived firstly from the specified spatial neighbors and temporal neighbor shown in FIG. 22. CPk (k=1, 2, 3, 4) represents the k-th control point. A0, A1, A2, B0, B1, B2 and B3 are spatial positions for predicting CPk (k=1, 2, 3); T is temporal position for predicting CP4.

The coordinates of CP1, CP2, CP3 and CP4 is (0, 0), (W, 0), (H, 0) and (W, H), respectively, where W and H are the width and height of current block.

The motion information of each control point is obtained according to the following priority order:

For CP1, the checking priority is B2->B3->A2. B2 is used if it is available. Otherwise, if B2 is available, B3 is used. If both B2 and B3 are unavailable, A2 is used. If all the three candidates are unavailable, the motion information of CP1 cannot be obtained.

For CP2, the checking priority is B1->B0.

For CP3, the checking priority is A1->A0.

For CP4, T is used.

b) Secondly, the combinations of controls points are used to construct an affine merge candidate.

I. Motion information of three control points are needed to construct a 6-parameter affine candidate. The three control points can be selected from one of the following four combinations ({CP1, CP2, CP4}, {CP1, CP2, CP3}, {CP2, CP3, CP4}, {CP1, CP3, CP4}). Combinations {CP1, CP2, CP3}, {CP2, CP3, CP4}, {CP1, CP3, CP4} will be converted to a 6-parameter motion model represented by top-left, top-right and bottom-left control points.

II. Motion information of two control points are needed to construct a 4-parameter affine candidate. The two control points can be selected from one of the two combinations ({CP1, CP2}, {CP1, CP3}). The two combinations will be converted to a 4-parameter motion model represented by top-left and top-right control points.

III. The combinations of constructed affine candidates are inserted into to candidate list as following order: {CP1, CP2, CP3}, {CP1, CP2, CP4}, {CP1, CP3, CP4}, {CP2, CP3, CP4}, {CP1, CP2}, {CP1, CP3} i. For each combination, the reference indices of list X for each CP are checked, if they are all the same, then this combination has valid CPMVs for list X. If the combination does not have valid CPMVs for both list 0 and list 1, then this combination is marked as invalid. Otherwise, it is valid, and the CPMVs are put into the sub-block merge list.

3) Padding with zero affine motion vector candidates

If the number of candidates in affine merge candidate list is less than 5, for the sub-block merge candidate list, a 4-parameter merge candidate with MVs set to (0, 0) and prediction direction set to uni-prediction from list 0 (for P slice) and bi-prediction (for B slice).

2.3.4. Merge List Design in VVC

There are three different merge list construction processes supported in VVC:

1) Sub-block merge candidate list: it includes ATMVP and affine merge candidates. One merge list construction process is shared for both affine modes and ATMVP mode. Here, the ATMVP and affine merge candidates may be added in order. Sub-block merge list size is signaled in slice header, and maximum value is 5.

2) Uni-Prediction TPM merge list: For triangular prediction mode, one merge list construction process for the two partitions is shared even two partitions could select their own merge candidate index. When constructing this merge list, the spatial neighbouring blocks and two temporal blocks of the block are checked. The motion information derived from spatial neighbours and temporal blocks are called regular motion candidates in our IDF. These regular motion candidates are further utilized to derive multiple TPM candidates. Please note the transform is performed in the whole block level, even two partitions may use different motion vectors for generating their own prediction blocks.

Uni-Prediction TPM merge list size is fixed to be 5.

3) Regular merge list: For remaining coding blocks, one merge list construction process is shared. Here, the spatial/temporal/HMVP, pairwise combined bi-prediction merge candidates and zero motion candidates may be inserted in order. Regular merge list size is signaled in slice header, and maximum value is 6.

2.3.4.1. Sub-Block Merge Candidate List

It is suggested that all the sub-block related motion candidates are put in a separate merge list in addition to the regular merge list for non-sub block merge candidates.

The sub-block related motion candidates are put in a separate merge list is named as 'sub-block merge candidate list'.

In one example, the sub-block merge candidate list includes affine merge candidates, and ATMVP candidate, and/or sub-block based STMVP candidate.

2.3.4.1.1. JVET-L0278

In this contribution, the ATMVP merge candidate in the normal merge list is moved to the first position of the affine merge list. Such that all the merge candidates in the new list (i.e., sub-block based merge candidate list) are based on sub-block coding tools.

2.3.4.1.2. ATMVP in JVET-N1001

ATMVP is also known as Subblock-based temporal motion vector prediction (SbTMVP).

In JVET-N1001, a special merge candidate list, known as sub-block merge candidate list (a.k.a affine merge candidate list) is added besides the regular merge candidate list. The sub-block merge candidate list is filled with candidates in the following order:

a. ATMVP candidate (maybe available or unavailable);
b. Inherited Affine candidates;
c. Constructed Affine candidates, including TMVP-based constructed affine candidates which use MVs in the collocated reference picture;
d. Padding as zero MV 4-parameter affine model VTM supports the subblock-based temporal motion vector prediction (SbTMVP) method. Similar to the temporal motion vector prediction (TMVP) in HEVC, SbTMVP uses the motion field in the collocated picture to improve motion vector prediction and merge mode for CUs in the current picture. The same collocated picture used by TMVP is used for SbTVMP. SbTMVP differs from TMVP in the following two main aspects:

1. TMVP predicts motion at CU level but SbTMVP predicts motion at sub-CU level;
2. Whereas TMVP fetches the temporal motion vectors from the collocated block in the collocated picture (the collocated block is the bottom-right or center block relative to the current CU), SbTMVP applies a motion shift before fetching the temporal motion information from the collocated picture, where the motion shift is obtained from the motion vector from one of the spatial neighboring blocks of the current CU.

Figure 23:
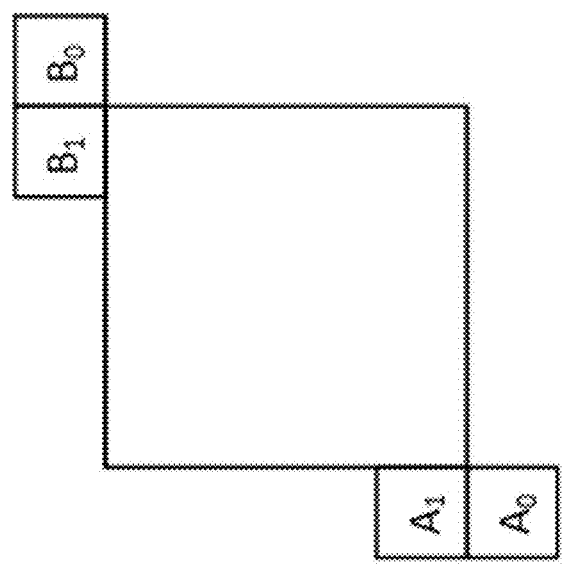
FIG. 23 shows an example of spatial neighboring blocks used by ATMVP.
Figure 24:
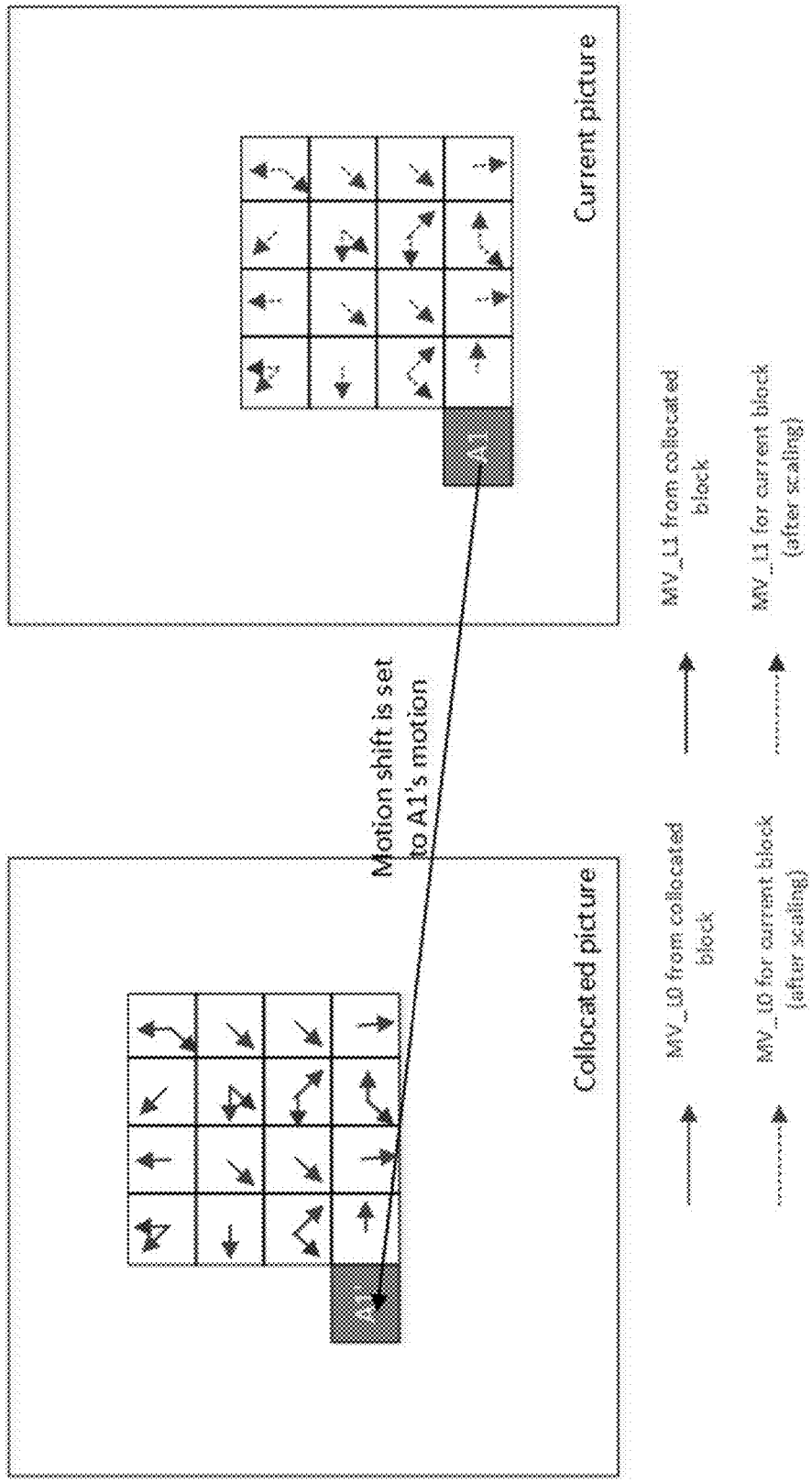
FIG. 24 shows example of deriving sub-CU motion field by applying a motion shift from spatial neighbor and scaling the motion information from the corresponding collocated sub-CUs

The SbTVMP process is illustrated in FIG. 23 and FIG. 24. SbTMVP predicts the motion vectors of the sub-CUs within the current CU in two steps. In the first step, the spatial neighbor A1 in FIG. 23 is examined. If A1 has a motion vector that uses the collocated picture as its reference picture, this motion vector is selected to be the motion shift to be applied. If no such motion is identified, then the motion shift is set to (0, 0).

In the second step, the motion shift identified in Step 1 is applied (i.e. added to the current block's coordinates) to obtain sub-CU-level motion information (motion vectors and reference indices) from the collocated picture as shown in FIG. 24. The example in FIG. 24 assumes the motion shift is set to block A1's motion. Then, for each sub-CU, the motion information of its corresponding block (the smallest motion grid that covers the center sample) in the collocated picture is used to derive the motion information for the sub-CU. After the motion information of the collocated sub-CU is identified, it is converted to the motion vectors and reference indices of the current sub-CU in a similar way as the TMVP process of HEVC, where temporal motion scaling is applied to align the reference pictures of the temporal motion vectors to those of the current CU.

In VTM, a combined sub-block based merge list which contains both SbTVMP candidate and affine merge candidates is used for the signalling of sub-block based merge mode. The SbTVMP mode is enabled/disabled by a sequence parameter set (SPS) flag. If the SbTMVP mode is enabled, the SbTMVP predictor is added as the first entry of the list of sub-block based merge candidates, and followed by the affine merge candidates. The size of sub-block based merge list is signalled in SPS and the maximum allowed size of the sub-block based merge list is 5 in VTM4.

The sub-CU size used in SbTMVP is fixed to be 8×8, and as done for affine merge mode, SbTMVP mode is only applicable to the CU with both width and height are larger than or equal to 8.

The encoding logic of the additional SbTMVP merge candidate is the same as for the other merge candidates, that is, for each CU in P or B slice, an additional RD check is performed to decide whether to use the SbTMVP candidate.

FIGS. 23-24 show examples of the SbTMVP process in VVC.

The maximum number of candidates in the sub-block merge candidate list is denoted as MaxNumSubblockMergeCand.

2.3.4.1.3. Syntax/Semantics Related to Sub-Block Merge List 7.3.2.3 Sequence Parameter Set RBSP Syntax

| seq_parameter_set_rbsp( ) { | Descriptor |
|---|---|
| sps_decoding_parameter_set_id | u(4) |
| sps_video_parameter_set_id | u(4) |
| sps_max_sub_layers_minus1 | u(3) |
| sps_reserved_zero_5bits | u(5) |
| profile_tier_level( sps_max_sub_layers_minus1 ) | |
| gra_enabled_flag | u(1) |
| sps_seq_parameter_set_id | ue(v) |
| chroma_format_idc | ue(v) |
| if( chroma_format_idc == 3 ) | |
| separate_colour_plane_flag | u(1) |
| pic_width_in_luma_samples | ue(v) |
| pic_height_in_luma_samples | ue(v) |
| conformance_window_flag | u(1) |

| seq_parameter_set_rbsp( ) { | Descriptor |
|---|---|
|   if( conformance_window_flag ) { | |
|     conf_win_left_offset | ue(v) |
|     conf_win_right_offset | ue(v) |
|     conf_win_top_offset | ue(v) |
|     conf_win_bottom_offset | ue(v) |
|   } | |
|   bit_depth_luma_minus8 | ue(v) |
|   bit_depth_chroma_minus8 | ue(v) |
|   log2_max_pic_order_cnt_lsb_minus4 | ue(v) |
|   sps_sub_layer_ordering_info_present_flag | u(1) |
|   for( i = ( sps_sub_layer_ordering_info_present_flag ? | |
|     0 : sps_max_sub_layers_minus1 ); | |
|       i <= sps_max_sub_layers_minus1; i++ ) { | |
|     sps_max_dec_pic_buffering_minus1[ i ] | ue(v) |
|     sps_max_num_reorder_pics[ i ] | ue(v) |
|     sps_max_latency_increase_plus1[ i ] | ue(v) |
|   } | |
|   long_term_ref_pics_flag | u(1) |
|   sps_idr_rpl_present_flag | u(1) |
|   rpl1_same_as_rpl0_flag | u(1) |
|   for( i = 0; i <!rpl1_same_as_rpl0_flag ? 2 : 1; i++ ) { | |
|     num_ref_pic_lists_in_sps[ i ] | ue(v) |
|     for( j = 0; j < num_ref_pic_lists_in_sps[ i ]; j++ ) | |
|       ref_pic_list_struct( i, j ) | |
|   } | |
|   qtbtt_dual_tree_intra_flag | u(1) |
|   log2_ctu_size_minus2 | ue(v) |
|   log2_min_luma_coding_block_size_minus2 | ue(v) |
|   partition_constraints_override_enabled_flag | u(1) |
|   sps_log2_diff_min_qt_min_cb_intra_slice_luma | ue(v) |
|   sps_log2_diff_min_qt_min_cb_inter_slice | ue(v) |
|   sps_max_mtt_hierarchy_depth_inter_slice | ue(v) |
|   sps_max_mtt_hierarchy_depth_intra_slice_luma | ue(v) |
|   if( sps_max_mtt_hierarchy_depth_intra_slice_luma != 0 ) { | |
|     sps_log2_diff_max_bt_min_qt_intra_slice_luma | ue(v) |
|     sps_log2_diff_max_tt_min_qt_intra_slice_luma | ue(v) |
|   } | |
|   if( sps_max_mtt_hierarchy_depth_inter_slices != 0 ) { | |
|     sps_log2_diff_max_bt_min_qt_inter_slice | ue(v) |
|     sps_log2_diff_max_tt_min_qt_inter_slice | ue(v) |
|   } | |
|   if( qtbtt_dual_tree_intra_flag ) { | |
|     sps_log2_diff_min_qt_min_cb_intra_slice_chroma | ue(v) |
|     sps_max_mtt_hierarchy_depth_intra_slice_chroma | ue(v) |
|     if ( sps_max_mtt_hierarchy_depth_intra_slice_chroma != 0 ) { | |
|       sps_log2_diff_max_bt_min_qt_intra_slice_chroma | ue(v) |
|       sps_log2_diff_max_tt_min_qt_intra_slice_chroma | ue(v) |
|     } | |
|   } | |
|   sps_sao_enabled_flag | u(1) |
|   sps_alf_enabled_flag | u(1) |
|   sps_pcm_enabled_flag | u(1) |
|   if( sps_pcm_enabled_flag ) { | |
|     pcm_sample_bit_depth_luma_minus1 | u(4) |
|     pcm_sample_bit_depth_chroma_minus1 | u(4) |
|     log2_min_pcm_luma_coding_block_size_minus3 | ue(v) |
|     log2_diff_max_min_pcm_luma_coding_block_size | ue(v) |
|     pcm_loop_filter_disabled_flag | u(1) |
|   } | |
|   if( ( CtbSizeY / MinCbSizeY + 1) <= | |
|   ( pic_width_in_luma_samples / MinCbSizeY − 1 ) ) { | |
|     sps_ref_wraparound_enabled_flag | u(1) |
|     if( sps_ref_wraparound_enabled_flag ) | |
|       sps_ref_wraparound_offset_minus1 | ue(v) |
|   } | |
|   *sps_temporal_mvp_enabled_flag* | *u(1)* |
|   *if( sps_temporal_mvp_enabled_flag )* | |
|     *sps_sbtmvp_enabled_flag* | *u(1)* |
|   *sps_amvr_enabled_flag* | *u(1)* |
|   sps_bdof_enabled_flag | u(1) |
|   sps_smvd_enabled_flag | u(1) |
|   *sps_affine_amvr_enabled_flag* | *u(1)* |
|   sps_dmvr_enabled_flag | u(1) |

| seq_parameter_set_rbsp( ) { | Descriptor |
|---|---|
|   sps_mmvd_enabled_flag | u(1) |
|   sps_cclm_enabled_flag | u(1) |
|   if( sps_cclm_enabled_flag && chroma_format_idc == 1 ) | |
|     sps_cclm_colocated_chroma_flag | u(1) |
|   sps_mts_enabled_flag | u(1) |
|   if( sps_mts_enabled_flag ) { | |
|     sps_explicit_mts_intra_enabled_flag | u(1) |
|     sps_explicit_mts_inter_enabled_flag | u(1) |
|   } | |
|   sps_sbt_enabled_flag | u(1) |
|   if( sps_sbt_enabled_flag ) | |
|     sps_sbt_max_size_64_flag | u(1) |
|   *sps_affine_enabled_flag* | *u(1)* |
|   *if( sps_affine_enabled_flag )* | |
|     *sps_affine_type_flag* | *u(1)* |
|   sps_bcw_enabled_flag | u(1) |
|   sps_ibc_enabled_flag | u(1) |
|   sps_ciip_enabled_flag | u(1) |
|   if( sps_mmvd_enabled_flag ) | |
|     sps_fpel_mmvd_enabled_flag | u(1) |
|   sps_triangle_enabled_flag | u(1) |
|   sps_lmcs_enabled_flag | u(1) |
|   sps_ladf_enabled_flag | u(1) |
|   if ( sps_ladf_enabled_flag ) { | |
|     sps_num_ladf_intervals_minus2 | u(2) |
|     sps_ladf_lowest_interval_qp_offset | se(v) |
|     for( i = 0; i < sps_num_ladf_intervals_minus2 + 1; i++ ) { | |
|       sps_ladf_qp_offset[ i ] | se(v) |
|       sps_ladf_delta_threshold_minus1[ i ] | ue(v) |
|     } | |
|   } | |
|   timing_info_present_flag | u(1) |
|   if( timing_info_present_flag ) { | |
|     num_units_in_tick | u(32) |
|     time_scale | u(32) |
|     hrd_parameters_present_flag | u(1) |
|     if( hrd_parameters_present_flag ) | |
|       hrd_parameters( sps_max_sub_layers_minus1 ) | |
|   } | |
|   vui_parameters_present_flag | u(1) |
|   if( vui_parameters_present_flag ) | |
|     vui_parameters( ) | |
|   sps_extension_flag | u(1) |
|   if( sps_extension_flag ) | |
|     while( more_rbsp_data( ) ) | |
|       sps_extension_data_flag | u(1) |
|   rbsp_trailing_bits( ) | |
| } | |

7.3.5. 1 General Slice Header Syntax

| slice_header( ) { | Descriptor |
|---|---|
|   slice_pic_parameter_set_id | ue(v) |
|   if( rect_slice_flag \|\| NumBricksInPic > 1 ) | |
|     slice_address | u(v) |
|   if( !rect_slice_flag && !single_brick_per_slice_flag ) | |
|     num_bricks_in_slice_minus1 | ue(v) |
|   slice_type | ue(v) |
|   if( NalUnitType == GRA_NUT ) | |
|     recovery_poc_cnt | se(v) |
|   slice_pic_order_cnt_lsb | u(v) |
|   if( NalUnitType == IDR_W_RADL \|\| NalUnitType == IDR_N_LP \|\| NalUnitType == CRA_NUT ) | |
|     no_output_of_prior_pics_flag | u(1) |
|   if( output_flag_present_flag ) | |
|     pic_output_flag | u(1) |
|   if( ( NalUnitType != IDR_W_RADL && NalUnitType != IDR_N_LP ) \|\| sps_idr_rpl_present_flag ) { | |
|     for( i = 0; i < 2; i++ ) { | |

| slice_header( ) { | Descriptor |
|---|---|
|     if( num_ref_pic_lists_in_sps[ i ] > 0 && | |
|         ( i == 0 | | ( i == 1 && | |
|         rpl1_idx_present_flag ) ) ) | |
|       ref_pic_list_sps_flag[ i ] | u(1) |
|     if( ref_pic_list_sps_flag[ i ] ) { | |
|       if( num_ref_pic_lists_in_sps[ i ] > 1 && | |
|         ( i == 0 | | ( i == 1 && | |
|         rpl1_idx_present_flag ) ) ) | |
|       ref_pic_list_idx[ i ] | u(v) |
|     } else | |
|       ref_pic_list_struct( i, num_ref_pic_lists_in_sps[ i ] ) | |
|     for( j = 0; j < NumLtrpEntries[ i ][ RplsIdx[ i ] ]; j++ ) { | |
|       if( ltrp_in_slice_header_flag[ i ][RplsIdx[ i ] ] ) | |
|         slice_poc_lsb_lt[ i ][ j ] | u(v) |
|       delta_poc_msb_present_flag[ i ][ j ] | u(1) |
|       if( delta_poc_msb_present_flag[ i ][ j ] ) | |
|         delta_poc_msb_cycle_lt[ i ][ j ] | ue(v) |
|     } | |
|   } | |
|   if( ( slice_type != I && num_ref_entries[ 0 ] | |
|   [ RplsIdx[ 0 ] ] > 1 ) | | | |
|   ( slice_type == B && num_ref_entries[ 1 ] | |
|   [ RplsIdx[ 1 ] ] > 1 ) ) { | |
|     num_ref_idx_active_override_flag | u(1) |
|     if( num_ref_idx_active_override_flag ) | |
|       for( i = 0; i < ( slice_type == B ? 2: 1 ); i++ ) | |
|         if( num_ref_entries[ i ][ RplsIdx[ i ] ] > 1 ) | |
|           num_ref_idx_active_minus1[ i ] | ue(v) |
|   } | |
| } | |
| if( partition_constraints_override_enabled_flag ) { | |
|   partition_constraints_override_flag | ue(v) |
|   if( partition_constraints_override_flag ) { | |
|     slice_log2_diff_min_qt_min_cb_luma | ue(v) |
|     slice_max_mtt_hierarchy_depth_luma | ue(v) |
|     if( slice_max_mtt_hierarchy_depth_luma != 0 ) | |
|       slice_log2_diff_max_bt_min_qt_luma | ue(v) |
|       slice_log2_diff_max_tt_min_qt_luma | ue(v) |
|     } | |
|     if( slice_type == I && qtbtt_dual_tree_intra_flag ) { | |
|       slice_log2_diff_min_qt_min_cb_chroma | ue(v) |
|       slice_max_mtt_hierarchy_depth_chroma | ue(v) |
|       if( slice_max_mtt_hierarchy_depth_chroma != 0 ) | |
|         slice_log2_diff_max_bt_min_qt_chroma | ue(v) |
|         slice_log2_diff_max_tt_min_qt_chroma | ue(v) |
|       } | |
|     } | |
|   } | |
| } | |
| if ( slice_type != I ) { | |
|   *if( sps_temporal_mvp_enabled_flag )* | |
|     *slice_temporal_mvp_enabled_flag* | *u(1)* |
|   *if( slice_type == B )* | |
|     *mvd_l1_zero_flag* | *u(1)* |
|   *if( cabac_init_present_flag )* | |
|     *cabac_init_flag* | *u(1)* |
|   *if( slice_temporal_mvp_enabled_flag ) {* | |
|     *if( slice_type == B )* | |
|       *collocated_from_l0_flag* | *u(1)* |
|   *}* | |
|   if( ( weighted_pred_flag && slice_type == P ) | | | |
|   ( weighted_bipred_flag && slice_type == B ) ) | |
|     pred_weight_table( ) | |
|   six_minus_max_num_merge_cand | ue(v) |
|   *if( sps_affine_enabled_flag )* | |
|     *five_minus_max_num_subblock_merge_cand* | *ue(v)* |
|   if( sps_fpel_mmvd_enabled_flag ) | |
|     slice_fpel_mmvd_enabled_flag | u(1) |
|   if( sps_triangle_enabled_flag && | |
|   MaxNumMergeCand >= 2 ) | |
|     max_num_merge_cand_minus_max_num_triangle_cand | ue(v) |
|   } else if ( sps_ibc_enabled_flag ) | |
|     six_minus_max_num_merge_cand | ue(v) |
| slice_qp_delta | se(v) |
| if( pps_slice_chroma_qp_offsets_present_flag ) { | |
|   slice_cb_qp_offset | se(v) |
|   slice_cr_qp_offset | se(v) |
| } | |
| if( sps_sao_enabled_flag ) { | |
|   slice_sao_luma_flag | u(1) |
|   if( ChromaArrayType ! = 0 ) | |
|     slice_sao_chroma_flag | u(1) |
| } | |
| if( sps_alf_enabled_flag ) { | |
|   slice_alf_enabled_flag | u(1) |
|   if( slice_alf_enabled_flag ) { | |
|     num_alf_aps_ids | tb(v) |
|     for( i = 0; i < num_alf_aps_ids; i++ ) | |
|       slice_alf_aps_id_luma[ i ] | u(5) |
|     slice_alf_chroma_idc | tu(v) |
|     if( slice_alf_chroma_idc && ( slice_type | |
|     != I | | num_alf_aps_ids != 1) ) | |
|       slice_alf_aps_id_chroma | u(5) |
|   } | |
| } | |
| dep_quant_enabled_flag | u(1) |
| if( !dep_quant_enabled_flag ) | |
|   sign_data_hiding_enabled_flag | u(1) |
| if( deblocking_filter_override_enabled_flag ) | |
|   deblocking_filter_override_flag | u(1) |
| if( deblocking_filter_override_flag ) { | |
|   slice_deblocking_filter_disabled_flag | u(1) |
|   if( !slice_deblocking_filter_disabled_flag ) { | |
|     slice_beta_offset_div2 | se(v) |
|     slice_tc_offset_div2 | se(v) |
|   } | |
| } | |
| if( sps_lmcs_enabled_flag ) { | |
|   slice_lmcs_enabled_flag | u(1) |
|   if( slice_lmcs_enabled_flag ) { | |
|     slice_lmcs_aps_id | u(5) |
|     if( !( qtbtt_dual_tree_intra_flag && slice_type == I ) ) | |
|       slice_chroma_residual_scale_flag | u(1) |
|   } | |
| } | |
| if ( entropy_coding_sync_enabled_flag ) | |
|   num_entry_point_offsets | ue(v) |
| if( NumEntryPoints > 0 ) { | |
|   offset_len_minus1 | ue(v) |
|   for( i = 0; i < NumEntryPoints; i++ ) | |
|     entry_point_offset_minus1[ i ] | u(v) |
| } | |
| byte_alignment( ) | |
| } | |

7.3.7.7 Merge Data Syntax

| merge_data( x0, y0, cbWidth, cbHeight ) { | Descriptor |
|---|---|
|   if( CuPredMode[ x0 ][ y0 ] == MODE_IBC ) { | |
|     if( MaxNumMergeCand > 1 ) | |
|       merge_idx[ x0 ][ y0 ] | ae(v) |
|   } else { | |
|     if( sps_mmvd_enabled_flag | | cbWidth * cbHeight != 32 ) | |
|       regular_merge_flag[ x0 ][ y0 ] | ae(v) |
|     if ( regular_merge_flag[ x0 ][ y0 ] == 1 ){ | |
|       if( MaxNumMergeCand > 1 ) | |
|         merge_idx[ x0 ][ y0 ] | ae(v) |
|     } else { | |
|       if( sps_mmvd_enabled_flag && | |
|       cbWidth * cbHeight != 32 ) | |
|         mmvd_merge_flag[ x0 ][ y0 ] | ae(v) |
|       if ( mmvd_merge_flag[ x0 ][ y0 ] == 1 ) { | |
|         if( MaxNumMergeCand > 1 ) | |
|           mmvd_cand_flag[ x0 ][ y0 ] | ae(v) |

-continued

| merge_data( x0, y0, cbWidth, cbHeight ) { | Descriptor |
|---|---|
|         mmvd_distance_idx[ x0 ][ y0 ] | ae(v) |
|         mmvd_direction_idx[ x0 ][ y0 ] | ae(v) |
|     } else { | |
|       if( MaxNumSubblockMergeCand > 0 && | |
|       cbWidth >= 8 && cbHeight >= 8 ) | |
|         merge_subblock_flag[ x0 ][ y0 ] | ae(v) |
|       if( merge_subblock_flag[ x0 ][ y0 ] == 1 ) { | |
|         if( MaxNumSubblockMergeCand > 1 ) | |
|           merge_subblock_idx[ x0 ][ y0 ] | ae(v) |
|       } else { | |
|         if( sps_ciip_enabled_flag && | |
|         cu_skip_flag[ x0 ][ y0 ] == 0 && | |
|         ( cbWidth * cbHeight) >= 64 && cbWidth < | |
|         128 && cbHeight < 128 ) { | |
|           ciip_flag[ x0 ][ y0 ] | ae(v) |
|         if( ciip_flag[ x0 ][ y0 ] && | |
|         MaxNumMergeCand > 1 ) | |
|           merge_idx[ x0 ][ y0 ] | ae(v) |
|         } | |
|         if( MergeTriangleFlag[ x0 ][ y0 ] ) { | |
|           merge_triangle_split_dir[ x0 ][ y0 ] | ae(v) |
|           merge_triangle_idx0[ x0 ][ y0 ] | ae(v) |
|           merge_triangle_idx1[ x0 ][ y0 ] | ae(v) |
|         } | |
|       } | |
|     } | |
|   } | |
| } | | five_minus_max_num_subblock_merge_cand specifies the maximum number of subblock-based merging motion vector prediction (MVP) candidates supported in the slice subtracted from 5. When five_minus_max_num_subblock_merge_cand is not present, it is inferred to be equal to 5−sps_sbtmvp_enabled_flag. The maximum number of subblock-based merging MVP candidates, MaxNumSubblockMergeCand is derived as follows:

MaxNumSubblockMergeCand=5−five_minus_max_num_subblock_merge_cand

The value of MaxNumSubblockMergeCand shall be in the range of 0 to 5, inclusive.

8.5.5.2 Derivation Process for Motion Vectors and Reference Indices in Subblock Merge Mode Inputs to this process are:
a luma location (xCb, yCb) of the top-left sample of the current luma coding block relative to the top-left luma sample of the current picture,
two variables cbWidth and cbHeight specifying the width and the height of the luma coding block.

Outputs of this process are:
the number of luma coding subblocks in horizontal direction numSbX and in vertical direction numSbY,
the reference indices refIdxL0 and refIdxL1,
the prediction list utilization flag arrays predFlagL0[xSbIdx][ySbIdx] and predFlagL1[xSbIdx][ySbIdx],
the luma subblock motion vector arrays in 1/16 fractional-sample accuracy mvL0[xSbIdx][ySbIdx] and mvL1[xSbIdx][ySbIdx] with xSbIdx=0..numSbX−1, ySbIdx=0..numSbY−1,
the chroma subblock motion vector arrays in 1/32 fractional-sample accuracy mvCL0[xSbIdx][ySbIdx] and mvCL1[xSbIdx][ySbIdx] with xSbIdx=0..numSbX−1, ySbIdx=0..numSbY−1,
the bi-prediction weight index bcwIdx.

The variables numSbX, numSbY and the subblock merging candidate list, subblockMergeCandList are derived by the following ordered steps:

1. When sps_sbtmvp_enabled_flag is equal to 1, the following applies:
   For the derivation of availableFlagA$_1$, refIdxLXA$_1$, predFlagLXA$_1$ and mvLXA$_1$ the following applies:
     The luma location (xNbA$_1$, yNbA$_1$) inside the neighbouring luma coding block is set equal to (xCb−1, yCb+cbHeight−1).
     The availability derivation process for a block as specified in clause 6.4.X [Ed. (BB): Neighbouring blocks availability checking process tbd] is invoked with the current luma location (xCurr, yCurr) set equal to (xCb, yCb) and the neighbouring luma location (xNbA$_1$, yNbA$_1$) as inputs, and the output is assigned to the block availability flag available/kb
     The variables availableFlagA$_1$, refIdxLXA$_1$, predFlagLXA$_1$ and mvLXA$_1$ are derived as follows:
       If availableA$_1$ is equal to FALSE, availableFlagA$_1$ is set equal to 0, both components of mvLXA$_1$ are set equal to 0, refIdxLXA$_1$ is set equal to −1 and predFlagLXA$_1$ is set equal to 0, with X being 0 or 1, and bcwIdxA$_1$ is set equal to 0.
       Otherwise, availableFlagA$_1$ is set equal to 1 and the following assignments are made:

$mvLXA_1 = MvLX[xNbA_1][yNbA_1]$ (8-485)

$refIdxLXA_1 = RefIdxLX[xNbA_1][yNbA_1]$ (8-486)

$predFlagLXA_1 = PredFlagLX[xNbA_1][yNbA_1]$ (8-487)

The derivation process for subblock-based temporal merging candidates as specified in clause 8.5.5.3 is invoked with the luma location (xCb, yCb), the luma coding block width cbWidth, the luma coding block height cbHeight, the availability flag availableFlagA$_1$, the reference index refIdxLXA$_1$, the prediction list utilization flag predFlagLXA$_1$, and the motion vector mvLXA$_1$ as inputs and the output being the availability flag availableFlagSbCol, the number of luma coding subblocks in horizontal direction numSbX and in vertical direction numSbY, the reference indices refIdxLXSbCol, the luma motion vectors mvLXSbCol[xSbIdx][ySbIdx] and the prediction list utilization flags predFlagLXSbCol[xSbIdx][ySbIdx] with xSbIdx=0..numSbX−1, ySbIdx=0 numSbY−1 and X being 0 or 1.

2. When sps_affine_enabled_flag is equal to 1, the sample locations (xNbA$_0$, yNbA$_0$), (xNbA$_1$, yNbA$_1$), (xNbA$_2$, yNbA$_2$), (xNbB$_0$, yNbB$_0$), (xNbB$_1$, yNbB$_1$), (xNbB$_2$, yNbB$_2$), (xNbB$_3$, yNbB$_3$), and the variables numSbX and numSbY are derived as follows:

$(xA_0, yA_0) = (xCb−1, yCb+cbHeight)$ (8-488)

$(xA_1, yA_1) = (xCb−1, yCb+cbHeight−1)$ (8-489)

$(xA_2, yA_2) = (xCb−1, yCb)$ (8-490)

$(xB_0, yB_0) = (xCb+cbWidth, yCb−1)$ (8-491)

$(xB_1, yB_1) = (xCb+cbWidth−1, yCb−1)$ (8-492)

$(xB_2, yB_2) = (xCb−1, yCb−1)$ (8-493)

$(xB_3, yB_3) = (xCb, yCb−1)$ (8-494)

$numSbX = cbWidth >> 2$ (8-495)

$numSbY = cbHeight >> 2$ (8-496)

3. When sps_affine_enabled_flag is equal to 1, the variable availableFlagA is set equal to FALSE and the following applies for $(xNbA_k, yNbA_k)$ from $(xNbA_0, yNbA_0)$ to $(xNbA_1, yNbA_1)$:

The availability derivation process for a block as specified in clause 6.4.X [Ed. (BB): Neighbouring blocks availability checking process tbd] is invoked with the current luma location (xCurr, yCurr) set equal to (xCb, yCb) and the neighbouring luma location $(xNbA_k, yNbA_k)$ as inputs, and the output is assigned to the block availability flag availableA$_k$.

When availableA$_k$ is equal to TRUE and MotionModelIdc$[xNbA_k][yNbA_k]$ is greater than 0 and availableFlagA is equal to FALSE, the following applies:

The variable availableFlagA is set equal to TRUE, motionModelIdcA is set equal to MotionModelIdc$[xNbA_k][yNbA_k]$, (xNb, yNb) is set equal to (CbPosX$[xNbA_k][yNbA_k]$, CbPosY$[xNbA_k][yNbA_k]$), nbW is set equal to CbWidth$[xNbA_k][yNbA_k]$, nbH is set equal to CbHeight$[xNbA_k][yNbA_k]$, numCpMv is set equal to MotionModelIdc$[xNbA_k][yNbA_k]$+1, and bcwIdxA is set equal to BcwIdx$[xNbA_k][yNbA_k]$.

For X being replaced by either 0 or 1, the following applies:

When PredFlagLX$[xNbA_k][yNbA_k]$ is equal to 1, the derivation process for luma affine control point motion vectors from a neighbouring block as specified in clause 8.5.5.5 is invoked with the luma coding block location (xCb, yCb), the luma coding block width and height (cbWidth, cbHeight), the neighbouring luma coding block location (xNb, yNb), the neighbouring luma coding block width and height (nbW, nbH), and the number of control point motion vectors numCpMv as input, the control point motion vector predictor candidates cpMvLXA[cpIdx] with cpIdx=0 numCpMv−1 as output.

The following assignments are made:

$$\text{predFlag}LXA = \text{PredFlag}LX[xNbA_k][yNbA_k] \quad (8\text{-}497)$$

$$\text{refIdx}LXA = \text{RefIdx}LX[xNbA_k][yNbA_k] \quad (8\text{-}498)$$

4. When sps_affine_enabled_flag is equal to 1, the variable availableFlagB is set equal to FALSE and the following applies for $(xNbB_k, yNbB_k)$ from $(xNbB_0, yNbB_0)$ to $(xNbB_2, yNbB_2)$:

The availability derivation process for a block as specified in clause 6.4.X [Ed. (BB): Neighbouring blocks availability checking process tbd] is invoked with the current luma location (xCurr, yCurr) set equal to (xCb, yCb) and the neighbouring luma location $(xNbB_k, yNbB_k)$ as inputs, and the output is assigned to the block availability flag availableB$_k$.

When availableB$_k$ is equal to TRUE and MotionModelIdc$[xNbB_k][yNbB_k]$ is greater than 0 and availableFlagB is equal to FALSE, the following applies:

The variable availableFlagB is set equal to TRUE, motionModelIdcB is set equal to MotionModelIdc$[xNbB_k][yNbB_k]$, (xNb, yNb) is set equal to (CbPosX[xNbAB]$[yNbB_k]$, CbPosY$[xNbB_k][yNbB_k]$), nbW is set equal to CbWidth$[xNbB_k][yNbB_k]$, nbH is set equal to CbHeight$[xNbB_k][yNbB_k]$, numCpMv is set equal to MotionModelIdc$[xNbB_k][yNbB_k]$+1, and bcwIdxB is set equal to BcwIdx$[xNbB_k][yNbB_k]$.

For X being replaced by either 0 or 1, the following applies:

When PredFlagLX$[xNbB_k][yNbB_k]$ is equal to TRUE, the derivation process for luma affine control point motion vectors from a neighbouring block as specified in clause 8.5.5.5 is invoked with the luma coding block location (xCb, yCb), the luma coding block width and height (cbWidth, cbHeight), the neighbouring luma coding block location (xNb, yNb), the neighbouring luma coding block width and height (nbW, nbH), and the number of control point motion vectors numCpMv as input, the control point motion vector predictor candidates cpMvLXB[cpIdx] with cpIdx=0..numCpMv−1 as output.

The following assignments are made:

$$\text{predFlag}LXB = \text{PredFlag}LX[xNbB_k][yNbB_k] \quad (8\text{-}499)$$

$$\text{refIdx}LXB = \text{RefIdx}LX[xNbB_k][yNbB_k] \quad (8\text{-}500)$$

5. When sps_affine_enabled_flag is equal to 1, the derivation process for constructed affine control point motion vector merging candidates as specified in clause 8.5.5.6 is invoked with the luma coding block location (xCb, yCb), the luma coding block width and height (cbWidth, cbHeight), the availability flags availableA$_0$, availableA$_2$, availableB$_0$, availableB$_1$, availableB$_2$, availableB$_3$ as inputs, and the availability flags availableFlagConstK, the reference indices refIdxLXConstK, prediction list utilization flags predFlagLXConstK, motion model indices motionModelIdcConstK, bi-prediction weight indices bcwIdxConstK and cpMvpLXConstK[cpIdx] with X being 0 or 1, K=1..6, cpIdx=0..2 as outputs.

6. The initial subblock merging candidate list, subblockMergeCandList, is constructed as follows:
i=0 if(availableFlagSbCol) subblockMergeCandList[i++]=SbCol if(availableFlagA &&
  i<MaxNumSubblockMergeCand) subblockMergeCandList[i++]=A if(availableFlagB &&
  i<MaxNumSubblockMergeCand) subblockMergeCandList[i++]=B if(availableFlagConst1 &&
  i<MaxNumSubblockMergeCand) subblockMergeCandList[i++]=Const1 if(availableFlagConst2 &&
  i<MaxNumSubblockMergeCand) subblockMergeCandList[i++]=Const2 if(availableFlagConst3 &&
  i<MaxNumSubblockMergeCand) subblockMergeCandList[i++]=Const3 if(availableFlagConst4 &&
  i<MaxNumSubblockMergeCand) subblockMergeCandList[i++]=Const4 if(availableFlagConst5 &&
  i<MaxNumSubblockMergeCand) subblockMergeCandList[i++]=Const5 if(availableFlagConst6 &&
  i<MaxNumSubblockMergeCand) subblockMergeCandList[i++]=Const6  (8-501)

7. The variable numCurrMergeCand and numOrigMergeCand are set equal to the number of merging candidates in the subblockMergeCandList.
8. When numCurrMergeCand is less than MaxNumSubblockMergeCand, the following is repeated until numCurrMrgeCand is equal to MaxNumSubblockMergeCand, with mvZero[0] and mvZero[1] both being equal to 0:

The reference indices, the prediction list utilization flags and the motion vectors of zeroCand$_m$ with m equal to (numCurrMergeCand−numOrigMergeCand) are derived as follows:

$$\text{refIdx}L0\text{ZeroCand}_m = 0 \quad (8\text{-}502)$$

$$\text{predFlag}L0\text{ZeroCand}_m = 1 \quad (8\text{-}503)$$

$$cpMvL0\text{ZeroCand}_m[0] = mvZero \quad (8\text{-}504)$$

$$cpMvL0\text{ZeroCand}_m[1] = mvZero \quad (8\text{-}505)$$

$$cpMvL0\text{ZeroCand}_m[2] = mvZero \quad (8\text{-}506)$$

$$\text{refIdx}L1\text{ZeroCand}_m = (\text{slice\_type}==B)?0:-1 \quad (8\text{-}507)$$

$$\text{predFlag}L1\text{ZeroCand}_m = (\text{slice\_type}==B)?1:0 \quad (8\text{-}508)$$

$$cpMvL1\text{ZeroCand}_m[0] = mvZero \quad (8\text{-}509)$$

$$cpMvL1\text{ZeroCand}_m[1] = mvZero \quad (8\text{-}510)$$

$$cpMvL1\text{ZeroCand}_m[2] = mvZero \quad (8\text{-}511)$$

$$\text{motionModelIdcZeroCand}_m = 1 \quad (8\text{-}512)$$

$$\text{bcwIdxZeroCand}_m = 0 \quad (8\text{-}513)$$

The candidate zeroCand$_m$ with m equal to (numCurrMergeCand−numOrigMergeCand) is added at the end of subblockMergeCandList and numCurrMergeCand is incremented by 1 as follows:

$$\text{subblockMergeCandList[numCurrMergeCand++]} = \text{zeroCand}_m \quad (8\text{-}514)$$

The variables refIdxL0, refIdxL1, predFlagL0[xSbIdx][ySbIdx], predFlag1[xSbIdx][ySbIdx], mvL0 [xSbIdx][ySbIdx], mvL1 [xSbIdx][ySbIdx], mvCL0 [xSbIdx][ySbIdx], and mvCL1[xSbIdx][ySbIdx] with xSbIdx=0..numSbX−1, ySbIdx=0..numSbY−1 are derived as follows:
If subblockMergeCandList[merge_subblock_idx[xCb][yCb]] is equal to SbCol, the bi-prediction weight index bcwIdx is set equal to 0 and the following applies with X being 0 or 1:

$$\text{refIdx}LX = \text{refIdx}LX\text{SbCol} \quad (8\text{-}515)$$

For xSbIdx=0..numSbX−1, ySbIdx=0..numSbY−1, the following applies:

$$\text{predFlag}LX[x\text{SbIdx}][y\text{SbIdx}] = \text{predFlag}LX\text{SbCol}[x\text{SbIdx}][y\text{SbIdx}] \quad (8\text{-}516)$$

$$mvLX[x\text{SbIdx}][y\text{SbIdx}][0] = mvLX\text{SbCol}[x\text{SbIdx}][y\text{SbIdx}][0] \quad (8\text{-}517)$$

$$mvLX[x\text{SbIdx}][y\text{SbIdx}][1] = mvLX\text{SbCol}[x\text{SbIdx}][y\text{SbIdx}][1] \quad (8\text{-}518)$$

When predFlagLX[xSbIdx][ySbIdx], is equal to 1, the derivation process for chroma motion vectors in clause 8.2.13 is invoked with mvLX[xSbIdx][ySbIdx] and refIdxLX as inputs, and the output being mvCLX[xSbIdx][ySbIdx].

The following assignment is made for x=xCb..xCb+cbWidth−1 and y=yCb..yCb+cbHeight−1:

$$\text{MotionModelIdc}[x][y] = 0 \quad (8\text{-}519)$$

Otherwise (subblockMergeCandList[merge_subblock_idx[xCb][yCb]] is not equal to SbCol), the following applies with X being 0 or 1:
The following assignments are made with N being the candidate at position merge_subblock_idx[xCb][yCb] in the subblock merging candidate list subblockMergeCandList
(N=subblockMergeCandList[merge_subblock_idx[xCb][yCb]]):

$$\text{refIdx}LX = \text{refIdx}LXN \quad (8\text{-}520)$$

$$\text{predFlag}LX[0][0] = \text{predFlag}LXN \quad (8\text{-}521)$$

$$cpMvLX[0] = cpMvLXN[0] \quad (8\text{-}522)$$

$$cpMvLX[1] = cpMvLXN[1] \quad (8\text{-}523)$$

$$cpMvLX[2] = cpMvLXN[2] \quad (8\text{-}524)$$

$$\text{num}CpMv = \text{motionModelIdx}N + 1 \quad (8\text{-}525)$$

$$\text{bcwIdx} = \text{bcwIdx}N \quad (8\text{-}526)$$

For xSbIdx=0..numSbX−1, ySbIdx=0..numSbY−1, the following applies:

$$\text{predFlag}LX[x\text{SbIdx}][y\text{SbIdx}] = \text{predFlag}LX[0][0] \quad (8\text{-}527)$$

When predFlagLX[0][0] is equal to 1, the derivation process for motion vector arrays from affine control point motion vectors as specified in subclause 8.5.5.9 is invoked with the luma coding block location (xCb, yCb), the luma coding block width cbWidth, the luma prediction block height cbHeight, the number of control point motion vectors numCpMv, the control point motion vectors cpMvLX[cpIdx] with cpIdx being 0..2, and the number of luma coding subblocks in horizontal direction numSbX and in vertical direction numSbY as inputs, the luma subblock motion vector array mvLX[xSbIdx][ySbIdx] and the chroma subblock motion vector array mvCLX[xSbIdx][ySbIdx] with xSbIdx=0..numSbX−1, ySbIdx=0 numSbY−1 as outputs.

The following assignment is made for x=xCb..xCb+cbWidth−1 and y=yCb..yCb+cbHeight−1:

$$\text{MotionModelIdc}[x][y] = \text{num}CpMv - 1 \quad (8\text{-}528)$$

8.5.5.6 Derivation Process for Constructed Affine Control Point Motion Vector Merging Candidates Inputs to this process are:
a luma location (xCb, yCb) specifying the top-left sample of the current luma coding block relative to the top-left luma sample of the current picture,
two variables cbWidth and cbHeight specifying the width and the height of the current luma coding block,
the availability flags availableA$_0$, availableA$_1$ availableA$_2$, availableB$_0$, availableB$_1$, availableB$_2$, availableB$_3$,
the sample locations (xNbA$_0$, yNbA$_0$), (xNbA$_1$, yNbA$_1$), (xNbA$_2$, yNbA$_2$), (xNbB$_0$, yNbB$_0$), (xNbB$_1$, yNbB$_1$), (xNbB$_2$, yNbB$_2$) and (xNbB$_3$, yNbB$_3$).

Output of this process are:
the availability flag of the constructed affine control point motion vector merging candidates availableFlagConstK, with K=1..6, the reference indices refIdxLXConstK, with K=1..6, X being 0 or 1, the prediction list utilization flags predFlagLXConstK, with K=1..6, X being 0 or 1, the affine motion model indices motionModelIdcConstK, with K=1..6, the bi-prediction weight indices bcwIdxConstK, with K=1..6, the constructed affine control point motion vectors cpMvLXConstK[cpIdx] with cpIdx=0..2, K=1..6 and X being 0 or 1.

The first (top-left) control point motion vector cpMvLXCorner[0], reference index refIdxLXCorner[0], prediction list utilization flag predFlagLXCorner[0], bi-prediction weight index bcwIdxCorner[0] and the availability flag availableFlagCorner[0] with X being 0 and 1 are derived as follows:

The availability flag availableFlagCorner[0] is set equal to FALSE.

The following applies for (xNbTL, yNbTL) with TL being replaced by $B_2$, $B_3$, and $A_2$:

When availableTL is equal to TRUE and availableFlagCorner[0] is equal to FALSE, the following applies with X being 0 and 1:

refIdx*LX*Corner[0]=RefIdx*LX*[*xNbTL*][*yNbTL*] (8-572)

predFlag*LX*Corner[0]=PredFlag*LX*[*xNbTL*][*yNbTL*] (8-573)

*cpMvLX*Corner[0]=*MvLX*[*xNbTL*][*yNbTL*] (8-574)

bcwIdxCorner[0]=BcwIdx[*xNbTL*][*yNbTL*] (8-575)

availableFlagCorner[0]=TRUE (8-576)

The second (top-right) control point motion vector cpMvLXCorner[1], reference index refIdxLXCorner[1], prediction list utilization flag predFlagLXCorner[1], bi-prediction weight index bcwIdxCorner[1] and the availability flag availableFlagCorner[1] with X being 0 and 1 are derived as follows The availability flag availableFlagCorner[1] is set equal to FALSE.

The following applies for (xNbTR, yNbTR) with TR being replaced by $B_1$ and $B_0$:

When availableTR is equal to TRUE and availableFlagCorner[1] is equal to FALSE, the following applies with X being 0 and 1:

refIdx*LX*Corner[1]=RefIdx*LX*[*xNbTR*][*yNbTR*] (8-577)

predFlag*LX*Corner[1]=PredFlag*LX*[*xNbTR*][*yNbTR*] (8-578)

*cpMvLX*Corner[1]=*MvLX*[*xNbTR*][*yNbTR*] (8-579)

bcwIdxCorner[1]=BcwIdx[*xNbTR*][*yNbTR*] (8-580)

availableFlagCorner[1]=TRUE (8-581)

The third (bottom-left) control point motion vector cpMvLXCorner[2], reference index refIdxLXCorner[2], prediction list utilization flag predFlagLXCorner[2], bi-prediction weight index bcwIdxCorner[2] and the availability flag availableFlagCorner[2] with X being 0 and 1 are derived as follows:

The availability flag availableFlagCorner[2] is set equal to FALSE.

The following applies for (xNbBL, yNbBL) with BL being replaced by $A_1$ and $A_0$:

When availableBL is equal to TRUE and availableFlagCorner[2] is equal to FALSE, the following applies with X being 0 and 1:

refIdx*LX*Corner[2]=RefIdx*LX*[*xNbBL*][*yNbBL*] (8-582)

predFlag*LX*Corner[2]=PredFlag*LX*[*xNbBL*][*yNbBL*] (8-583)

*cpMvLX*Corner[2]=*MvLX*[*xNbBL*][*yNbBL*] (8-584)

bcwIdxCorner[2]=BcwIdx[*xNbBL*][*yNbBL*] (8-585)

availableFlagCorner[2]=TRUE (8-586)

The fourth (collocated bottom-right) control point motion vector cpMvLXCorner[3], reference index refIdxLXCorner[3], prediction list utilization flag predFlagLXCorner[3], bi-prediction weight index bcwIdxCorner[3] and the availability flag availableFlagCorner[3] with X being 0 and 1 are derived as follows:

The reference indices for the temporal merging candidate, refIdxLXCorner[3], with X being 0 or 1, are set equal to 0.

The variables mvLXCol and availableFlagLXCol, with X being 0 or 1, are derived as follows:

If slice_temporal_mvp_enabledflag is equal to 0, both components of mvLXCol are set equal to 0 and availableFlagLXCol is set equal to 0.

Otherwise (slice_temporal_mvp_enabled_flag is equal to 1), the following applies:

*x*ColBr=*xCb*+*cb*Width (8-587)

*y*ColBr=*yCb*+*cb*Height (8-588)

If yCb>>CtbLog2SizeY is equal to yColBr>>CtbLog2SizeY, yColBr is less than pic_height_in_luma_samples and xColBr is less than pic_width_in_luma_samples, the following applies:

The variable colCb specifies the luma coding block covering the modified location given by ((xColBr>>3)<<3, (yColBr>>3)<<3) inside the collocated picture specified by ColPic.

The luma location (xColCb, yColCb) is set equal to the top-left sample of the collocated luma coding block specified by colCb relative to the top-left luma sample of the collocated picture specified by ColPic.

The derivation process for collocated motion vectors as specified in clause 8.5.2.12 is invoked with currCb, colCb, (xColCb, yColCb), refIdxLXCorner[3] and sbFlag set equal to 0 as inputs, and the output is assigned to mvLXCol and availableFlagLXCol.

Otherwise, both components of mvLXCol are set equal to 0 and availableFlagLXCol is set equal to 0.

The variables availableFlagCorner[3], predFlagL0Corner[3], cpMvL0Corner[3] and predFlagL1Corner[3] are derived as follows:

availableFlagCorner[3]=availableFlagL0Col (8-589)

predFlagL0Corner[3]=availableFlagL0Col (8-590)

*cpMvL0*Corner[3]=*mvL0*Col (8-591)

predFlagL1Corner[3]=0 (8-592)

When slice_type is equal to B, the variables availableFlagCorner[3], predFlagL1Corner[3] and cpMvL1Corner[3] are derived as follows:

availableFlagCorner[3]=
   availableFlagL0Col||availableFlagL1Col   (8-593)

predFlagL1Corner[3]=availableFlagL1Col   (8-594)

*cpMvL*1Corner[3]=*mvL*1Col   (8-595)

bcwIdxCorner[3]=0   (8-596)

When sps_affine_type_flag is equal to 1, the first four constructed affine control point motion vector merging candidates ConstK with K=1..4 including the availability flags availableFlagConstK, the reference indices refIdxLXConstK, the prediction list utilization flags predFlagLXConstK, the affine motion model indices motionModelIdcConstK, and the constructed affine control point motion vectors cpMvLXConstK[cpIdx] with cpIdx=0..2 and X being 0 or 1 are derived as follows:

1. When availableFlagCorner[0] is equal to TRUE and availableFlagCorner[1] is equal to TRUE and availableFlagCorner[2] is equal to TRUE, the following applies:
   For X being replaced by 0 or 1, the following applies:
      The variable availableFlagLX is derived as follows:
         If all of following conditions are TRUE, availableFlagLX is set equal to TRUE:
            predFlagLXCorner[0] is equal to 1
            predFlagLXCorner[1] is equal to 1
            predFlagLXCorner[2] is equal to 1
            refIdxLXCorner[0] is equal to refIdxLXCorner[1]
            refIdxLXCorner[0] is equal to refIdxLXCorner[2]
         Otherwise, availableFlagLX is set equal to FALSE.
      When availableFlagLX is equal to TRUE, the following assignments are made:

predFlag*LX*Const1=1   (8-597)

refIdx*LX*Const1=refIdx*LX*Corner[0]   (8-598)

*cpMvLX*Const1[0]=*cpMvLX*Corner[0]   (8-599)

*cpMvLX*Const1[1]=*cpMvLX*Corner[1]   (8-600)

*cpMvLX*Const1[2]=*cpMvLX*Corner[2]   (8-601)

The bi-prediction weight index bcwIdxConst1 is derived as follows:
      If availableFlagL0 is equal 1 and availableFlagL1 is equal to 1, the derivation process for bi-prediction weight index for constructed affine control point motion vector merging candidates as specified in clause 8.5.5.10 is invoked with the bi-prediction weight indices bcwIdxCorner[0], bcwIdxCorner[1] and bcwIdxCorner[2] as inputs, and the output is assigned to the bi-prediction weight index bcwIdxConst1.
      Otherwise, the bi-prediction weight index bcwIdxConst1 is set equal to 0.
   The variables availableFlagConst1 and motionModelIdcConst1 are derived as follows:
      If availableFlagL0 or availableFlagL1 is equal to 1, availableFlagConst1 is set equal to TRUE and motionModelIdcConst1 is set equal to 2.
      Otherwise, availableFlagConst1 is set equal to FALSE and motionModelIdcConst1 is set equal to 0.

2. When availableFlagCorner[0] is equal to TRUE and availableFlagCorner[1] is equal to TRUE and availableFlagCorner[3] is equal to TRUE, the following applies:
   For X being replaced by 0 or 1, the following applies:
      The variable availableFlagLX is derived as follows:
         If all of following conditions are TRUE, availableFlagLX is set equal to TRUE:
            predFlagLXCorner[0] is equal to 1
            predFlagLXCorner[1] is equal to 1
            predFlagLXCorner[3] is equal to 1
            refIdxLXCorner[0] is equal to refIdxLXCorner[1]
            refIdxLXCorner[0] is equal to refIdxLXCorner[3]
         Otherwise, availableFlagLX is set equal to FALSE.
      When availableFlagLX is equal to TRUE, the following assignments are made:

predFlag*LX*Const2=1   (8-602)

refIdx*LX*Const2=refIdx*LX*Corner[0]   (8-603)

*cpMvLX*Const2[0]=*cpMvLX*Corner[0]   (8-604)

*cpMvLX*Const2[1]=*cpMvLX*Corner[1]   (8-605)

*cpMvLX*Const2[2]=*cpMvLX*Corner[3]+
      *cpMvLX*Corner[0]−*cpMvLX*Corner[1]   (8-606)

*cpMvLX*Const2[2][0]=Clip3(−$2^{17}$,$2^{17}$−1,*cpMvLX*Const2[2][0])   (8-607)

*cpMvLX*Const2[2][1]=Clip3(−$2^{17}$,$2^{17}$−1,*cpMvLX*Const2[2][1])   (8-608)

The bi-prediction weight index bcwIdxConst2 is derived as follows:
      If availableFlagL0 is equal to 1 and availableFlagL1 is equal to 1, the derivation process for bi-prediction weight index for constructed affine control point motion vector merging candidates as specified in clause 8.5.5.10 is invoked with the bi-prediction weight indices bcwIdxCorner[0], bcwIdxCorner[1] and bcwIdxCorner[3] as inputs, and the output is assigned to the bi-prediction weight index bcwIdxConst2.
      Otherwise, the bi-prediction weight index bcwIdxConst2 is set equal to 0.
   The variables availableFlagConst2 and motionModelIdcConst2 are derived as follows:
      If availableFlagL0 or availableFlagL1 is equal to 1, availableFlagConst2 is set equal to TRUE and motionModelIdcConst2 is set equal to 2.
      Otherwise, availableFlagConst2 is set equal to FALSE and motionModelIdcConst2 is set equal to 0.

3. When availableFlagCorner[0] is equal to TRUE and availableFlagCorner[2] is equal to TRUE and availableFlagCorner[3] is equal to TRUE, the following applies:
   For X being replaced by 0 or 1, the following applies:
      The variable availableFlagLX is derived as follows:
         If all of following conditions are TRUE, availableFlagLX is set equal to TRUE:
            predFlagLXCorner[0] is equal to 1
            predFlagLXCorner[2] is equal to 1
            predFlagLXCorner[3] is equal to 1
            refIdxLXCorner[0] is equal to refIdxLXCorner[2]
            refIdxLXCorner[0] is equal to refIdxLXCorner[3]
         Otherwise, availableFlagLX is set equal to FALSE.
      When availableFlagLX is equal to TRUE, the following assignments are made:

predFlag*LX*Const3=1   (8-609)

refIdx*LX*Const3=refIdx*LX*Corner[0]   (8-610)

*cpMvLX*Const3[0]=*cpMvLX*Corner[0]   (8-611)

*cpMvLX*Const3[1]=*cpMvLX*Corner[3]+
      *cpMvLX*Corner[0]−*cpMvLX*Corner[2]   (8-612)

*cpMvLX*Const3[1][0]=Clip3(−$2^{17}$,$2^{17}$−1,*cpMvLX*Const3[1][0])   (8-613)

*cpMvLX*Const3[1][1]=Clip3(−$2^{17}$,$2^{17}$−1,*cpMvLX*Const3[1][1])   (8-614)

*cpMvLX*Const3[2]=*cpMvLX*Corner[2]   (8-615)

The bi-prediction weight index bcwIdxConst3 is derived as follows:
  If availableFlagL0 is equal to 1 and availableFlagL1 is equal to 1, the derivation process for bi-prediction weight index for constructed affine control point motion vector merging candidates as specified in clause 8.5.5.10 is invoked with the bi-prediction weight indices bcwIdxCorner[0], bcwIdxCorner[2] and bcwIdxCorner[3] as inputs, and the output is assigned to the bi-prediction weight index bcwIdxConst3.
  Otherwise, the bi-prediction weight index bcwIdxConst3 is set equal to 0.
The variables availableFlagConst3 and motionModelIdcConst3 are derived as follows:
  If availableFlagL0 or availableFlagL1 is equal to 1, availableFlagConst3 is set equal to TRUE and motionModelIdcConst3 is set equal to 2.
  Otherwise, availableFlagConst3 is set equal to FALSE and motionModelIdcConst3 is set equal to 0.
4. When availableFlagCorner[1] is equal to TRUE and availableFlagCorner[2] is equal to TRUE and availableFlagCorner[3] is equal to TRUE, the following applies:
  For X being replaced by 0 or 1, the following applies:
    The variable availableFlagLX is derived as follows:
      If all of following conditions are TRUE, availableFlagLX is set equal to TRUE:
        predFlagLXCorner[1] is equal to 1
        predFlagLXCorner[2] is equal to 1
        predFlagLXCorner[3] is equal to 1
        refIdxLXCorner[1] is equal to refIdxLXCorner[2]
        refIdxLXCorner[1] is equal to refIdxLXCorner[3]
      Otherwise, availableFlagLX is set equal to FALSE.
    When availableFlagLX is equal to TRUE, the following assignments are made:

$$predFlagLXConst4=1 \quad (8\text{-}616)$$

$$refIdxLXConst4=refIdxLXCorner[1] \quad (8\text{-}617)$$

$$cpMvLXConst4[0]=cpMvLXCorner[1]+cpMvLXCorner[2]-cpMvLXCorner[3] \quad (8\text{-}618)$$

$$cpMvLXConst4[0][0]=Clip3(-2^{17},2^{17}-1,cpMvLXConst4[0][0]) \quad (8\text{-}619)$$

$$cpMvLXConst4[0][1]=Clip3(-2^{17},2^{17}-1,cpMvLXConst4[0][1]) \quad (8\text{-}620)$$

$$cpMvLXConst4[1]=cpMvLXCorner[1] \quad (8\text{-}621)$$

$$cpMvLXConst4[2]=cpMvLXCorner[2] \quad (8\text{-}622)$$

The bi-prediction weight index bcwIdxConst4 is derived as follows:
  If availableFlagL0 is equal to 1 and availableFlagL1 is equal to 1, the derivation process for bi-prediction weight index for constructed affine control point motion vector merging candidates as specified in clause 8.5.5.10 is invoked with the bi-prediction weight indices bcwIdxCorner[1], bcwIdxCorner[2] and bcwIdxCorner[3] as inputs, and the output is assigned to the bi-prediction weight index bcwIdxConst4.
  Otherwise, the bi-prediction weight index bcwIdxConst4 is set equal to 0.
The variables availableFlagConst4 and motionModelIdcConst4 are derived as follows:
  If availableFlagL0 or availableFlagL1 is equal to 1, availableFlagConst4 is set equal to TRUE and motionModelIdcConst4 is set equal to 2.
  Otherwise, availableFlagConst4 is set equal to FALSE and motionModelIdcConst4 is set equal to 0.
The last two constructed affine control point motion vector merging candidates ConstK with K=5..6 including the availability flags availableFlagConstK, the reference indices refIdxLXConstK, the prediction list utilization flags predFlagLXConstK, the affine motion model indices motionModelIdcConstK, and the constructed affine control point motion vectors cpMvLXConstK[cpIdx] with cpIdx=0..2 and X being 0 or 1 are derived as follows:
5. When availableFlagCorner[0] is equal to TRUE and availableFlagCorner[1] is equal to TRUE, the following applies:
  For X being replaced by 0 or 1, the following applies:
    The variable availableFlagLX is derived as follows:
      If all of following conditions are TRUE, availableFlagLX is set equal to TRUE:
        predFlagLXCorner[0] is equal to 1
        predFlagLXCorner[1] is equal to 1
        refIdxLXCorner[0] is equal to refIdxLXCorner[1]
      Otherwise, availableFlagLX is set equal to FALSE.
    When availableFlagLX is equal to TRUE, the following assignments are made:

$$predFlagLXConst5=1 \quad (8\text{-}623)$$

$$refIdxLXConst5=refIdxLXCorner[0] \quad (8\text{-}624)$$

$$cpMvLXConst5[0]=cpMvLXCorner[0] \quad (8\text{-}625)$$

$$cpMvLXConst5[1]=cpMvLXCorner[1] \quad (8\text{-}626)$$

The bi-prediction weight index bcwIdxConst5 is derived as follows:
  If availableFlagL0 is equal to 1, and availableFlagL1 is equal to 1, and bcwIdxCorner[0] is equal to bcwIdxCorner[1], bcwIdxConst5 is set equal to bcwIdxCorner[0]
  Otherwise, the bi-prediction weight index bcwIdxConst5 is set equal to 0.
The variables availableFlagConst5 and motionModelIdcConst5 are derived as follows:
  If availableFlagL0 or availableFlagL1 is equal to 1, availableFlagConst5 is set equal to TRUE and motionModelIdcConst5 is set equal to 1.
  Otherwise, availableFlagConst5 is set equal to FALSE and motionModelIdcConst5 is set equal to 0.
6. When availableFlagCorner[0] is equal to TRUE and availableFlagCorner[2] is equal to TRUE, the following applies:
  For X being replaced by 0 or 1, the following applies:
    The variable availableFlagLX is derived as follows:
      If all of following conditions are TRUE, availableFlagLX is set equal to TRUE:
        predFlagLXCorner[0] is equal to 1
        predFlagLXCorner[2] is equal to 1
        refIdxLXCorner[0] is equal to refIdxLXCorner[2]
      Otherwise, availableFlagLX is set equal to FALSE.
    When availableFlagLX is equal to TRUE, the following applies:

The second control point motion vector cpMvLXCorner[1] is derived as follows:

cpMvLXCorner[1][0]=(cpMvLXCorner[0][0]<<7)+
  ((cpMvLXCorner[2][1]−cpMvLXCorner[0][1])
  (7+Log 2(cbHeight/cbWidth)))        (8-627)

cpMvLXCorner[1][1]=(cpMvLXCorner[0][1]<<7)+
  ((cpMvLXCorner[2][0]−cpMvLXCorner[0][0])
  (7+Log 2(cbHeight/cbWidth)))        (8-628)

The rounding process for motion vectors as specified in clause 8.5.2.14 is invoked with mvX set equal to cpMvLXCorner[1], rightShift set equal to 7, and leftShift set equal to 0 as inputs and the rounded cpMvLXCorner[1] as output.

The following assignments are made:

predFlagLXConst6=1        (8-629)

refIdxLXConst6=refIdxLXCorner[0]        (8-630)

cpMvLXConst6[0]=cpMvLXCorner[0]        (8-631)

cpMvLXConst6[1]=cpMvLXCorner[1]        (8-632)

cpMvLXConst6[0][0]=Clip3(−$2^{17}$,$2^{17}$−1,cpMvLX-
  Const6[0][0])        (8-633)

cpMvLXConst6[0][1]=Clip3(−$2^{17}$,$2^{17}$−1,cpMvLX-
  Const6[0][1])        (8-634)

cpMvLXConst6[1][0]=Clip3(−$2^{17}$,$2^{17}$−1,cpMvLX-
  Const6[1][0])        8-635)

cpMvLXConst6[1][1]=Clip3(−$2^{17}$,$2^{17}$−1,cpMvLX-
  Const6[1][1])        (8-636)

The bi-prediction weight index bcwIdxConst6 is derived as follows:
  If availableFlagL0 is equal to 1 and availableFlagL1 is equal to 1 and bcwIdxCorner[0] is equal to bcwIdxCorner[2], bcwIdxConst6 is set equal to bcwIdxCorner[0]
  Otherwise, the bi-prediction weight index bcwIdxConst6 is set equal to 0.
The variables availableFlagConst6 and motionModelIdcConst6 are derived as follows:
  If availableFlagL0 or availableFlagL1 is equal to 1, availableFlagConst6 is set equal to TRUE and motionModelIdcConst6 is set equal to 1.
Otherwise, availableFlagConst6 is set equal to FALSE and motionModelIdcConst6 is set equal to 0.

2.3.4.2. Regular Merge List

Different from the merge list design, in VVC, the history-based motion vector prediction (HMVP) method is employed.

In HMVP, the previously coded motion information is stored. The motion information of a previously coded block is defined as an HMVP candidate. Multiple HMVP candidates are stored in a table, named as the HMVP table, and this table is maintained during the encoding/decoding process on-the-fly. The HMVP table is emptied when starting coding/decoding a new slice. Whenever there is an inter-coded block, the associated motion information is added to the last entry of the table as a new HMVP candidate. The overall coding flow is depicted in FIG. 25.

Figure 26:
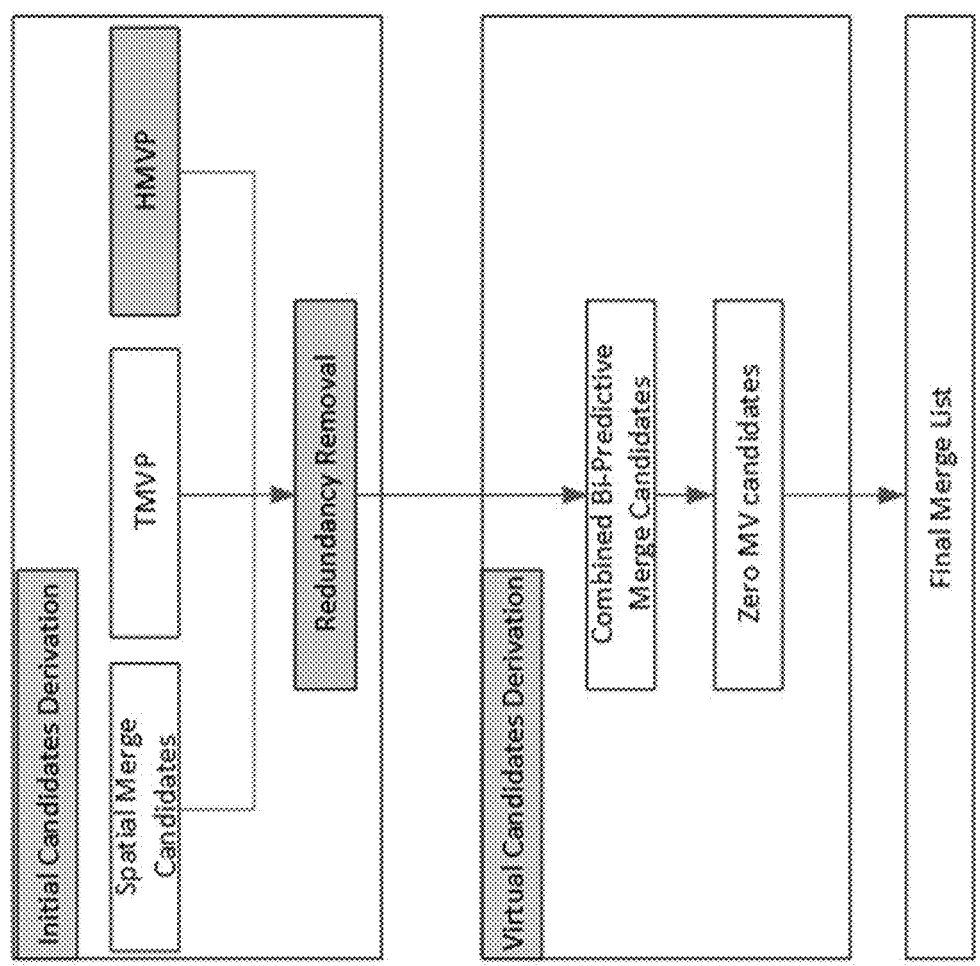
FIG. 26 shows modified merge list construction process.

HMVP candidates could be used in both AMVP and merge candidate list construction processes. FIG. 26 depicts the modified merge candidate list construction process. When the merge candidate list is not full after the TMVP candidate insertion, HMVP candidates stored in the HMVP table could be utilized to fill in the merge candidate list. Considering that one block usually has a higher correlation with the nearest neighbouring block in terms of motion information, the HMVP candidates in the table are inserted in a descending order of indices. The last entry in the table is firstly added to the list, while the first entry is added in the end. Similarly, redundancy removal is applied on the HMVP candidates. Once the total number of available merge candidates reaches the maximal number of merge candidates allowed to be signaled, the merge candidate list construction process is terminated.

Figure 25:
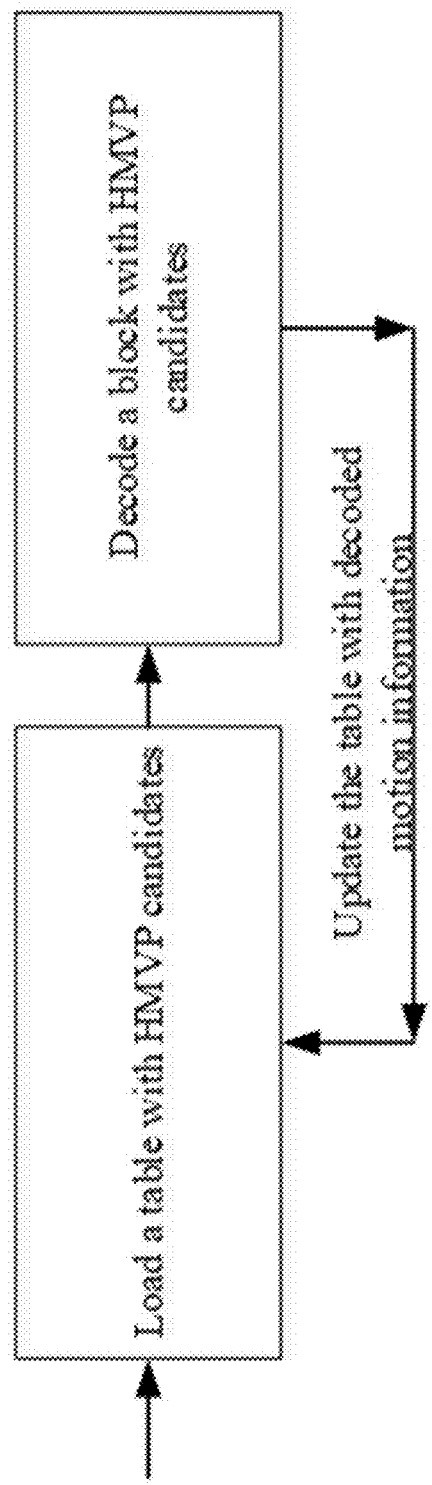
FIG. 25 shows Candidates position for affine merge mode.

FIG. 25 shows candidates position for affine merge mode.
FIG. 26 shows modified merge list construction process.

2.3.5. JVET-N0236

This contribution proposes a method to refine the sub-block based affine motion compensated prediction with optical flow. After the sub-block based affine motion compensation is performed, prediction sample is refined by adding a difference derived by the optical flow equation, which is referred as prediction refinement with optical flow (PROF). The proposed method can achieve inter prediction in pixel level granularity without increasing the memory access bandwidth.

To achieve a finer granularity of motion compensation, this contribution proposes a method to refine the sub-block based affine motion compensated prediction with optical flow. After the sub-block based affine motion compensation is performed, luma prediction sample is refined by adding a difference derived by the optical flow equation. The proposed PROF (prediction refinement with optical flow) is described as following four steps.

Step 1) The sub-block-based affine motion compensation is performed to generate sub-block prediction I(i, j).

Step 2) The spatial gradients $g_x(i, j)$ and $g_y(i,j)$ of the sub-block prediction are calculated at each sample location using a 3-tap filter [−1, 0, 1].

$$g_x(i,j)=I(i+1,j)-I(i-1,j)$$

$$g_y(i,j)=I(i,j+1)-I(i,j-1)$$

The sub-block prediction is extended by one pixel on each side for the gradient calculation. To reduce the memory bandwidth and complexity, the pixels on the extended borders are copied from the nearest integer pixel position in the reference picture. Therefore, additional interpolation for padding region is avoided.

Figure 27:
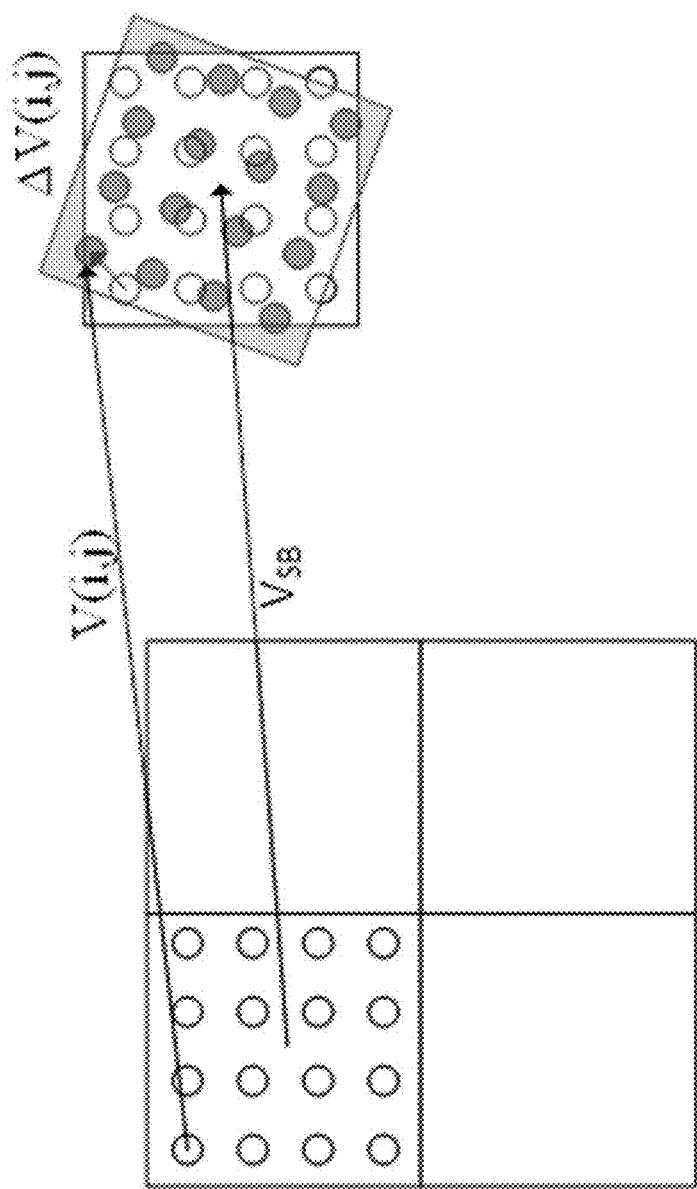
FIG. 27 shows sub-block MV VSB and pixel $\Delta v(i, j)$ (red arrow).

Step 3) The luma prediction refinement is calculated by the optical flow equation.

$$\Delta(i,j)=g_x(i,j)*\Delta v_x(i,j)+g_y(i,j)*\Delta v_y(i,j)$$

where the $\Delta v(i, j)$ is the difference between pixel MV computed for sample location (i,j), denoted by v(i, j), and the sub-block MV of the sub-block to which pixel (i,j) belongs, as shown in FIG. 27.

Since the affine model parameters and the pixel location relative to the sub-block center are not changed from sub-block to sub-block, $\Delta v(i, j)$ can be calculated for the first sub-block, and reused for other sub-blocks in the same CU. Let x and y be the horizontal and vertical offset from the pixel location to the center of the sub-block, $\Delta v(x,y)$ can be derived by the following equation, $$\begin{cases} \Delta v_x(x, y) = c*x+d*y \\ \Delta v_y(x, y) = e*x+f*y \end{cases}$$

For 4-parameter affine model, $$\begin{cases} c = f = \dfrac{v_{1x} - v_{0x}}{w} \\ e = -d = \dfrac{v_{1y} - v_{0y}}{w} \end{cases}$$

For 6-parameter affine model, $$\begin{cases} c = \dfrac{v_{1x} - v_{0x}}{w} \\ d = \dfrac{v_{2x} - v_{0x}}{h} \\ e = \dfrac{v_{1y} - v_{0y}}{w} \\ f = \dfrac{v_{2y} - v_{0y}}{h} \end{cases}$$

where $(v_{0x}, v_{0y})$, $(x_{1x}, v_{1y})$, $(v_{2x}, v_{2y})$ are the top-left, top-right and bottom-left control point motion vectors, w and h are the width and height of the CU.

Step 4) Finally, the luma prediction refinement is added to the sub-block prediction I(i,j). The final prediction I' is generated as the following equation.

$$I'(i,j) = I(i,j) + \Delta I(i,j)$$

2.3.6. PCT/CN2018/125420 and PCT/CN2018/116889 on Improvements of ATMVP

In these documents, we disclosed several approaches to make the design of ATMVP more reasonable and efficient, both are incorporated by reference in their entirety.

3. EXAMPLES OF PROBLEMS SOLVED BY EMBODIMENTS

In the current design of VVC, sub-block-based prediction mode has following problems:
1) Affine AMVR flag in SPS may be turned on when regular AMVR is turned off;
2) Affine AMVR flag in SPS may be turned on when affine mode is turned off;
3) MaxNumSubblockMergeCand is not set appropriately when ATMVP is not applied.
4) When TMVP is disabled for a slice, and ATMVP is enabled for a sequence, collocated pictures for B slices were not identified, however, a collocated picture is required in the ATMVP process.
5) Both TMVP and ATMVP require to fetch motion information from reference pictures, in current design, it is assumed to be the same which may be sub-optimal.
6) PROF should have a flag to control its on/off;

4. EXAMPLE EMBODIMENTS

The detailed inventions below should be considered as examples to explain general concepts. These inventions should not be interpreted in a narrow way. Furthermore, these inventions can be combined in any manner. Although some embodiments are described using examples of alternative temporal motion vector prediction (ATMVP) techniques, in alternate embodiments, subblock-based temporal motion vector prediction (sbTMVP) techniques can be applicable The methods described below may be also applicable to other kinds of motion candidate lists (such as AMVP candidate list).

1. Whether the controlling information for affine AMVR is signaled may depend on whether affine prediction is applied or not.
   a) In one example, the controlling information for affine AMVR is not signaled if the affine prediction is not applied.
   b) In one example, affine AMVR shall be disabled (e.g., usage of affine AMVR shall be signaled to be false) if affine prediction is not applied in a conformance bit-stream.
   c) In one example, the signaled controlling information for affine AMVR may be ignored and inferred to be not applied if affine prediction is not applied.
2. Whether the controlling information for affine AMVR is signaled may depend on whether regular AMVR is applied or not.
   a) In one example, the controlling information for affine AMVR is not signaled if the regular AMVR is not applied.
   b) In one example, affine AMVR shall be disabled (e.g., usage of affine AMVR flag is signaled to be false) if the regular AMVR is not applied in a conformance bit-stream.
   c) In one example, the signaled controlling information for affine AMVR may be ignored and inferred to be not applied if the regular AMVR is not applied.
   d) In one example, an indication of adaptive motion vector resolution (e.g., one flag) may be signaled in sequence/picture/slice/tile group/tile/brick/other video units to control the usage of AMVR for multiple coding methods, such as regular AMVR (i.e., AMVR applied to translational motion) and affine AMVR (i.e., AMVR applied to affine motion).
      i. In one example, such an indication may be signaled in SPS/DPS/VPS/PPS/picture header/slice header/tile group header.
      ii. Alternatively, furthermore, whether to signal the indication of usage of regular AMVR and/or affine AMVR may depend on the indication.
         1) In one example, when such an indication indicates that adaptive motion vector resolution is disabled, signaling of the indication of usage of regular AMVR may be skipped.
         2) In one example, when such an indication indicates that adaptive motion vector resolution is disabled, signaling of the indication of usage of affine AMVR may be skipped.
      iii. Alternatively, furthermore, whether to signal the indication of usage of affine AMVR may depend on the indication and the usage of affine prediction mode.
         1) For example, such indication may be skipped if affine prediction mode is disabled.
      iv. In one example, such an indication may not be signaled if current slice/tile group/picture can only be predicted from preceding pictures and may be derived to be false.
      v. In one example, such an indication may not be signaled if current slice/tile group/picture can only be predicted from following pictures and may be derived to be false.

vi. In one example, such an indication may be signaled when current slice/tile group/picture can be predicted from both preceding pictures and following pictures.
3. Whether the controlling information for affine AMVR is signaled may depend on whether regular AMVR is applied or not, and whether affine prediction is applied or not.
   a) In one example, the controlling information for affine AMVR is not signaled if the affine prediction is not applied or regular AMVR is not applied.
      i. In one example, affine AMVR shall be disabled (e.g., usage of affine AMVR shall be signaled to be false) if affine prediction is not applied or regular AMVR is not applied in a conformance bitstream.
      ii. In one example, the signaled controlling information for affine AMVR may be ignored and inferred to be not applied if affine prediction is not applied or regular AMVR is not applied.
   b) In one example, the controlling information for affine AMVR is not signaled if the affine prediction is not applied and regular AMVR is not applied.
      i. In one example, affine AMVR shall be disabled (e.g., usage of affine AMVR shall be signaled to be false) if affine prediction is not applied and regular AMVR is not applied in a conformance bitstream.
      ii. In one example, the signaled controlling information for affine AMVR may be ignored and inferred to be not applied if affine prediction is not applied and regular AMVR is not applied.
4. The maximum number of candidates in the sub-block merge candidate list (denoted as MaxNumSubblockMergeCand) may depend on whether ATMVP is enabled or not. Whether ATMVP is enabled or not may not be indicated only by sps_sbtmvp_enabled_flag in SPS.
   a) For example, whether ATMVP is enabled or not may not only depend on a flag signaled in sequence level (such as sps_sbtmvp_enabled_flag in SPS). It may also depend on one or multiple syntax elements signaled in any other video units at sequence/picture/slice/tile group/tile level such as VPS, DPS, APS, PPS, slice header, tile group header, picture header, etc.
      i. Alternatively, whether ATMVP is enabled may be implicitly derived without signaling.
      ii. For example, ATMVP is not enabled for a picture or slice or tile group if TMVP is not enabled for the picture or slice or tile group.
   b) For example, whether to and/or how to signal the syntax element(s) related to MaxNumSubblockMergeCand (such as five_minus_max_num_subblock_merge_cand) may depend on whether ATMVP is enabled or not.
      i. For example, five_minus_max_num_subblock_merge_cand may be constrained in a conformance bitstream if ATMVP is not enabled.
         1) For example, five_minus_max_num_subblock_ merge_cand is not allowed to be equal to a fixed number if ATMVP is not enabled. In two examples, the fixed number may be 0 or 5.
         2) For example, five_minus_max_num_subblock_ merge_cand is not allowed to be larger than a fixed number if ATMVP is not enabled. In one example, the fixed number may be 4.
         3) For example, five_minus_max_num_subblock_ merge_cand is not allowed to be smaller than a fixed number if ATMVP is not enabled. In one example, the fixed number may be 1.
      ii. For example, five_minus_max_num_subblock_ merge_cand may be set to as five_minus_ max_num_subblock_merge_cand-(ATMVP is enabled ? 0:1) when it is not present, where whether ATMVP is enabled does not only depend on a flag in SPS (such as sps_sbtmvp_enabled_flag)
   c) For example, MaxNumSubblockMergeCand may be derived depending on one or multiple syntax elements (e.g. five_minus_max_num_subblock_merge_ cand) and whether ATMVP is enabled or not.
      i. For example, MaxNumSubblockMergeCand may be derived as MaxNumSubblockMergeCand=5-five_minus_max_num_subblock_merge_cand−(ATMVP is enabled ? 0:1).
   d) MaxNumSubblockMergeCand may be set to 1 when ATMVP is enabled, and affine motion prediction is disabled.
5. Default candidates (with translational and/or affine motion) may be appended in the sub-block merge candidate list. A default candidate may be with a prediction type, such as sub-block prediction, or it may be with whole-block prediction.
   a) In one example, the whole-block prediction for a default candidate may be follow the translational motion model (such as the whole-block prediction for a regular merge candidate).
   b) In one example, the sub-block prediction for a default candidate may be follow the translational motion model (such as the sub-block prediction for an ATMVP candidate).
   c) In one example, the sub-block prediction for a default candidate may be follow the affine motion model (such as the sub-block prediction for an affine merge candidate).
   d) In one example, the default candidate may be with the affine flag equal to 0.
      i. Alternatively, the default candidate may be with the affine flag equal to 1.
   e) In one example, the succeeding procedures on a block may depend on whether the block is coded with the default candidate.
      i. In one example, the block is treated as coded with whole-block prediction (e.g., the selected default candidate is with the whole-block prediction), and
         1) For example, PROF may not be applied on the block.
         2) For example, DMVR (Decode-side Motion Vector Refinement) may be applied on the block.
         3) For example, BDOF (Bi-Directional Optical Flow) may be applied on the block.
         4) For example, deblocking filtering may not be applied on boundaries between sub-blocks in the block.
      ii. In one example, the block is treated as coded with sub-block prediction (e.g., the selected default candidate is with the sub-block prediction), and
         1) For example, PROF may be applied on the block.
         2) For example, DMVR (Decode-side Motion Vector Refinement) may not be applied on the block.

3) For example, BDOF (Bi-Directional Optical Flow) may not be applied on the block.
4) For example, deblocking filtering may be applied on boundaries between sub-blocks in the block.

iii. In one example, the block is treated as coded with translational prediction, and
1) For example, PROF may not be applied on the block.
2) For example, DMVR (Decode-side Motion Vector Refinement) may be applied on the block.
3) For example, BDOF (Bi-Directional Optical Flow) may be applied on the block.
4) For example, deblocking filtering may not be applied on boundaries between sub-blocks in the block.

iv. In one example, the block is treated as coded with affine prediction, and
1) For example, PROF may be applied on the block.
2) For example, DMVR (Decode-side Motion Vector Refinement) may not be applied on the block.
3) For example, BDOF (Bi-Directional Optical Flow) may not be applied on the block.
4) For example, deblocking filtering may be applied on boundaries between sub-blocks in the block.

f) In one example, one or multiple kinds of default candidates may be put into the sub-block merge candidate list.
i. For example, a first kind of default candidates with whole-block prediction and a second kind of default candidates with sub-block prediction may be both put into the sub-block merge candidate list.
ii. For example, a first kind of default candidates with translational prediction and a second kind of default candidates with affine prediction may be both put into the sub-block merge candidate list.
iii. The maximum number of default candidates from each kind may depend on whether ATMVP is enabled and/or whether affine prediction is enabled.

g) In one example, for B slices, the default candidates may be with zero motion vectors for all sub-blocks, bi-prediction is applied, and both reference picture indices are set to 0.

h) In one example, for P slices, the default candidates may be with zero motion vectors for all sub-blocks, uni-prediction is applied, and reference picture index is set to 0.

i) Which kind of default candidates is put into the sub-block merge candidate list may depend on the usage of ATMVP and/or affine prediction mode.
i. In one example, when affine prediction mode is enabled, default candidates with the affine motion model (e.g. all CPMVs equal to 0) with affine flag equal to 1 may be added.
ii. In one example, when both affine prediction mode and ATMVP are enabled, default candidates with the translational motion model (e.g. zero MVs) with affine flag equal to 0 and/or default candidates with the affine motion model (e.g. all CPMVs equal to 0) with affine flag equal to 1 may be added.

1) In one example, default candidates with the translational motion model may be added before default candidates with the affine motion model.
iii. In one example, when affine prediction is disabled and ATMVP is enabled, default candidates with the translational motion model with affine flag equal to 0 may be added, and default candidates with the affine motion model are not.

j) The above methods may be applied when the sub-block merge candidate is not fulfilled after checking ATMVP candidate and/or spatial/temporal/constructed affine merge candidates, 6. The information about ATMVP such as whether ATMVP is enabled for a slice or tile group or picture may be signaled in the slice header or tile group header or slice header.
a) In one example, the collocated picture for ATMVP may be different from the collocated picture used for TMVP.
b) In one example, the information about ATMVP may not be signaled for I-slice or I-tile group or I-picture.
c) In one example, the information about ATMVP may only be signaled if ATMVP is signaled to be enabled in sequence level. (e.g. sps_sbtmvp_enabled_flag is equal to 1.)
d) In one example, the information about ATMVP may not be signaled for a slice or tile group or picture if TMVP is disabled for that slice or tile group or picture.
i. For example, ATMVP may be inferred to be disabled in this case.
e) ATMVP may be inferred to be disabled for a slice (or tile group or picture) if TMVP is disabled for that slice (or tile group or picture) regardless the signaled information of usage of ATMVP.

7. Whether to add subblock-based temporal merging candidates (e.g., the temporal affine motion candidate) may depend on the usage of TMVP.
a) Alternatively, it may depend on the value of sps_temporal_mvp_enabled_flag.
b) Alternatively, it may depend on the value of slice_temporal_mvp_enabled_flag.
c) When sps_temporal_mvp_enabled_flag or slice_temporal_mvp_enabled_flag is true, subblock-based temporal merging candidates may be added to the sub-block merge candidate.
i. Alternatively, when sps_temporal_mvp_enabled_flag and slice_temporal_mvp_enabled_flag are both true, subblock-based temporal merging candidates may be added to the sub-block merge candidate.
ii. Alternatively, when sps_temporal_mvp_enabled_flag or slice_temporal_mvp_enabled_flag is false, subblock-based temporal merging candidates shall not be added to the sub-block merge candidate.
d) Alternatively, the indication of adding subblock-based temporal merging candidates may be signaled in sequence/picture/slice/tile group/tile/brick/other video units.
i. Alternatively, furthermore, it may be conditionally signaled according to the usage of temporal motion vector prediction (e.g., sps_temporal_mvp_enabled_flag and/or slice_temporal_mvp_enabled_flag)

8. The indication of the collocated reference picture, such as which reference picture list that the collocated reference picture is derived from (e.g., collocated_from_l0_flag) and/or the reference index of the collocated reference picture may be conditionally signaled according to the usage of multiple coding methods that require to access temporal motion information.
  a) In one example, the conditions are one of ATMVP or TMVP is enabled.
  b) In one example, the conditions are one of ATMVP or TMVP or affine motion information prediction is enabled.
9. In one example, subblock-based temporal merging candidates may only be put into the sub-block merge candidate list when both ATMVP and TMVP are enabled for the current picture/slice/tile group.
  a) Alternatively, subblock-based temporal merging candidates may only be put into the sub-block merge candidate list when ATMVP is enabled for the current picture/slice/tile group.
10. MaxNumSubblockMergeCand may depend on whether subblock-based temporal merging candidates can be used.
  a) Alternatively, MaxNumSubblockMergeCand may depend on whether TMVP can be used.
  b) For example, MaxNumSubblockMergeCand shall be no larger than 4 if subblock-based temporal merging candidates (or TMVP) cannot be used.
    i. For example, MaxNumSubblockMergeCand shall be no larger than 4 if subblock-based temporal merging candidates (or TMVP) cannot be used and ATMVP can be used.
    ii. For example, MaxNumSubblockMergeCand shall be no larger than 4 if subblock-based temporal merging candidates (or TMVP) cannot be used and ATMVP cannot be used.
    iii. For example, MaxNumSubblockMergeCand shall be no larger than 3 if subblock-based temporal merging candidates (or TMVP) cannot be used and ATMVP cannot be used.
11. One or multiple syntax elements to indicate whether to and/or how to conduct PROF may be signaled in any video units in at sequence/picture/slice/tile group/tile/CTU row/CTU/CU/PU/TU level such as VPS, DPS, APS, PPS, slice header, tile group header, picture header, CTU, CU, PU etc.
  a) In one example, the one or multiple syntax elements (such as a flag to indicate whether PROF is enabled) may be signaled conditionally depending on other syntax elements, such as the syntax element(s) to indicate whether affine prediction is enabled.
    i. For example, the syntax element(s) to indicate whether PROF is enabled may not be signaled and PROF is inferred to be disabled when affine prediction is disabled.
  b) In one example, the syntax element(s) to indicate whether PROF is enabled must be set to PROF is disabled when affine prediction is disabled in a conformance bit-stream.
  c) In one example, the signaled syntax element(s) to indicate whether PROF is enabled is ignored and PROF is inferred to be disabled when affine prediction is disabled in a conformance bit-stream.
  d) In one example, one syntax element may be signaled to indicate whether PROF is only applied to uni-prediction or not.

5. EMBODIMENTS

For all the following embodiments, the syntax elements may be signalled in different level, such as in SPS/PPS/Slice header/picture header/tile group header/tile or other video units.

5.1. Embodiment #1: Examples of Syntax Design on sps_affine_amvr_enabled_flag in SPS/PPS/Slice header/Tile Group Header

| | |
|---|---|
| sps_amvr_enabled_flag | u(1) |
| ... | |
| *if(sps_amvr_enabled_flag)* | |
|    *sps_affine_amvr_enabled_flag* | *u(1)* |

Alternatively,

| | |
|---|---|
| sps_affine_enabled_flag | u(1) |
| ... | |
| *if(sps_affine_enabled_flag)* | |
|    *sps_affine_amvr_enabled_flag* | *u(1)* |

Alternatively,

| | |
|---|---|
| sps_affine_enabled_flag | u(1) |
| ... | |
| sps_amvr_enabled_flag | u(1) |
| ... | |
| *if(sps_affine_enabled_flag && sps_amvr_enabled_flag )* | |
|    *sps_affine_amvr_enabled_flag* | *u(1)* |

Alternatively,

| | |
|---|---|
| sps_amvr_enabled_flag | u(1) |
| ... | |
| sps_affine_enabled_flag | u(1) |
| ... | |
| *if(sps_affine_enabled_flag && sps_amvr_enabled_flag )* | |
|    *sps_affine_amvr_enabled_flag* | *u(1)* |

5.2. Embodiment #2: Examples of Semantics on five_minus_max_num_subblock_merge_cand five_minus_max_num_subblock_merge_cand specifies the maximum number of subblock-based merging motion vector prediction (MVP) candidates supported in the slice subtracted from 5. When five_minus_max_num_subblock_merge_cand is not present, it is inferred to be equal to 5−(sps_sbtmvp_enabled_flag && slice_temporal_mvp_enabled_flag). The maximum number of subblock-based merging MVP candidates, MaxNumSubblockMergeCand is derived as follows:

MaxNumSubblockMergeCand=5−five_minus_max_num_subblock_merge_cand

The value of MaxNumSubblockMergeCand shall be in the range of 0 to 5, inclusive.

Alternatively, the following may apply:

When ATMVP is enabled, and affine is disabled, the value of MaxNumSubblockMergeCand shall be in the range of 0 to 1, inclusive. When affine is enabled, the value of MaxNumSubblockMergeCand shall be in the range of 0 to 5, inclusive.

5.3. Embodiment #3: Examples of Syntax Elements for ATMVP in Slice Header (or Tile Group Header)

| | |
|---|---|
| if ( slice_type != I ) { | |
|   if( sps_temporal_mvp_enabled_flag ) | |
|     slice_temporal_mvp_enabled_flag | u(1) |
|   if( slice_type == B ) | |
|     mvd_l1_zero_flag | u(1) |
|   if( cabac_init_present_flag ) | |
|     cabac_init_flag | u(1) |
|   if( slice_temporal_mvp_enabled_flag ) { | |
|     if( slice_type == B ) | |
|       collocated_from_l0_flag | u(1) |
|   } | |
| *if(sps_sbtmvp_enabled_flag && slice_temporal_mvp_enabled_flag)* | |
|   *slice_sbtmvp_enabled_flag* | u(1) |

Alternatively,

| | |
|---|---|
| if ( slice_type != I ) { | |
|   if( sps_temporal_mvp_enabled_flag ) | |
|     slice_temporal_mvp_enabled_flag | u(1) |
|   *if(sps_sbtmvp_enabled_flag)* | |
|     *slice_sbtmvp_enabled_flag* | *u(1)* |
|   if( slice_type == B ) | |
|     mvd_l1_zero_flag | u(1) |
|   if( cabac_init_present_flag ) | |
|     cabac_init_flag | u(1) |
|   if( slice_temporal_mvp_enabled_flag \|\| slice_sbtmvp_enabled_flag) { | |
|     if( slice_type == B ) | |
|       collocated_from_l0_flag | u(1) |
|   } | |

5.4. Embodiment #4: Examples of Syntax Elements for Subblock-Based Temporal Merging Candidates in Slice Header (or Tile Group Header)

| | |
|---|---|
| *if (slice_temporal_mvp_enabled_flag && MaxNumSubblockMergeCand > 0)* | |
|   *sub_block_tmvp_merge_candidate_enalbed_flag* | *u(1)* | sub_block_tmvp_merge_candidate_enalbed_flag specifies whether subblock-based temporal merging candidates can be used or not.
If not present, sub_block_tmvp_merge_candidate_enalbed_flag is inferred to be 0.
8.5.5.6 Derivation Process for Constructed Affine Control Point Motion Vector Merging Candidates
. . .
The fourth (collocated bottom-right) control point motion vector cpMvLXCorner[3], reference index refIdxLXCorner[3], prediction list utilization flag predFlagLXCorner[3], bi-prediction weight index bcwIdxCorner[3] and the availability flag availableFlagCorner[3] with X being 0 and 1 are derived as follows:
  The reference indices for the temporal merging candidate, refIdxLXCorner[3], with X being 0 or 1, are set equal to 0.

The variables mvLXCol and availableFlagLXCol, with X being 0 or 1, are derived as follows:
  If SLICE TEMPORAL MVP ENABLED FLAG sub_block_tmvp_merge_candidate_enalbed_flag is equal to 0 or both components of mvLXCol are set equal to 0 and availableFlagLXCol is set equal to 0.
  Otherwise (SLICE_TEMPORAL_MVP_ENABLED_FLAG sub_block_tmvp_merge_candidate_enalbed_flag is equal to 1), the following applies:
. . .

5.5. Embodiment #4: Examples of Syntax/Semantics to Control PROF in SPS

| | |
|---|---|
| sps_affine_enabled_flag | u(1) |
| *if( sps_affine_enabled_flag )* | |
|   *sps_prof_flag* | *u(1)* | sps_prof_flag specifies whether PROF can be used for inter prediction. If sps_prof_flag is equal to 0, PROF is not applied. Otherwise (sps_prof_flag is equal to 1), PROF is applied. When not present, the value of sps_prof_flag is inferred to be equal to 0.

Figure 28:
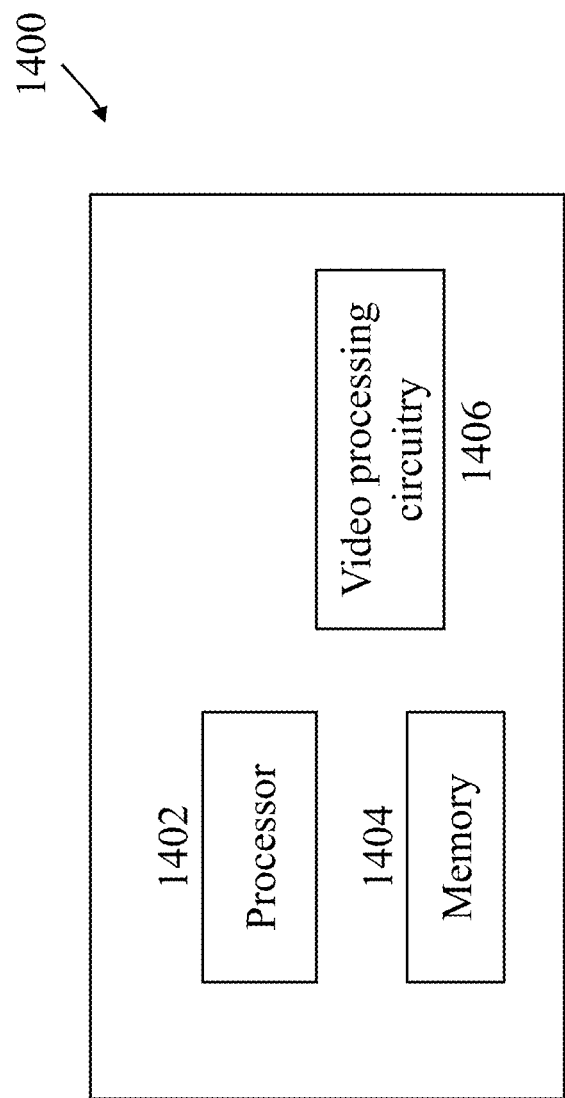
FIG. 28 is a block diagram of an example of a hardware platform used for implementing methods described in the present document.

FIG. 28 is a block diagram of a video processing apparatus 1400. The apparatus 1400 may be used to implement one or more of the methods described herein. The apparatus 1400 may be embodied in a smartphone, tablet, computer, Internet of Things (IoT) receiver, and so on. The apparatus 1400 may include one or more processors 1402, one or more memories 1404 and video processing hardware 1406. The processor(s) 1402 may be configured to implement one or more methods described in the present document. The memory (memories) 1404 may be used for storing data and code used for implementing the methods and techniques described herein. The video processing hardware 1406 may be used to implement, in hardware circuitry, some techniques described in the present document.

Figure 29:
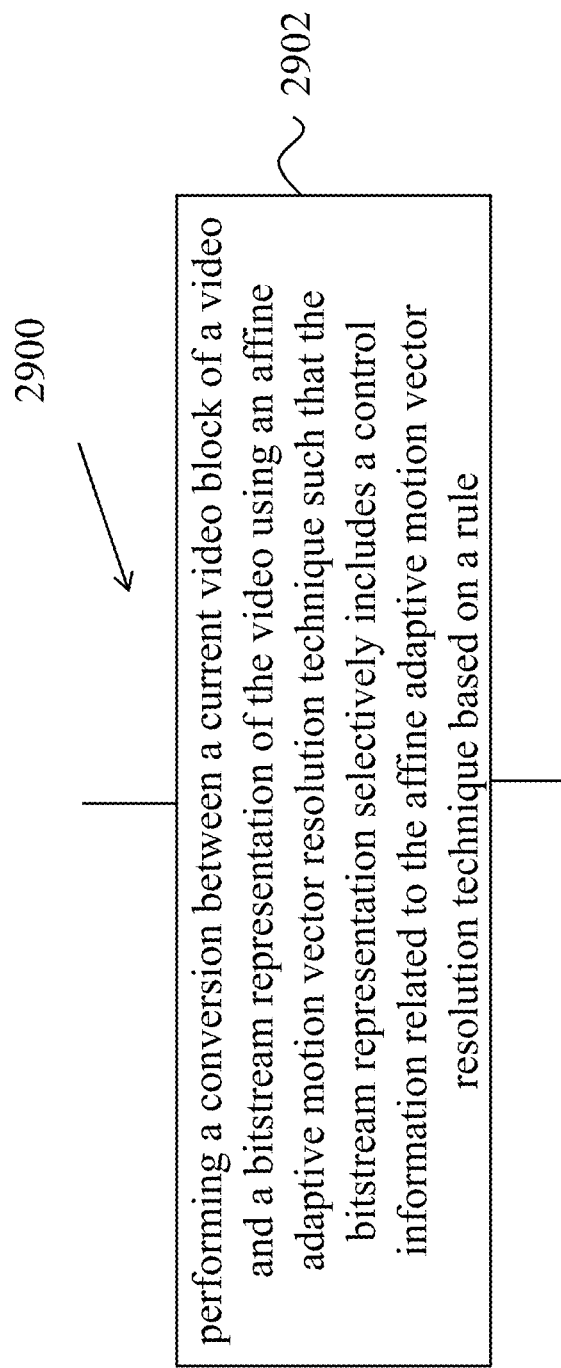
FIG. 29 is a flowchart for an example method of video processing.

FIG. 29 is a flowchart for an example method 2900 of video processing. The method 2900 includes performing (2902) a conversion between a current video block of a video and a bitstream representation of the video using an affine adaptive motion vector resolution technique such that the bitstream representation selectively includes a control information related to the affine adaptive motion vector resolution technique based on a rule.

The following listing of examples provide embodiments that can addressed the technical problems described in the present document, among other problems.

1. A method of video processing, comprising: performing a conversion between a current video block of a video and a bitstream representation of the video using an affine adaptive motion vector resolution technique such that the bitstream representation selectively includes a control information related to the affine adaptive motion vector resolution technique based on a rule.

2. The method of example 1, wherein the rule specifies including the control information in a case that affine prediction is used during the conversion and omitting the control information in a case that affine prediction is not used during the conversion.

3. The method of example 1, wherein the rule further specifies to exclude using an adaptive motion vector resolution step during the conversion in a case that affine prediction is not applied to the conversion.

Additional examples and embodiments related to above examples are provided in section 4, item 1.

4. The method of example 1, wherein the rule specifies to include or omit the control information based on whether or not a regular adaptive motion vector resolution step is used during the conversion.

5. The method of example 4, wherein the rule specifies that the control information is omitted in a case that the regular adaptive motion vector resolution step is not applied during the conversion.

6. The method of example 1, wherein the control information includes a same field indicative of use of multiple adaptive motion vector resolution techniques during the conversion.

Additional examples and embodiments related to above examples are provided in section 4, item 2.

7. The method of example 1, wherein the rule specifies to include or omit the control information based on whether or not regular adaptive motion vector resolution and affine prediction are used or not used during the conversion.

8. The method of example 7, wherein the rule specifies omitting the control information in a case that the regular adaptive motion vector resolution and affine prediction are both not applied during the conversion.

Additional examples and embodiments related to above examples are provided in section 4, item 3.

9. A method of video processing, comprising: determining, during a conversion between a current video block and a bitstream representation, a sub-block merge candidate list for the conversion, wherein a maximum number of candidates in the sub-block merge candidate list depends on whether or not alternative temporal motion vector prediction (ATMVP) is applied to the conversion; and performing the conversion using the sub-block merge candidate list.

10. The method of example 9, wherein a field in the bitstream representation indicates whether or not alternative temporal motion vector prediction is applied to the conversion.

11. The method of example 10, wherein the field is at a sequence level or a video parameter set level or a picture parameter set level or a slice level or a tile group level or a picture header level.

12. The method of example 9, wherein the maximum number of candidates is set to 1, in a case that ATMVP is applied to the conversion and affine prediction is disabled for the conversion.

Additional examples and embodiments related to above examples are provided in section 4, item 4.

13. A method of video processing, comprising: appending, during a conversion between a current video block and a bitstream representation, one or more default merge candidates to a sub-block merge candidate list for the conversion; and performing the conversion using the sub-block merge candidate list with appended one or more default merge candidates.

14. The method of example 13, wherein a default candidate is associated with a sub-block prediction type.

15. The method of example 14, wherein the sub-block prediction type includes a prediction based on a translational motion model or an affine motion model.

16. The method of example 13, wherein a default candidate is associated with a whole block prediction type.

17. The method of example 14, wherein the whole block prediction type includes a prediction based on a translational motion model or an affine motion model.

Additional examples and embodiments related to above examples are provided in section 4, item 5.

18. A method of video processing, comprising: determining, during a conversion between a current video block of a video and a bitstream representation, applicability of alternative temporal motion vector prediction (ATMVP) to the conversion wherein one or more bits in the bitstream representation correspond to the determining; and performing the conversion based on the determining.

19. The method of example 18, wherein the one or more bits are includes at a picture header or a slice header or a tile group header.

20. The method of examples 18-19, wherein the conversion uses a collocated picture for ATMVP that is different from another collocated picture used for the conversion of the video using temporal motion vector prediction (TMVP).

Additional examples and embodiments related to above examples are provided in section 4, item 6.

21. A method of video processing, comprising: building a sub-block merge candidate list selectively based on a condition associated with a temporal motion vector prediction (TMVP) step or an alternative temporal motion vector prediction (ATMVP); and performing a conversion between a current video block and a bitstream representation of the current video block based on the sub-block merge candidate list.

22. The method of example 21, wherein the condition corresponds to presence of a flag in the bitstream representation at a sequence parameter set level or a slice level or a tile level or a brick level.

23. The method of example 21, wherein the sub-block merge candidate list is built using sub-block based temporal merging candidates only when both alternative motion vector prediction and TMVP step are enabled for a picture or a tile or a tile group to which the current video block belongs.

24. The method of example 21, wherein the sub-block merge candidate list is built using sub-block based temporal merging candidates only when both ATMVP and TMVP step are enabled for a picture or a tile or a tile group to which the current video block belongs.

25. The method of example 21, wherein the sub-block merge candidate list is built using sub-block based temporal merging candidates only when ATMVP is enabled and TMVP step is disabled for a picture or a tile or a tile group to which the current video block belongs.

Additional examples and embodiments related to above examples are provided in section 4, item 7 and 9.

26. The method of examples 21-25, wherein a flag in the bitstream representation is included or omitted based on whether or not sub-block based temporal merging candidates are used during the conversion.

Additional examples and embodiments related to above examples are provided in section 4, item 10.

27. A method of video processing, comprising: performing a conversion between a current video block of a video and a bitstream representation of the video selectively using a predictive refinement using optical flow (PROF) based on a rule, wherein the rule comprises (1) inclusion or omission of a field in the bitstream representation or (2) whether or not affine prediction is applied to the conversion.

28. The method of example 27, wherein the rule specifies disabling PROF due to disabling of affine prediction for the conversion.

29. The method of example 27, wherein, in a case that affine prediction is disabled, then it is inferred that PROF is disabled for the conversion.

30. The method of example 27, wherein the rule further specifies to use PROF only for uni-prediction based on a corresponding flag in the bitstream representation.

Additional examples and embodiments related to above examples are provided in section 4, item 11.

31. A video processing apparatus comprising a processor configured to implement one or more of examples 1 to 30.

32. A computer-readable medium having code stored thereon, the code, when executed by a processor, causing the processor to implement a method recited in any one or more of examples 1 to 30.

In the listing of examples in this present document, the term conversion may refer to the generation of the bitstream representation for the current video block or generating the current video block from the bitstream representation. The bitstream representation need not represent a contiguous group of bits and may be divided into bits that are included in header fields or in codewords representing coded pixel value information.

In the examples above, the rule may be pre-defined and known to encoders and decoders.

Figure 30:
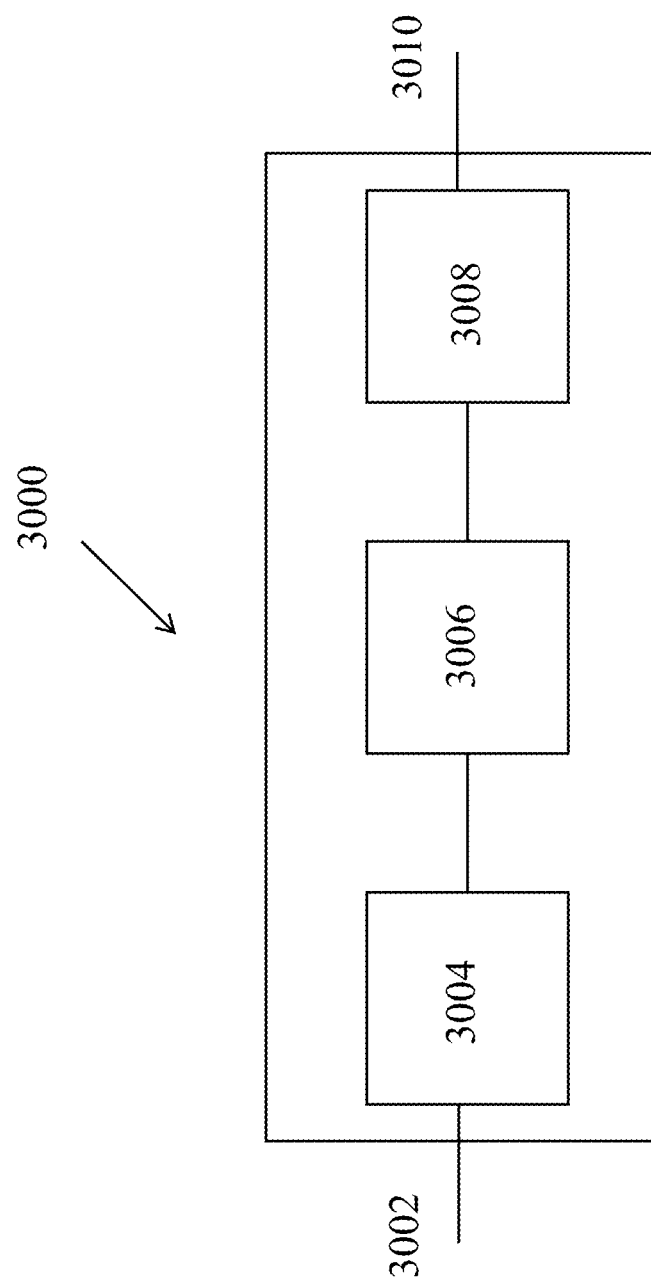
FIG. 30 is a block diagram of an example video processing system in which disclosed techniques may be implemented.

FIG. 30 is a block diagram showing an example video processing system 3000 in which various techniques disclosed herein may be implemented. Various implementations may include some or all of the components of the system 3000. The system 3000 may include input 3002 for receiving video content. The video content may be received in a raw or uncompressed format, e.g., 8 or 10 bit multi-component pixel values, or may be in a compressed or encoded format. The input 3002 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 3000 may include a coding component 3004 that may implement the various coding or encoding methods described in the present document. The coding component 3004 may reduce the average bitrate of video from the input 3002 to the output of the coding component 3004 to produce a coded representation of the video. The coding techniques are therefore sometimes called video compression or video transcoding techniques. The output of the coding component 3004 may be either stored, or transmitted via a communication connected, as represented by the component 3006. The stored or communicated bitstream (or coded) representation of the video received at the input 3002 may be used by the component 3008 for generating pixel values or displayable video that is sent to a display interface 3010. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 31:
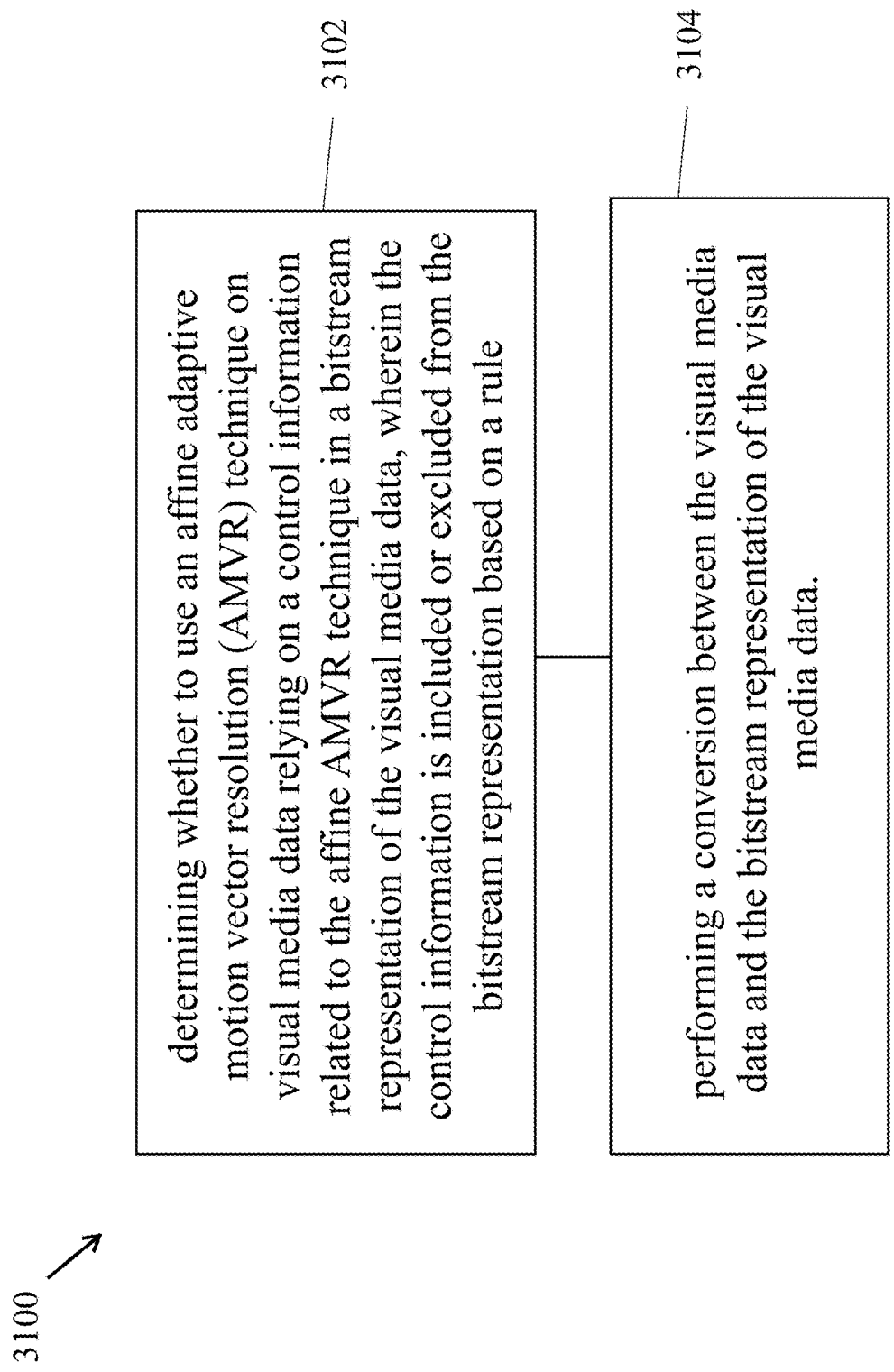
FIG. 31 is a flowchart for an example method of visual media processing.

FIG. 31 is a flowchart for an example method of visual media processing. Steps of this flowchart are discussed in connection with example embodiment 1 in Section 4 of this document. At step 3102, the process determines whether to use an affine adaptive motion vector resolution (AMVR) technique on visual media data relying on a control information related to the affine AMVR technique in a bitstream representation of the visual media data, wherein the control information is included or excluded from the bitstream representation based on a rule. At step 3104, the process performs a conversion between the visual media data and the bitstream representation of the visual media data.

Figure 32:
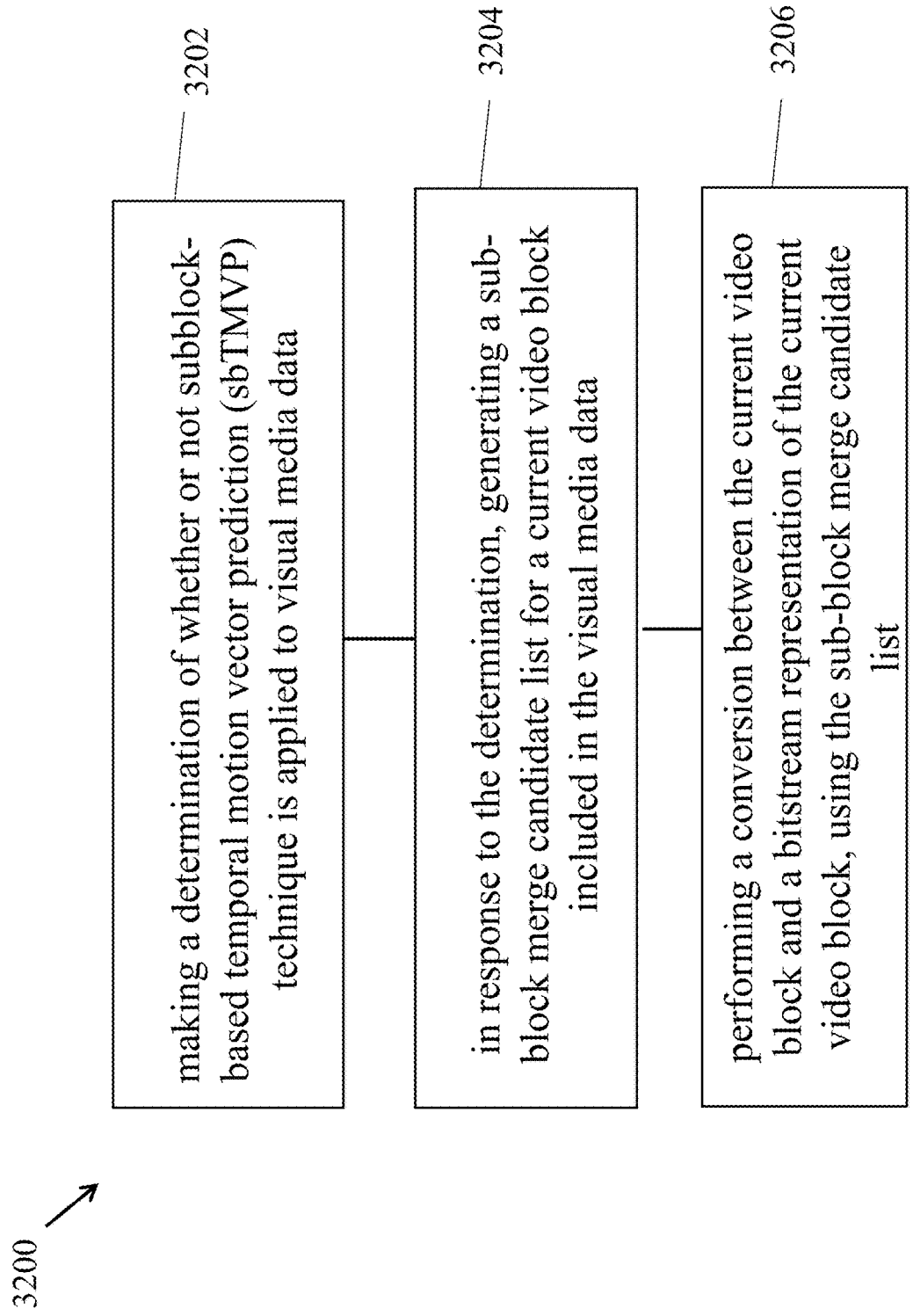
FIG. 32 is a flowchart for an example method of visual media processing.

FIG. 32 is a flowchart for an example method of visual media processing. Steps of this flowchart are discussed in connection with example embodiment 4 in Section 4 of this document. At step 3202, the process makes a determination of whether or not subblock-based temporal motion vector prediction (sbTMVP) technique is applied to visual media data. At step 3204, in response to the determination, the process generates a sub-block merge candidate list for a current video block included in the visual media data. At step 3206, the process performs a conversion between the current video block and a bitstream representation of the current video block, using the sub-block merge candidate list.

Figure 33:
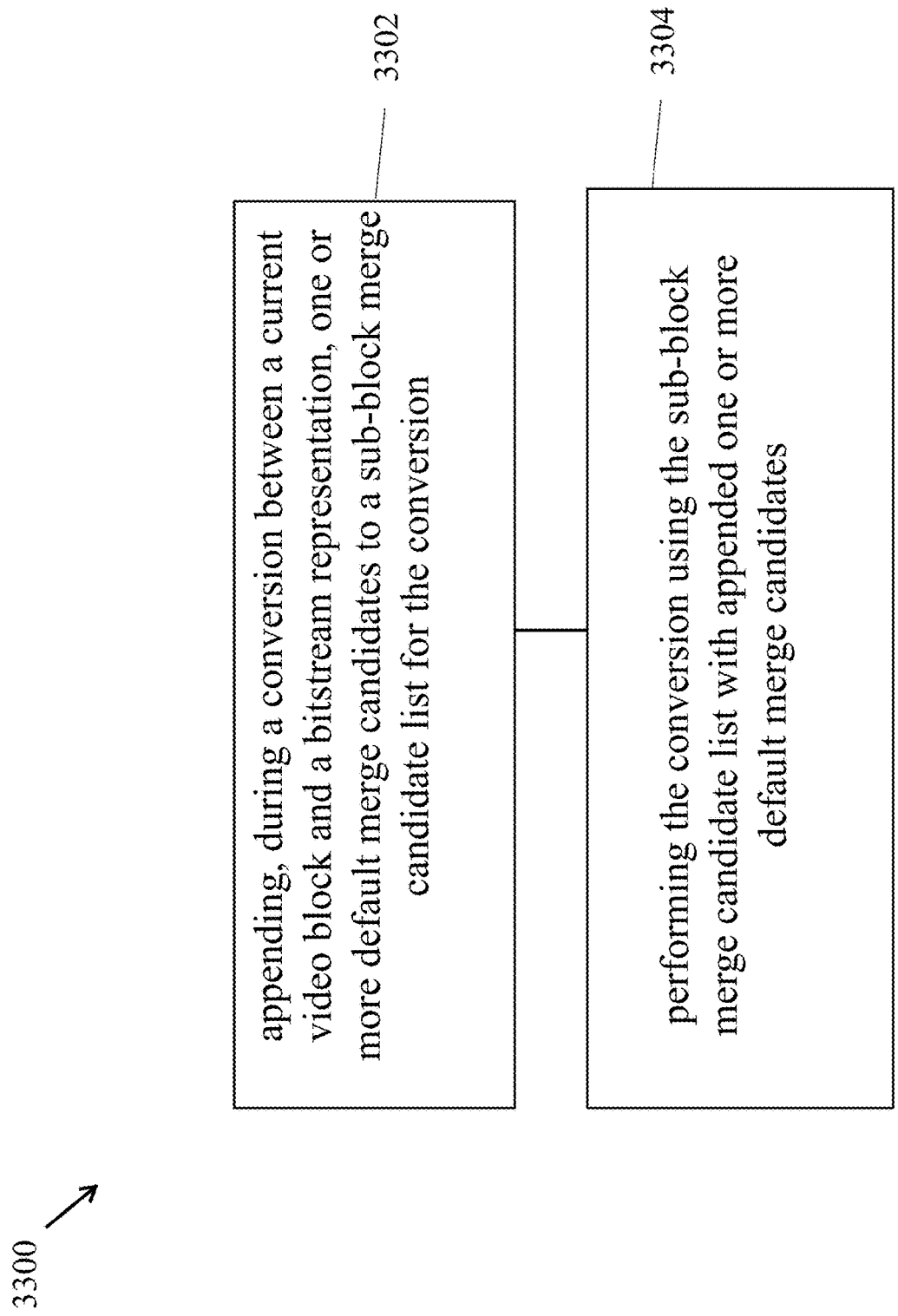
FIG. 33 is a flowchart for an example method of visual media processing.

FIG. 33 is a flowchart for an example method of visual media processing. Steps of this flowchart are discussed in connection with example embodiment 5 in Section 4 of this document. At step 3302, the process appends, during a conversion between a current video block and a bitstream representation, one or more default merge candidates to a sub-block merge candidate list for the conversion. At step 3304, the process performs the conversion using the sub-block merge candidate list with appended one or more default merge candidates.

Figure 34:
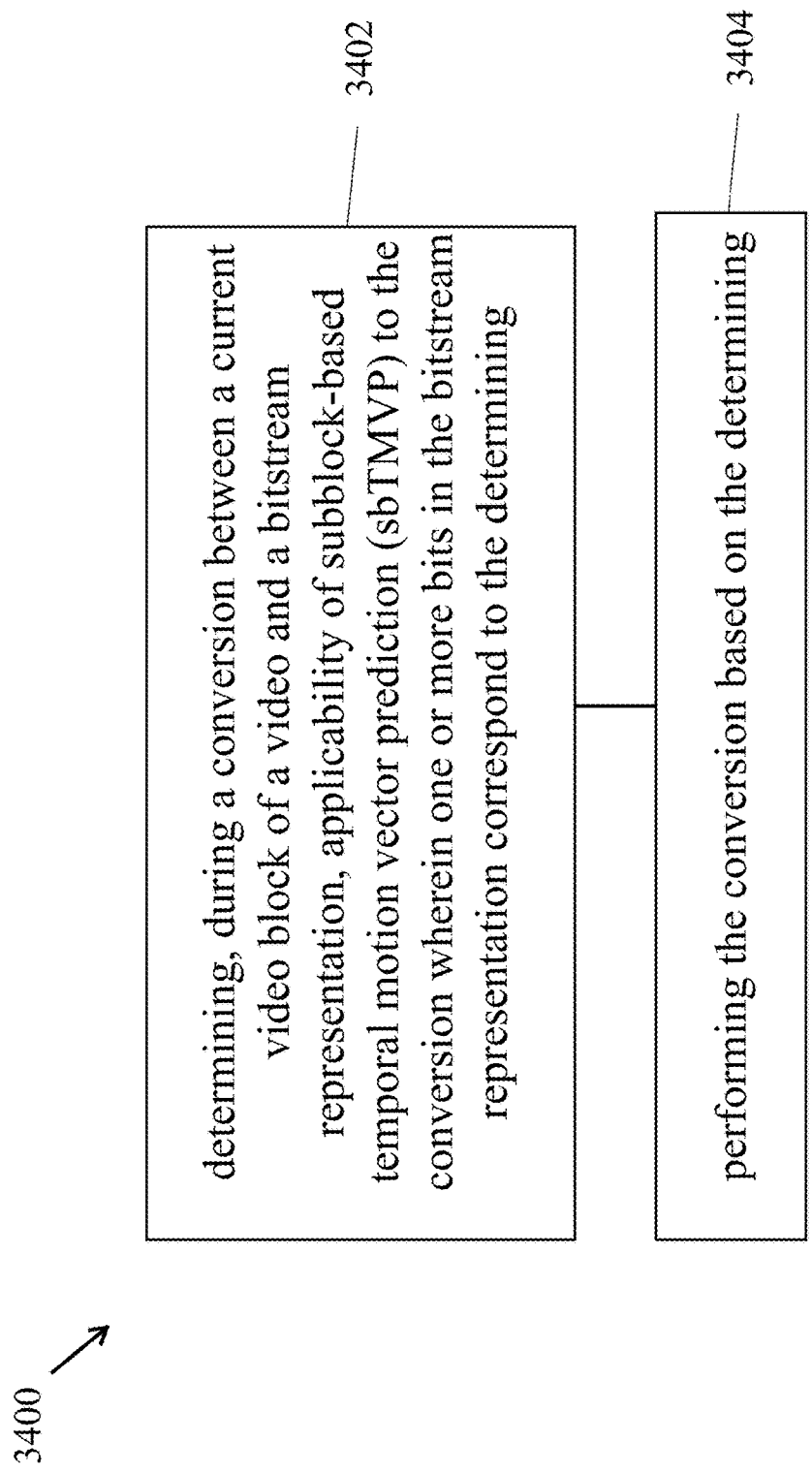
FIG. 34 is a flowchart for an example method of visual media processing.

FIG. 34 is a flowchart for an example method of visual media processing. Steps of this flowchart are discussed in connection with example embodiment 6 in Section 4 of this document. At step 3402, the process determines, during a conversion between a current video block of a video and a bitstream representation, applicability of subblock-based temporal motion vector prediction (sbTMVP) to the conversion wherein one or more bits in the bitstream representation correspond to the determining. At step 3404, the process performs the conversion based on the determining.

Figure 35:
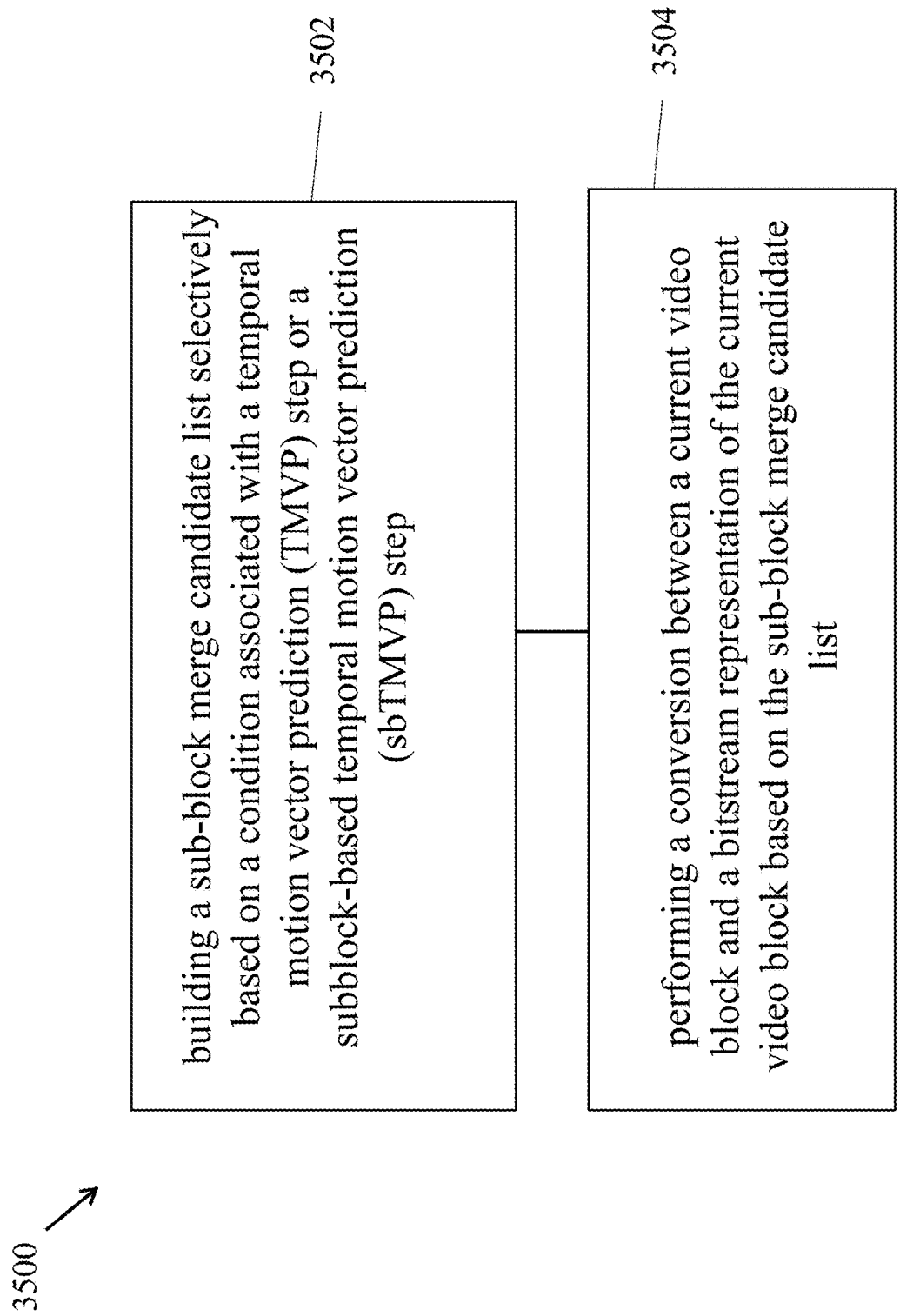
FIG. 35 is a flowchart for an example method of visual media processing.

FIG. 35 is a flowchart for an example method of visual media processing. Steps of this flowchart are discussed in connection with example embodiment 7 in Section 4 of this document. At step 3502, the process builds a sub-block merge candidate list selectively based on a condition associated with a temporal motion vector prediction (TMVP) step or a subblock-based temporal motion vector prediction (sbTMVP) step. At step 3504, the process performs a conversion between a current video block and a bitstream representation of the current video block based on the sub-block merge candidate list.

Figure 36:
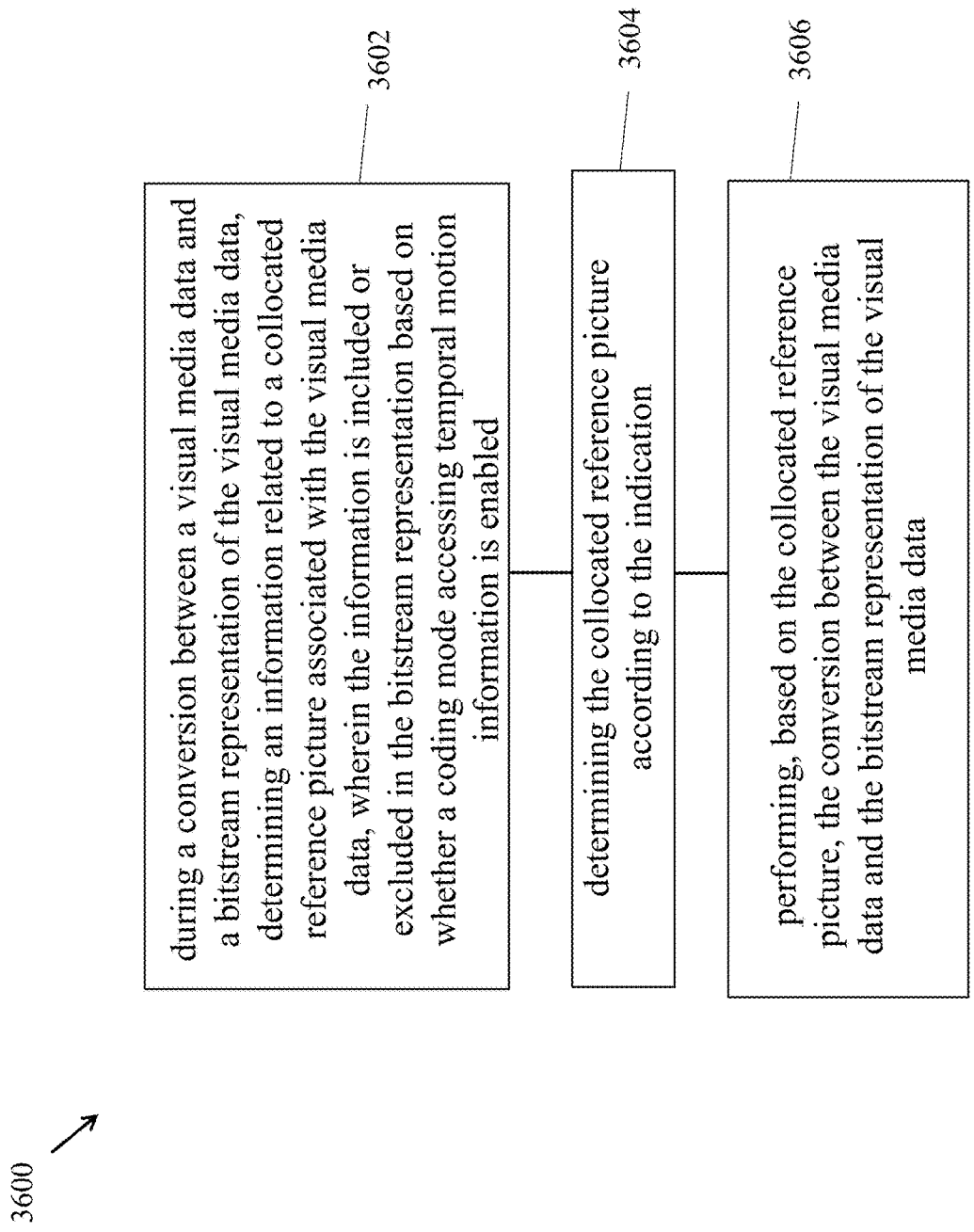
FIG. 36 is a flowchart for an example method of visual media processing.

FIG. 36 is a flowchart for an example method of visual media processing. Steps of this flowchart are discussed in connection with example embodiment 8 in Section 4 of this document. At step 3602, during a conversion between a visual media data and a bitstream representation of the visual media data, the process determines an information related to a collocated reference picture associated with the visual media data, wherein the information is included or excluded in the bitstream representation based on whether a coding mode accessing temporal motion information is enabled. At step 3604, the process determines the collocated reference picture according to the indication. At step 3606, the process performs, based on the collocated reference picture, the conversion between the visual media data and the bitstream representation of the visual media data.

Figure 37:
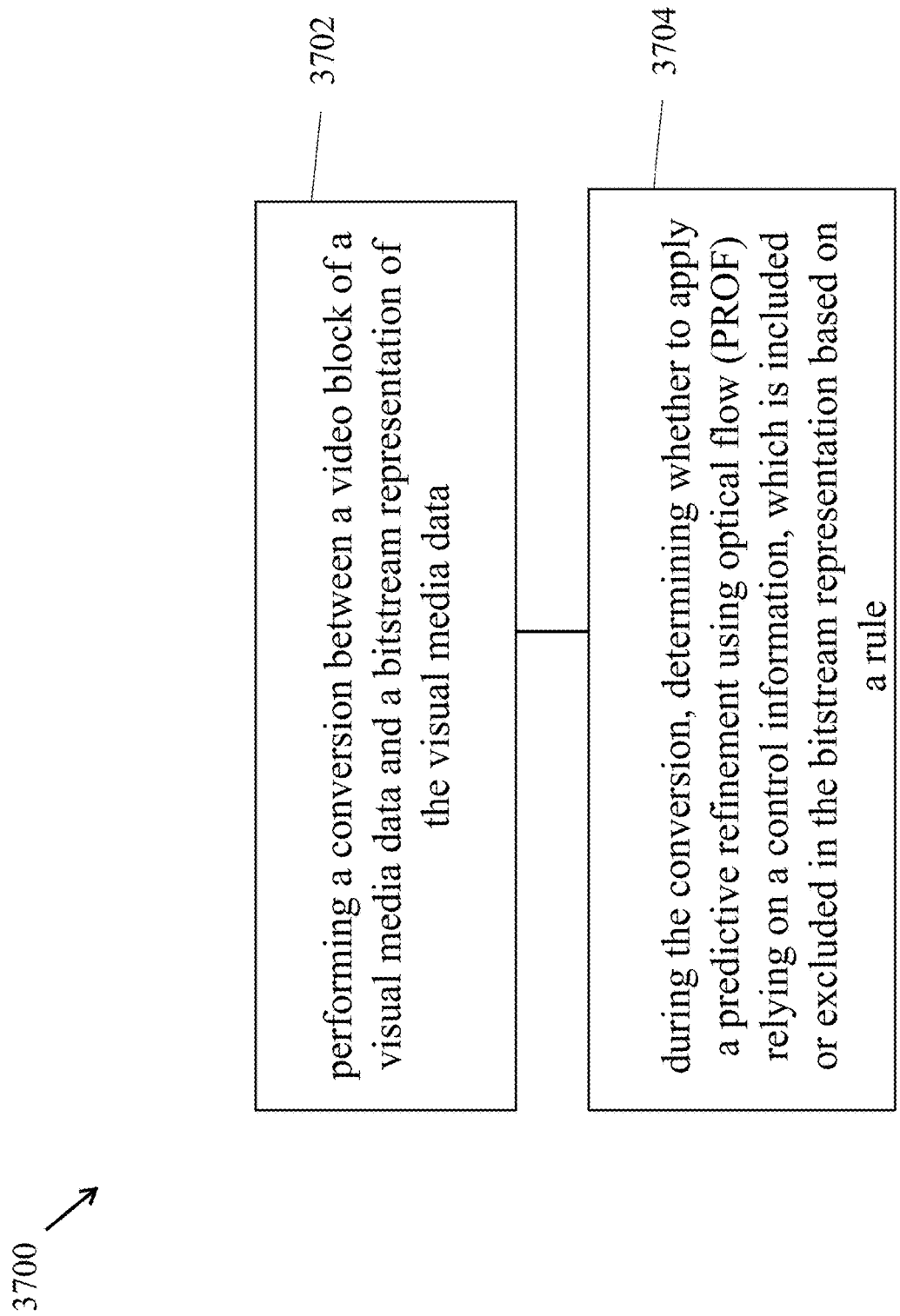
FIG. 37 is a flowchart for an example method of visual media processing.

FIG. 37 is a flowchart for an example method of visual media processing. Steps of this flowchart are discussed in connection with example embodiment 11 in Section 4 of this document. At step 3702, the process performs a conversion between a video block of a visual media data and a bitstream representation of the visual media data. At step 3704, during the conversion, the process determines whether to apply a predictive refinement using optical flow (PROF) relying on a control information, which is included or excluded in the bitstream representation based on a rule.

Some embodiments of the present document are now presented in clause-based format.

A1. A method of visual media processing, comprising:
determining whether to use an affine adaptive motion vector resolution (AMVR) technique on visual media data relying on a control information related to the affine AMVR technique in a bitstream representation of the visual media data, wherein the control information is included or excluded from the bitstream representation based on a rule; and
performing a conversion between the visual media data and the bitstream representation of the visual media data.

A2. The method of clause A1, wherein the rule specifies the control information is included or excluded in the bitstream representation based on at least one of:
(1) whether affine prediction is used during the conversion,
(2) whether a regular AMVR technique is used during the conversion,
(3) whether information related to adaptive motion vector resolution indicates the AMVR technique is enabled or disabled.

A3. The method of clause A1, wherein the rule specifies excluding the control information in a case that affine prediction is not used during the conversion.

A4. The method of clause A1, wherein the rule specifies including the control information in a case that affine prediction is used during the conversion.

A5. The method of clause A1, wherein usage of the affine AMVR technique is disabled during the conversion in a case that affine prediction is not used.

A6. The method of clause A2, wherein the information related to adaptive motion vector resolution is used to control usage of the AMVR technique for multiple coding techniques, wherein the multiple coding techniques comprise a regular AMVR technique and affine AMVR technique.

A7. The method of any one or more of clauses A2 or A6, wherein the rule specifies excluding the control information related to the affine AMVR technique in a case that the information related to the adaptive motion vector resolution indicates that the AMVR technique is disabled.

A8. The method of any one or more of clauses A2 or A6, wherein the rule specifies including the control information related to the affine AMVR technique in a case that the information related to adaptive motion vector resolution indicates the AMVR technique is enabled.

A9. The method any one or more of clauses A2 or A6-A8, wherein the information related to adaptive motion vector resolution is signaled in the bitstream representation at a sequence level.

A10. The method of any one or more of clauses A1-A9, wherein the rule further specifies including the control information related to the affine AMVR technique in a case that a regular AMVR technique is used during the conversion.

A11. The method of any one or more of clauses A1-A9, wherein the rule further specifies excluding the control information related to the affine AMVR technique in a case that a regular AMVR technique is not applied during the conversion.

A12. The method of clause A5, wherein the affine AMVR technique is disabled in a case that the regular AMVR technique is not applied during the conversion.

A13. The method of any one or more of clauses A1-A4, wherein the control information includes a same field indicative of use of multiple adaptive motion vector resolution techniques during the conversion.

A14. The method of any one or more of clauses A1-A13, wherein in a case that affine prediction is not used during the conversion, further comprising:
ignoring the control information related to the affine AMVR technique.

A15. The method of any one or more of clauses A1-A14, wherein the rule specifies including or excluding the control information based on whether or not a regular adaptive motion vector resolution and affine prediction are used during the conversion.

A16. The method of clause A15, wherein the rule specifies excluding the control information in a case that at least one of the regular adaptive motion vector resolution and affine prediction are not applied during the conversion.

A17. The method of any one of more of clauses A1-A16, wherein the rule further specifies including or excluding the control information in the bitstream representation is based on one or more criteria associated with usage of affine prediction.

A18. The method of clause A17, wherein the rule further specifies excluding the control information in the bitstream representation in a case that usage of affine prediction is disabled, and further wherein a lack of the control information in the bitstream representation is used to infer that usage of affine AMVR is disabled.

A19. The method of any one or more of clauses A1-A18, wherein in a case that a current slice, a tile group, or a picture is predicted only from one or more preceding pictures associated with the visual media data, the control information is excluded in the bitstream representation.

A20. The method of any one or more of clauses A1-A18, wherein in a case that a current slice, a tile group, or a picture is predicted only from one or more subsequent pictures associated with the visual media data, the control information is excluded in the bitstream representation.

A21. The method of any one or more of clauses A1-A18, wherein in a case that a current slice, a tile group, or a picture is predicted from one or more subsequent or preceding pictures associated with the visual media data, the control information is excluded in the bitstream representation.

A22. The method of clause A1, wherein the affine AMVR technique is disabled in a case that affine prediction or a regular AMVR technique is not used during the conversion.

A23. The method of clause A22, wherein the control information related to the affine AMVR technique is excluded in the bitstream representation if affine AMVR is disabled.

A24. The method of clause A1, wherein the rule further specifies excluding the control information related to the affine AMVR technique in a case that at least one of affine prediction or the regular AMVR technique is not applied during the conversion.

A25. The method of clause A1, wherein the rule further specifies excluding the control information related to the affine AMVR technique in a case that neither affine prediction nor the regular AMVR technique is applied during the conversion.

A26. The method of clause A1-A25, wherein the control information is included in one of: a sequence, a picture, a slice, a tile group, a tile, a brick associated with a current video block or another video block of the visual media data.

A27. The method of clause A26, wherein the control information is included in one of: a sequence parameter set (SPS), a decoding parameter set (DPS), a video parameter set (VPS), a picture parameter set (PPS), a picture header, a slice header, or a tile group header.

B1. A method of visual media processing, comprising:

making a determination of whether or not subblock-based temporal motion vector prediction (sbTMVP) technique is applied to visual media data;

in response to the determination, generating a sub-block merge candidate list for a current video block included in the visual media data; and performing a conversion between the current video block and a bitstream representation of the current video block, using the sub-block merge candidate list.

B2. The method of clause B1, wherein a maximum number of candidates in the sub-block merge candidate list depends on at least one of: whether or not the sbTMVP technique is applied to the conversion or whether or not a temporal motion vector prediction (TMVP) technique is applied to the conversion.

B3. The method of clause B1, wherein the maximum number of candidates in the sub-block merge candidate list depends on whether subblock-based temporal merging candidates are used.

B4. The method of clause B3, wherein the subblock-based temporal merging candidates are used if a temporal motion vector prediction (TMVP) technique and the sbTMVP technique are applied to the conversion.

B5. The method of any one or more of clauses B1 or B2, wherein a field in the bitstream representation expressly indicates whether or not the sbTMVP technique is applied to the conversion.

B6. The method of clause B5, wherein the field is at a sequence level or a video parameter set level or a picture parameter set level or a slice level or a tile group level or a picture header level.

B7. The method of clause B1, further comprising:

upon detecting that a temporal motion vector prediction (TMVP) technique is not applied to a picture or a slice or a tile group, determining that the sbTMVP technique is not applied to the picture or the slice or the tile group.

B8. The method of clause B2, wherein one or more syntax elements in the bitstream representation related to the maximum number of candidates in the sub-block merge candidate list depends on whether or not the sbTMVP technique is applied to the conversion.

B9. The method of clause B8, further comprising:

upon determining that the sbTMVP technique is not applied to the conversion, constraining a value of the one or more syntax elements.

B10. The method of clause B6, wherein the one or more syntax elements related to the maximum number of candidates in the sub-block merge candidate list are selectively included or excluded in the bitstream representation.

B11. The method of any one or more of clauses B2-B10, wherein the maximum number of candidates in the sub-block merge candidate list is 0, 1, or 5.

C1. A method of visual media processing, comprising:

appending, during a conversion between a current video block and a bitstream representation, one or more default merge candidates to a sub-block merge candidate list for the conversion; and performing the conversion using the sub-block merge candidate list with appended one or more default merge candidates.

C2. The method of clause C1, wherein a default candidate is associated with a sub-block prediction type.

C3. The method of clause C2, wherein the sub-block prediction type includes a prediction based on a translational motion model or an affine motion model.

C4. The method of clause C1, wherein a default candidate is associated with a whole block prediction type.

C5. The method of clause C2, wherein the whole block prediction type includes a prediction based on a translational motion model or an affine motion model.

D1. A method of visual media processing, comprising:

determining, during a conversion between a current video block of a video and a bitstream representation, applicability of subblock-based temporal motion vector prediction (sbTMVP) to the conversion wherein one or more bits in the bitstream representation correspond to the determining; and performing the conversion based on the determining.

D2. The method of clause D1, wherein the one or more bits are included in a picture header or a slice header or a tile group header.

D3. The method of any one or more of clauses D1-D2, wherein the conversion uses a collocated picture for sbTMVP that is different from another collocated picture used for the conversion of the video using temporal motion vector prediction (TMVP).

D4. The method of any one or more of clauses D1-D3, wherein the one or more bits are included in an I-slice or an I-tile group or an I-picture.

D5. The method of any one or more of clauses D1-D3, wherein the one or more bits are included in the bitstream representation at a sequence level if sbTMVP is applied at the sequence level.

D6. The method of any one or more of clauses D1-D3, wherein the one or more bits are excluded in the bitstream representation at a slice level or a tile group level or a picture level if TMVP is disabled for the slice level or the tile group level or the picture level.

D7. The method of clause D6, wherein sbTMVP is determined to be inapplicable.

D8. The method of clause D1, wherein TMVP is disabled for a slice or a tile group or a picture, further comprising:

inferring that sbTMVP is disabled for the slice or the tile group or the picture, regardless of the one or more bits in the bitstream representation.

E1. A method of visual media processing, comprising:

building a sub-block merge candidate list selectively based on a condition associated with a temporal motion vector prediction (TMVP) step or a subblock-based temporal motion vector prediction (sbTMVP) step; and performing a conversion between a current video block and a bitstream representation of the current video block based on the sub-block merge candidate list.

E2. The method of clause E1, wherein the condition corresponds to presence of a flag and/or a value of the flag in the bitstream representation at a sequence parameter set level or a slice level or a tile level or a brick level.

E3. The method of clause E1, wherein the sub-block merge candidate list is built using sub-block based temporal merging candidates only when both sbTMVP step and TMVP step are enabled for a picture or a tile or a tile group or a slice to which the current video block belongs.

E4. The method of clause E1, wherein the sub-block merge candidate list is built using sub-block based temporal merging candidates only when sbTMVP step is enabled for a picture or a tile or a tile group or a slice to which the current video block belongs.

E5. The method of clause E1, wherein the sub-block merge candidate list is built using sub-block based temporal merging candidates only when sbTMVP is enabled and TMVP step is disabled for a picture or a tile or a tile group or a slice to which the current video block belongs.

E6. The method of any one or more of clauses E1-E5, wherein a flag in the bitstream representation is included or excluded based on whether or not sub-block based temporal merging candidates are used during the conversion.

E7. The method of clause E2, wherein the flag comprises at least one of sps_temporal_mvp_enabled_flag or sps_sbtmvp_enabled_flag.

F1. A method of visual media processing, comprising:

during a conversion between a visual media data and a bitstream representation of the visual media data, determining an information related to a collocated reference picture associated with the visual media data, wherein the information is included or excluded in the bitstream representation based on whether a coding mode accessing temporal motion information is enabled;

determining the collocated reference picture according to the indication; and performing, based on the collocated reference picture, the conversion between the visual media data and the bitstream representation of the visual media data.

F2. The method of clause F1, wherein the information indicates a reference picture list that is used to derive the collocated reference picture and/or a reference index of the collocated reference picture.

F3. The method of clause F1, wherein the coding mode comprises a temporal motion vector prediction (TMVP) coding technique.

G1. A method of visual media processing, comprising:

performing a conversion between a video block of a visual media data and a bitstream representation of the visual media data; and during the conversion, determining whether to apply a predictive refinement using optical flow (PROF) relying on a control information, which is included or excluded in the bitstream representation based on a rule.

G2. The method of clause G1, wherein the rule specifies including or excluding the control information in the bitstream representation based on whether or not affine prediction is applied to the conversion.

G3. The method of clause any one or more of clauses G1-G2, wherein application of PROF is disabled based on disabling of affine prediction for the conversion.

G4. The method of clause G2, wherein the rule further specifies excluding the control information in a case that affine prediction is disabled.

G5. The method of clause G4, wherein affine prediction is disabled, further comprising:

inferring that PROF is disabled for the conversion.

G6. The method of clause G2, wherein application of PROF is associated only for uni-prediction based on a corresponding flag in the bitstream representation.

G7. The method of clause G1-G6, wherein the control information is included in one of: a sequence, a picture, a slice, a tile group, a tile, a brick associated with a current video block or another video block of the visual media data.

G8. The method of clause G7, wherein the control information is included in one of: a sequence parameter set (SPS), a decoding parameter set (DPS), a video parameter set (VPS), a picture parameter set (PPS), a picture header, a slice header, or a tile group header.

H1. The method of any one or more of clauses A1-G8, wherein the conversion includes generating the bitstream representation from the current video block.

H2. The method of any one or more of clauses A1-G8, wherein the conversion includes generating pixel values of the current video block from the bitstream representation.

H3. A video encoder apparatus comprising a processor configured to implement a method recited in any one or more of clauses A1-G8.

H4. A video decoder apparatus comprising a processor configured to implement a method recited in any one or more of clauses A1-G8.

H5. A computer readable medium having code stored thereon, the code embodying processor-executable instructions for implementing a method recited in any one or more of clauses A1-G8.

In the present document, the term "video processing" or "visual media processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation. It will be appreciated that the disclosed techniques may be embodied in video encoders or decoders to improve compression efficiency using techniques that include the use of sub-block based motion vector refinement.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
performing a conversion between a visual media data of a video and a bitstream of the video,
wherein whether to enable an affine prediction mode for the conversion is determined during the conversion,
wherein whether a first indication is included in the bitstream is based on whether to enable the affine prediction mode for the conversion, wherein the first indication indicates whether to enable a tool used to determine, for motion information determined in the affine prediction mode, a first motion precision from a set of allowed multiple motion precisions,
wherein whether the first indication is included in the bitstream is further based on a second indication, wherein the second indication indicates whether to enable a tool used to determine, for motion information determined in the affine prediction mode, the first motion precision from the set of allowed multiple motion precisions, and for motion information determined in a non-affine prediction mode, a second motion precision from the set of allowed multiple motion precisions, and
wherein a third indication is not included in the bitstream in response to the second indication indicating the tool is disabled for the affine prediction mode and the non-affine prediction mode, wherein the third indication is used to determine, for motion information determined in the non-affine prediction mode, the motion precision from the set of allowed multiple motion precisions.

2. The method of claim 1, wherein the first indication is not included in the bitstream in response to the affine prediction mode being disabled.

3. The method of claim 1, wherein the tool is disabled for the affine prediction mode in response to the affine prediction mode being disabled.

4. The method of claim 1, wherein the first indication is ignored and is inferred to indicate the tool is disabled for the affine prediction mode in response to the affine prediction mode being disabled.

5. The method of claim 1, wherein the first indication is not included in the bitstream in response to the second indication indicating the tool is disabled for the affine prediction mode and the non-affine prediction mode.

6. The method of claim 1, wherein the second indication is included in the bitstream in a sequence parameter set (SPS) level.

7. The method of claim 1, wherein the first indication is included in the bitstream in a sequence parameter set (SPS) level.

8. The method of claim 1, wherein whether to enable the affine prediction mode for the conversion is indicated using a third indication which is included in the bitstream in a sequence parameter set (SPS) level.

9. The method of claim 1, wherein the conversion comprises encoding the visual media data into the bitstream.

10. The method of claim 1, wherein the conversion comprises decoding the visual media data from the bitstream.

11. An apparatus for processing video data comprising a processor and a non-transitory memory with instructions thereon, wherein the instructions upon execution by the processor, cause the processor to:
perform a conversion between a visual media data of a video and a bitstream of the video,
wherein whether to enable an affine prediction mode for the conversion is determined during the conversion,
wherein whether a first indication is included in the bitstream is based on whether to enable the affine prediction mode for the conversion, wherein the first indication indicates whether to enable a tool used to determine, for motion information determined in the affine prediction mode, a first motion precision from a set of allowed multiple motion precisions,
wherein whether the first indication is included in the bitstream is further based on a second indication, wherein the second indication indicates whether to enable a tool used to determine, for motion information determined in the affine prediction mode, the first motion precision from the set of allowed multiple motion precisions, and for motion information determined in a non-affine prediction mode, a second motion precision from the set of allowed multiple motion precisions, and
wherein a third indication is not included in the bitstream in response to the second indication indicating the tool is disabled for the affine prediction mode and the non-affine prediction mode, wherein the third indication is used to determine, for motion information determined in the non-affine prediction mode, the motion precision from the set of allowed multiple motion precisions.

12. The apparatus of claim 11, wherein the first indication is not included in the bitstream in response to the affine prediction mode being disabled.

13. The apparatus of claim 11, wherein the tool is disabled for the affine prediction mode in response to the affine prediction mode being disabled.

14. The apparatus of claim 11, wherein the first indication is ignored and is inferred to indicate the tool is disabled for the affine prediction mode in response to the affine prediction mode being disabled.

15. A non-transitory computer-readable storage medium storing instructions that cause a processor to:
perform a conversion between a visual media data of a video and a bitstream of the video,
wherein whether to enable an affine prediction mode for the conversion is determined during the conversion,
wherein whether a first indication is included in the bitstream is based on whether to enable the affine prediction mode for the conversion, wherein the first indication indicates whether to enable a tool used to determine, for motion information determined in the affine prediction mode, a first motion precision from a set of allowed multiple motion precisions,
wherein whether the first indication is included in the bitstream is further based on a second indication, wherein the second indication indicates whether to enable a tool used to determine, for motion information determined in the affine prediction mode, the first motion precision from the set of allowed multiple motion precisions, and for motion information determined in a non-affine prediction mode, a second motion precision from the set of allowed multiple motion precisions, and
wherein a third indication is not included in the bitstream in response to the second indication indicating the tool is disabled for the affine prediction mode and the non-affine prediction mode, wherein the third indication is used to determine, for motion information determined in the non-affine prediction mode, the motion precision from the set of allowed multiple motion precisions.

16. The non-transitory computer-readable storage medium of claim 15, wherein whether the first indication is included in the bitstream is further based on a second indication, wherein the second indication indicating whether to enable a tool used to determine, for motion information determined in the affine prediction mode, the first motion precision from the set of allowed multiple motion precisions, and for motion information determined in a non-affine prediction mode, a second motion precision from the set of allowed multiple motion precisions.

17. A non-transitory computer-readable recording medium storing a bitstream which is generated by a method performed by a video processing apparatus, wherein the method comprises:
generating the bitstream from a visual media data of a video,
wherein whether to enable an affine prediction mode for the generating is determined during the generating,
wherein whether a first indication is included in the bitstream is based on whether to enable the affine prediction mode for the conversion, wherein the first indication indicates whether to enable a tool used to determine, for motion information determined in the affine prediction mode, a motion precision from a set of allowed multiple motion precisions,
wherein whether the first indication is included in the bitstream is further based on a second indication, wherein the second indication indicates whether to enable a tool used to determine, for motion information determined in the affine prediction mode, the first motion precision from the set of allowed multiple motion precisions, and for motion information determined in a non-affine prediction mode, a second motion precision from the set of allowed multiple motion precisions, and
wherein a third indication is not included in the bitstream in response to the second indication indicating the tool is disabled for the affine prediction mode and the non-affine prediction mode, wherein the third indication is used to determine, for motion information determined in the non-affine prediction mode, the motion precision from the set of allowed multiple motion precisions.

18. The apparatus of claim 11, wherein the second indication is included in the bitstream in a sequence parameter set (SPS) level.

19. The apparatus of claim 11, wherein the first indication is included in the bitstream in a sequence parameter set (SPS) level.

20. The apparatus of claim 11, wherein whether to enable the affine prediction mode for the conversion is indicated using a third indication which is included in the bitstream in a sequence parameter set (SPS) level.

\* \* \* \* \*